US012380906B2

(12) United States Patent
Chen et al.

(10) Patent No.: US 12,380,906 B2
(45) Date of Patent: Aug. 5, 2025

(54) MICROPHONE CONFIGURATIONS FOR EYEWEAR DEVICES, SYSTEMS, APPARATUSES, AND METHODS

(71) Applicant: Solos Technology Limited, Sha Tin (CN)

(72) Inventors: Xi Chen, San Jose, CA (US); Dashen Fan, Bellevue, WA (US)

(73) Assignee: Solos Technology Limited, Hong Kong (CN)

( * ) Notice: Subject to any disclaimer, the term of this patent is extended or adjusted under 35 U.S.C. 154(b) by 0 days.

(21) Appl. No.: 16/420,082

(22) Filed: May 22, 2019

(65) Prior Publication Data

US 2020/0294521 A1  Sep. 17, 2020

Related U.S. Application Data

(63) Continuation-in-part of application No. 14/886,077, filed on Oct. 18, 2015, now Pat. No. 10,306,389.
(Continued)

(51) Int. Cl.
*G10L 21/0208* (2013.01)
*G02C 11/00* (2006.01)
(Continued)

(52) U.S. Cl.
CPC .......... *G10L 21/0208* (2013.01); *G02C 11/06* (2013.01); *G02C 11/10* (2013.01);
(Continued)

(58) Field of Classification Search
CPC ............... G10L 21/0208; G10L 19/008; G10L 2021/02166; G02C 11/06; G02C 11/10; H04R 1/326; H04R 3/005; H04R 29/005
See application file for complete search history.

(56) References Cited

U.S. PATENT DOCUMENTS

| 3,378,649 A | 4/1968 | Mawby |
| 3,789,163 A | 1/1974 | Dunlavy |

(Continued)

FOREIGN PATENT DOCUMENTS

| CN | 202102188 U | 1/2012 |
| EP | 2323422 A1 | 5/2011 |

(Continued)

OTHER PUBLICATIONS

Internation Search Report & Written Opinion for PCT/US2014/026332, Entitled "Dual Stage Noise Reduction Architecture for Desired Signal Extraction," dated Jul. 24, 2014.
(Continued)

*Primary Examiner* — Mark Fischer
(74) *Attorney, Agent, or Firm* — Caldwell Intellectual Property Law

(57) ABSTRACT

Systems and methods are described to extract desired audio from an apparatus to be worn on a user's head. An apparatus includes a head wearable device and an array of at least three microphones. The at least three microphones are arranged along a plurality of at least two non-parallel axes. Selection logic is configured to identify a selected axis from the plurality and two microphones from the array that form the selected axis. A beamformer is configured to accept as inputs, signals from the two microphones and to output a main microphone channel and a reference microphone channel.

20 Claims, 53 Drawing Sheets

Related U.S. Application Data which is a continuation-in-part of application No. 14/207,163, filed on Mar. 12, 2014, now Pat. No. 9,633,670, and a continuation-in-part of application No. 14/180,994, filed on Feb. 14, 2014, now Pat. No. 9,753,311.

(60) Provisional application No. 62/801,618, filed on Feb. 5, 2019, provisional application No. 61/941,088, filed on Feb. 18, 2014, provisional application No. 61/912,844, filed on Dec. 6, 2013, provisional application No. 61/839,227, filed on Jun. 25, 2013, provisional application No. 61/839,211, filed on Jun. 25, 2013, provisional application No. 61/780,108, filed on Mar. 13, 2013.

(51) Int. Cl.
  *G02C 11/06* (2006.01)
  *G10L 19/008* (2013.01)
  *H04R 1/32* (2006.01)
  *H04R 3/00* (2006.01)
  *H04R 29/00* (2006.01)
  *G10L 21/0216* (2013.01)

(52) U.S. Cl.
  CPC ............ *G10L 19/008* (2013.01); *H04R 1/326* (2013.01); *H04R 3/005* (2013.01); *H04R 29/005* (2013.01); *G10L 2021/02166* (2013.01)

(56) References Cited

U.S. PATENT DOCUMENTS

| | | |
|---|---|---|
| 3,919,481 A | 11/1975 | Kalfaian |
| 3,946,168 A | 3/1976 | Preves |
| 4,773,095 A | 9/1988 | Zwicker |
| 4,904,078 A | 2/1990 | Gorike |
| 4,966,252 A | 10/1990 | Drever |
| 5,825,898 A | 10/1998 | Marash |
| 6,091,546 A | 7/2000 | Spitzer |
| 6,266,422 B1 | 7/2001 | Ikeda |
| 6,349,001 B1 | 2/2002 | Spitzer |
| 6,678,657 B1 | 1/2004 | Raymond |
| 6,707,910 B1 | 3/2004 | Valve |
| 7,174,022 B1 | 2/2007 | Zhang |
| 7,359,504 B1 | 4/2008 | Reuss |
| 7,929,714 B2 | 4/2011 | Bazarjani |
| 8,184,983 B1 | 5/2012 | Ho |
| 8,543,061 B2 | 9/2013 | Suhami |
| 8,744,113 B1 | 6/2014 | Rickards |
| 8,958,572 B1 | 2/2015 | Solbach |
| 9,280,982 B1 | 3/2016 | Kushner |
| 2002/0106091 A1 | 8/2002 | Furst |
| 2003/0040908 A1 | 2/2003 | Yang |
| 2003/0147538 A1 | 8/2003 | Elko |
| 2003/0179888 A1 | 9/2003 | Burnett |
| 2004/0111258 A1 | 6/2004 | Zangi |
| 2004/0258267 A1* | 12/2004 | Christensen ............ H04R 1/406 381/355 |
| 2005/0063552 A1 | 3/2005 | Shuttleworth |
| 2005/0069156 A1 | 3/2005 | Haapapuro |
| 2005/0096899 A1 | 5/2005 | Padhi |
| 2005/0248717 A1 | 11/2005 | Howell |
| 2006/0285714 A1 | 12/2006 | Akino |
| 2007/0160254 A1 | 7/2007 | Ritter |
| 2008/0137874 A1 | 6/2008 | Christoph |
| 2008/0260189 A1 | 10/2008 | Schobben |
| 2008/0267427 A1 | 10/2008 | Johnston |
| 2008/0317259 A1 | 12/2008 | Zhang |
| 2008/0317260 A1 | 12/2008 | Short |
| 2009/0089053 A1 | 4/2009 | Wang |
| 2009/0089054 A1 | 4/2009 | Wang |
| 2009/0112579 A1 | 4/2009 | Li |
| 2009/0129582 A1 | 5/2009 | Chandran |
| 2009/0154726 A1 | 6/2009 | Taenzer |
| 2009/0190774 A1 | 7/2009 | Wang |
| 2009/0299739 A1 | 12/2009 | Chan |
| 2010/0100386 A1 | 4/2010 | Yu |
| 2010/0198590 A1 | 8/2010 | Tackin |
| 2010/0208928 A1 | 8/2010 | Chene |
| 2010/0241426 A1 | 9/2010 | Zhang |
| 2010/0278352 A1 | 11/2010 | Petit |
| 2010/0280824 A1 | 11/2010 | Petit |
| 2011/0038489 A1 | 2/2011 | Erik |
| 2011/0071825 A1 | 3/2011 | Emori |
| 2011/0081026 A1 | 4/2011 | Ramakrishnan |
| 2011/0091057 A1* | 4/2011 | Derkx ............... H04R 25/407 381/313 |
| 2011/0099010 A1 | 4/2011 | Zhang |
| 2011/0106533 A1 | 5/2011 | Yu |
| 2011/0243349 A1 | 10/2011 | Zavarehei |
| 2011/0293103 A1 | 12/2011 | Park |
| 2012/0010881 A1 | 1/2012 | Avendano |
| 2012/0020485 A1* | 1/2012 | Visser .................... H04R 3/005 381/57 |
| 2012/0051548 A1* | 3/2012 | Visser ................. G10L 21/0208 381/56 |
| 2012/0075168 A1 | 3/2012 | Osterhout |
| 2012/0084084 A1 | 4/2012 | Zhu |
| 2012/0123773 A1 | 5/2012 | Zeng |
| 2012/0123775 A1 | 5/2012 | Murgia |
| 2012/0162259 A1 | 6/2012 | Sakai |
| 2012/0209601 A1 | 8/2012 | Jing |
| 2012/0215519 A1 | 8/2012 | Park |
| 2012/0239394 A1 | 9/2012 | Matsumoto |
| 2012/0259631 A1 | 10/2012 | Lloyd |
| 2012/0282976 A1 | 11/2012 | Suhami |
| 2013/0030803 A1 | 1/2013 | Liao |
| 2013/0034243 A1 | 2/2013 | Yermeche |
| 2013/0142343 A1 | 6/2013 | Matsui |
| 2013/0202126 A1* | 8/2013 | Chen .................... H04R 1/1041 381/74 |
| 2013/0314280 A1 | 11/2013 | Maltsev |
| 2013/0332157 A1 | 12/2013 | Iyengar |
| 2014/0003622 A1 | 1/2014 | Ikizyan |
| 2014/0006019 A1 | 1/2014 | Paajanen |
| 2014/0010373 A1 | 1/2014 | Gran |
| 2014/0056435 A1 | 2/2014 | Ulrik |
| 2014/0081631 A1 | 3/2014 | Zhu |
| 2014/0236590 A1 | 8/2014 | Hu |
| 2014/0268016 A1 | 9/2014 | Chow |
| 2014/0270244 A1 | 9/2014 | Fan |
| 2014/0270316 A1 | 9/2014 | Fan |
| 2014/0278391 A1 | 9/2014 | Braho |
| 2014/0337021 A1 | 11/2014 | Kim |
| 2014/0358526 A1 | 12/2014 | Abdelal |
| 2015/0012269 A1 | 1/2015 | Nakadai |
| 2015/0032451 A1 | 1/2015 | Gunn |
| 2015/0106088 A1 | 4/2015 | Järvinen |
| 2015/0172807 A1 | 6/2015 | Olsson |
| 2015/0215700 A1 | 7/2015 | Sun |
| 2015/0230023 A1 | 8/2015 | Fujieda |
| 2015/0262590 A1 | 9/2015 | Joder |
| 2015/0262591 A1 | 9/2015 | Hill |
| 2015/0269954 A1 | 9/2015 | Ryan |
| 2015/0287406 A1 | 10/2015 | Kristjansson |
| 2015/0294674 A1 | 10/2015 | Takahashi |
| 2015/0318902 A1 | 11/2015 | Sugiyama |
| 2016/0005422 A1 | 1/2016 | Zad Issa |
| 2016/0029121 A1 | 1/2016 | Nesta |

FOREIGN PATENT DOCUMENTS

| | | |
|---|---|---|
| EP | 2469323 A1 | 6/2012 |
| JP | S5813008 A | 1/1983 |
| JP | H06338827 A | 12/1994 |
| JP | H09252340 A | 9/1997 |
| JP | H10301600 A | 11/1998 |
| JP | 2003271191 A | 9/2003 |
| JP | 2011015018 A | 1/2011 |
| KR | 100857822 B1 | 9/2008 |
| KR | 100936772 B1 | 1/2010 |

(56) References Cited

FOREIGN PATENT DOCUMENTS

| WO | 0002419 | A1 | 1/2000 |
|---|---|---|---|
| WO | 2009076016 | A1 | 6/2009 |
| WO | 2011087770 | A2 | 7/2011 |
| WO | 2012040386 | A1 | 3/2012 |
| WO | 2012097014 | A1 | 7/2012 |
| WO | 2014158426 | A1 | 10/2014 |
| WO | 2014163794 | A2 | 10/2014 |
| WO | 2014163796 | A1 | 10/2014 |
| WO | 2014163797 | A1 | 10/2014 |

OTHER PUBLICATIONS

Zhang, Xianxian, Noise Estimation Based on an Adaptive Smoothing Factor for Improving Speech Quality in a Dual-Microphone Noise Suppression System, 2011, IEEE, 5 pgs, US.

Internation Search Report & Written Opinion, PCT/US2014/016547, Entitled, "Sound Induction Ear Speaker for Eye Glasses," dated Apr. 29, 2015 (15 pages).

Internation Search Report & Written Opinion, PCT/US2014/010557, Entitled, "Sound Induction Ear Speaker for Eye Glasses," dated Sep. 24, 2014 (15 pages).

Internation Search Report & Written Opinion, PCT/US2014/016558, Entitled, "Eye Glasses with Microphone Array," dated Jun. 12, 2014 (12 pages).

Internation Search Report & Written Opinion, PCT/US2014/016570, Entitled, "Noise Cancelling Microphone Apparatus," dated Jun. 25, 2014 (19 pages).

International Search Report & Written Opinion for PCT/US2014/026332, Entitled "Apparatuses and Methods for Acoustic Channel Auto-Balancing During Multi- . . . ," dated Jul. 30, 2014.

Internation Search Report & Written Opinion for PCT/US2014/026605, Entitled "Apparatuses and Methods for Multi-Channel Signal Compression During Desired . . . ," dated Jul. 24, 2014.

* cited by examiner

FIGURE 3B

| 322 | 324 | 326 | 328 |
|---|---|---|---|
| | | PLOTTED VALUES: X, Y | |
| MICROPHONE PAIR USED FOR SNR MEASUREMENTS | ~ΔL | X | Y SNR DIFFERENCE dB |
| 2, 1 | $\Delta L_2 = d_2 - d_1$ | 1 | 5.55 |
| 3, 1 | $\Delta L_3 = d_3 - d_1$ | 2 | 6.33 |
| 6, 1 | $\Delta L_6 = d_6 - d_1$ | 3 | 7.68 |
| 4, 1 | $\Delta L_4 = d_4 - d_1$ | 4 | 9.25 |
| 5, 1 | $\Delta L_5 = d_5 - d_1$ | 5 | 9.79 |
| 7, 1 | $\Delta L_7 = d_7 - d_1$ | 6 | 10.4 |
| 8, 1 | $\Delta L_8 = d_8 - d_1$ | 7 | 10.48 |

$\Delta L_2 < \Delta L_3 < \Delta L_6 < \Delta L_4 < \Delta L_5 < \Delta L_7 < \Delta L_8$

FIGURE 4B

| 422 | 424 | 426 | 428 |
|---|---|---|---|
| | | PLOTTED VALUES: X, Y | |
| MICROPHONE PAIR USED FOR SNR MEASUREMENTS (primary, reference) | ~ΔL | X | Y SNR DIFFERENCE dB |
| 430 | 2, 6 | $\Delta L_6 = d_6 - d_2$ | 1 | 1.2 |
| 432 | 2, 3 | $\Delta L_3 = d_3 - d_2$ | 2 | 1.66 |
| 434 | 2, 4 | $\Delta L_4 = d_4 - d_2$ | 3 | 3.99 |
| 436 | 2, 5 | $\Delta L_5 = d_5 - d_2$ | 4 | 4.09 |
| 438 | 2, 7 | $\Delta L_7 = d_7 - d_2$ | 5 | 5.57 |
| 440 | 2, 8 | $\Delta L_8 = d_8 - d_2$ | 6 | 5.2 |

$\Delta L_6 < \Delta L_3 < \Delta L_4 < \Delta L_5 < \Delta L_7 < \Delta L_8$ — 442

| | MICROPHONE PAIR USED FOR SNR MEASUREMENTS (primary, reference) 522 | ~ΔL 524 | PLOTTED VALUES: X, Y | |
|---|---|---|---|---|
| | | | X 526 | Y SNR DIFFERENCE dB 528 |
| 530 | 3, 6 | $\Delta L_6 = d_6 - d_3$ | 1 | 0 |
| 532 | 3, 4 | $\Delta L_4 = d_4 - d_3$ | 2 | 2.78 |
| 534 | 3, 5 | $\Delta L_5 = d_5 - d_3$ | 3 | 2.91 |
| 536 | 3, 7 | $\Delta L_7 = d_7 - d_3$ | 4 | 5.16 |
| 538 | 3, 8 | $\Delta L_8 = d_8 - d_3$ | 5 | 4.03 |

$\Delta L_6 < \Delta L_4 < \Delta L_5 < \Delta L_7 < \Delta L_8$ — 540

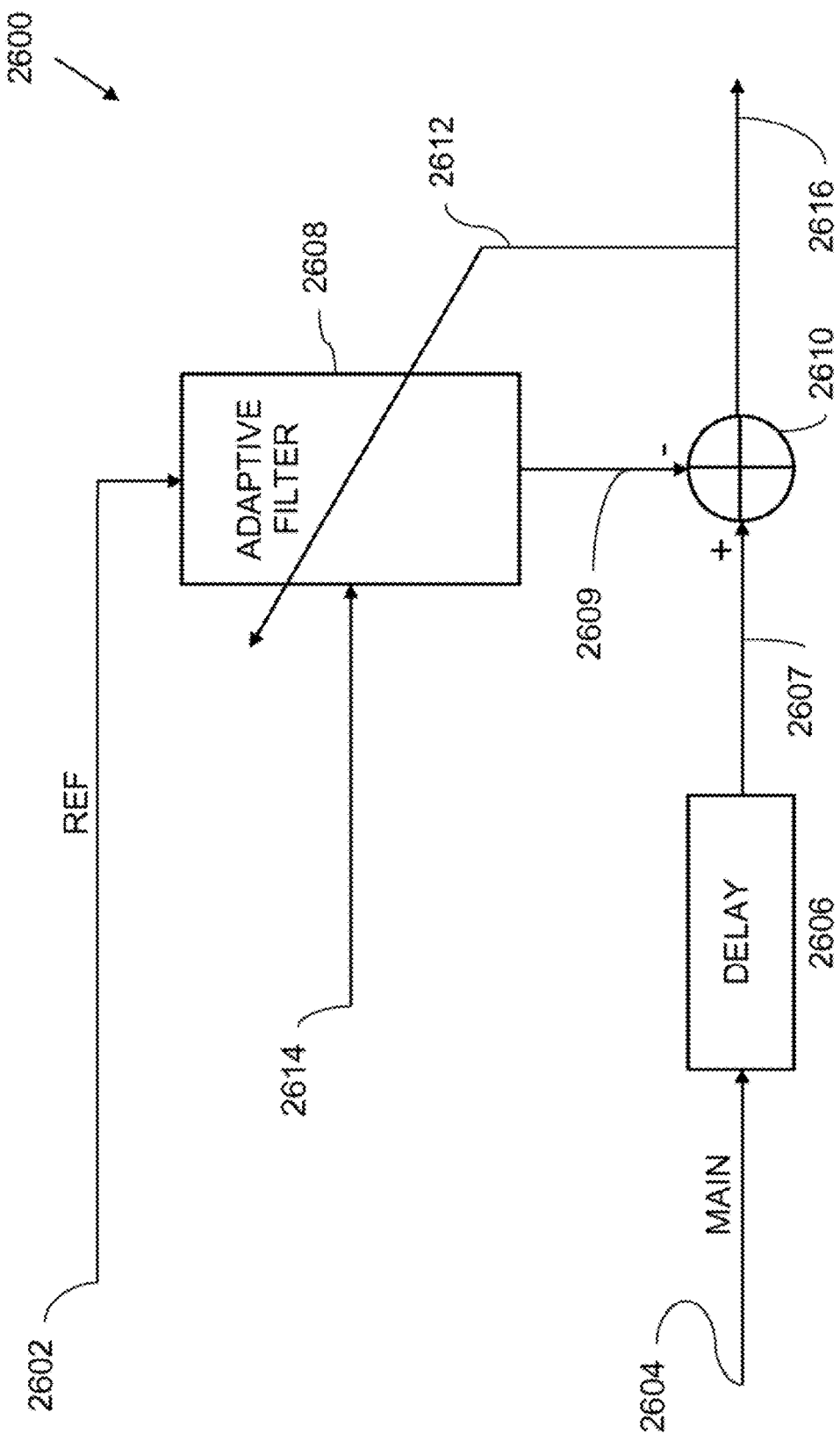

FIGURE 28E

| X 2895a | Y=X 2895b | Y=Log₁₀(X) 2895c | Y=ln(X) 2895d | Y=Log₂(X) 2895e |
|---|---|---|---|---|
| 0.01 | 0.01 | -2 | -4.60 | -6.64 |
| 0.10 | 0.10 | -1 | -2.30 | -3.32 |
| 1.00 | 1.00 | 0 | 0 | 0 |
| 10.00 | 10.00 | 1 | 2.30 | 3.32 |
| 100.0 | 100.0 | 2 | 4.60 | 6.64 |
| 1000.0 | 1000.0 | 3 | 6.90 | 9.96 |

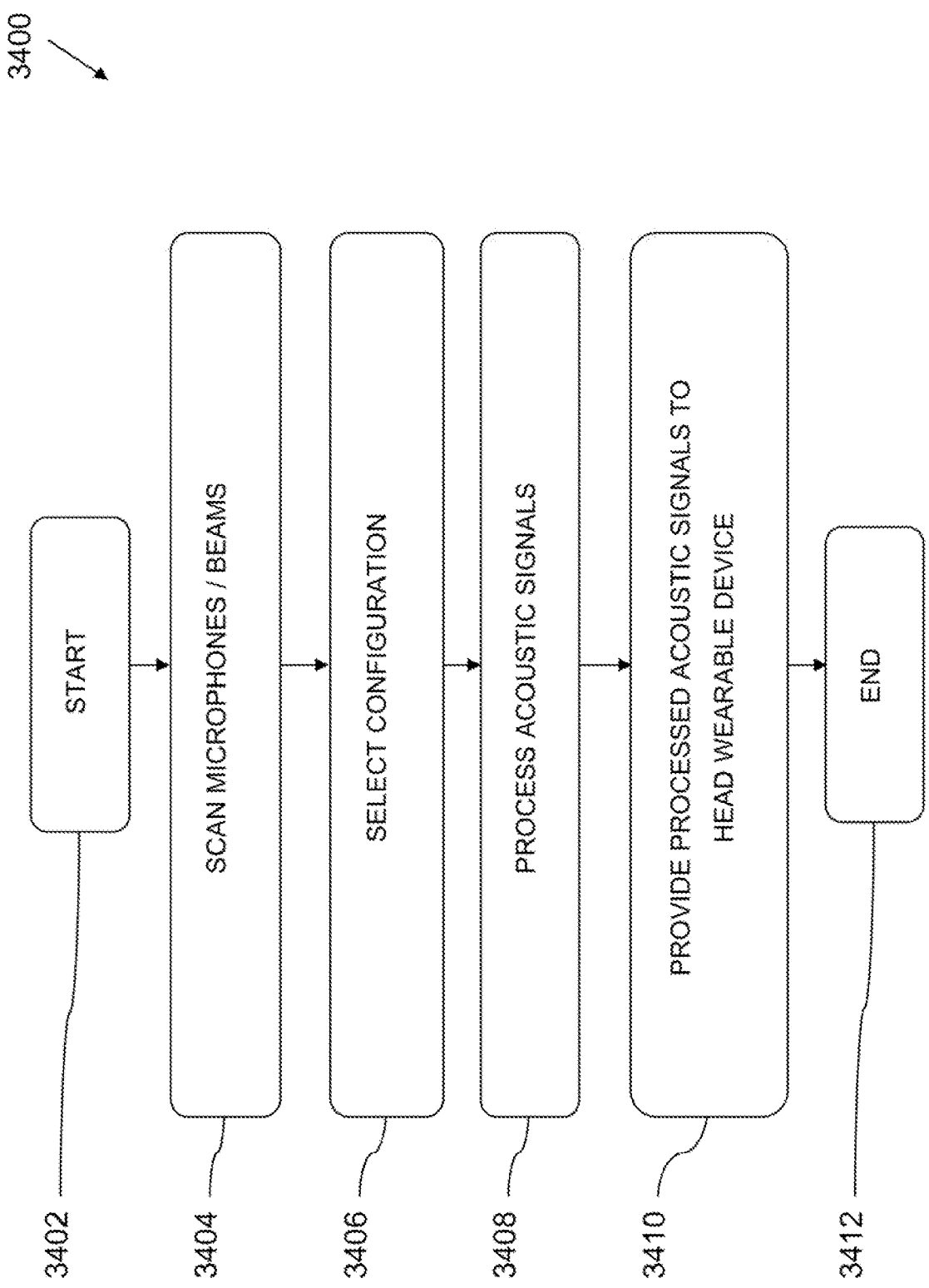

MICROPHONE CONFIGURATIONS FOR EYEWEAR DEVICES, SYSTEMS, APPARATUSES, AND METHODS

RELATED APPLICATIONS

This patent application is a continuation-in-part of U.S. Non-provisional patent application titled "HEAD WEARABLE ACOUSTIC SYSTEM WITH NOISE CANCELING MICROPHONE GEOMETRY APPARATUSES AND METHODS" filed on Oct. 18, 2015, Ser. No. 14/886,077, which is a continuation-in-part of U.S. Non-Provisional patent application titled "Dual Stage Noise Reduction Architecture For Desired Signal Extraction," filed on Mar. 12, 2014, Ser. No. 14/207,163 which claims priority from U.S. Provisional Patent Application titled "Noise Canceling Microphone Apparatus," filed on Mar. 13, 2013, Ser. No. 61/780,108 and from U.S. Provisional Patent Application titled "Systems and Methods for Processing Acoustic Signals," filed on Feb. 18, 2014, Ser. No. 61/941,088.

Patent application Ser. No. 14/886,077 is also a continuation-in-part of U.S. Non-Provisional patent application titled "Eye Glasses With Microphone Array," filed on Feb. 14, 2014, Ser. No. 14/180,994 which claims priority from U.S. Provisional Patent Application Ser. No. 61/780,108 filed on Mar. 13, 2013, and from U.S. Provisional Patent Application Ser. No. 61/839,211 filed on Jun. 25, 2013, and from U.S. Provisional Patent Application Ser. No. 61/839,227 filed on Jun. 25, 2013, and from U.S. Provisional Patent Application Ser. No. 61/912,844 filed on Dec. 6, 2013.

This patent application also claims priority to U.S. Provisional Patent Application titled "MICROPHONE CONFIGURATIONS FOR EYEWEAR DEVICES APPARATUSES AND METHODS" filed on Feb. 5, 2019 Ser. No. 62/801,618.

U.S. Provisional Patent Application Ser. No. 62/801,618 is hereby incorporated by reference. U.S. Provisional Patent Application Ser. No. 61/780,108 is hereby incorporated by reference. U.S. Provisional Patent Application Ser. No. 61/941,088 is hereby incorporated by reference. U.S. Non-Provisional patent application Ser. No. 14/207,163 is hereby incorporated by reference. U.S. Non-Provisional patent application Ser. No. 14/180,994 is hereby incorporated by reference. U.S. Provisional Patent Application Ser. No. 61/839,211 is hereby incorporated by reference. U.S. Provisional Patent Application Ser. No. 61/839,227 is hereby incorporated by reference. U.S. Provisional Patent Application Ser. No. 61/912,844 is hereby incorporated by reference.

BACKGROUND OF THE INVENTION

1. Field of Invention

The invention relates generally to wearable devices which detect and process acoustic signal data and more specifically to reducing noise in head wearable acoustic systems and to assist a user's hearing.

2. Art Background

Acoustic systems employ acoustic sensors such as microphones to receive audio signals. Often, these systems are used in real world environments which present desired audio and undesired audio (also referred to as noise) to a receiving microphone simultaneously. Such receiving microphones are part of a variety of systems such as a mobile phone, a handheld microphone, a hearing aid, etc. These systems often perform speech recognition processing on the received acoustic signals. Simultaneous reception of desired audio and undesired audio have a negative impact on the quality of the desired audio. Degradation of the quality of the desired audio can result in desired audio which is output to a user and is hard for the user to understand. Degraded desired audio used by an algorithm such as in speech recognition (SR) or Automatic Speech Recognition (ASR) can result in an increased error rate which can render the reconstructed speech hard to understand. Either of which presents a problem.

Handheld systems require a user's fingers to grip and/or operate the device in which the handheld system is implemented. Such as a mobile phone for example. Occupying a user's fingers can prevent the user from performing mission critical functions. This can present a problem.

Undesired audio (noise) can originate from a variety of sources, which are not the source of the desired audio. Thus, the sources of undesired audio are statistically uncorrelated with the desired audio. The sources can be of a non-stationary origin or from a stationary origin. Stationary applies to time and space where amplitude, frequency, and direction of an acoustic signal do not vary appreciably. For, example, in an automobile environment engine noise at constant speed is stationary as is road noise or wind noise, etc. In the case of a non-stationary signal, noise amplitude, frequency distribution, and direction of the acoustic signal vary as a function of time and or space. Non-stationary noise originates for example, from a car stereo, noise from a transient such as a bump, door opening or closing, conversation in the background such as chit chat in a back seat of a vehicle, etc. Stationary and non-stationary sources of undesired audio exist in office environments, concert halls, football stadiums, airplane cabins, everywhere that a user will go with an acoustic system (e.g., mobile phone, tablet computer etc. equipped with a microphone, a headset, an ear bud microphone, etc.) At times, the environment that the acoustic system is used in is reverberant, thereby causing the noise to reverberate within the environment, with multiple paths of undesired audio arriving at the microphone location. Either source of noise, i.e., non-stationary or stationary undesired audio, increases the error rate of speech recognition algorithms such as SR or ASR or can simply make it difficult for a system to output desired audio to a user which can be understood. All of this can present a problem.

Various noise cancellation approaches have been employed to reduce noise from stationary and non-stationary sources. Existing noise cancellation approaches work better in environments where the magnitude of the noise is less than the magnitude of the desired audio, e.g., in relatively low noise environments. Spectral subtraction is used to reduce noise in speech recognition algorithms and in various acoustic systems such as in hearing aids. Systems employing Spectral Subtraction do not produce acceptable error rates when used in Automatic Speech Recognition (ASR) applications when a magnitude of the undesired audio becomes large. This can present a problem.

In addition, existing algorithms, such as Spectral Subtraction, etc., employ non-linear treatment of an acoustic signal. Non-linear treatment of an acoustic signal results in an output that is not proportionally related to the input. Speech Recognition (SR) algorithms are developed using voice signals recorded in a quiet environment without noise. Thus, speech recognition algorithms (developed in a quiet environment without noise) produce a high error rate when non-linear distortion is introduced in the speech process through non-linear signal processing. Non-linear treatment of acoustic signals can result in non-linear distortion of the desired audio which disrupts feature extraction which is necessary for speech recognition, this results in a high error rate. All of which can present a problem.

Various methods have been used to try to suppress or remove undesired audio from acoustic systems, such as in Speech Recognition (SR) or Automatic Speech Recognition (ASR) applications for example. One approach is known as a Voice Activity Detector (VAD). A VAD attempts to detect when desired speech is present and when undesired speech is present. Thereby, only accepting desired speech and treating as noise by not transmitting the undesired speech. Traditional voice activity detection only works well for a single sound source or a stationary noise (undesired audio) whose magnitude is small relative to the magnitude of the desired audio. Therefore, traditional voice activity detection renders a VAD a poor performer in a noisy environment. Additionally, using a VAD to remove undesired audio does not work well when the desired audio and the undesired audio are arriving simultaneously at a receive microphone. This can present a problem.

Acoustic systems used in noisy environments with a single microphone present a problem in that desired audio and undesired audio are received simultaneously on a single channel. Undesired audio can make the desired audio unintelligible to either a human user or to an algorithm designed to use received speech such as a Speech Recognition (SR) or an Automatic Speech Recognition (ASR) algorithm. This can present a problem. Multiple channels have been employed to address the problem of the simultaneous reception of desired and undesired audio. Thus, on one channel, desired audio and undesired audio are received and on the other channel an acoustic signal is received which also contains undesired audio and desired audio. Over time the sensitivity of the individual channels can drift which results in the undesired audio becoming unbalanced between the channels. Drifting channel sensitivities can lead to inaccurate removal of undesired audio from desired audio. Non-linear distortion of the original desired audio signal can result from processing acoustic signals obtained from channels whose sensitivities drift over time. This can present a problem.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

FIG. 3B illustrates signal-to-noise ratio difference measurements for main microphone as located in FIG. 3A, according to embodiments of the invention.

FIG. 4B illustrates signal-to-noise ratio difference measurements for main microphone as located in FIG. 4A, according to embodiments of the invention.

FIG. 5B illustrates signal-to-noise ratio difference measurements for main microphone as located in FIG. 5A, according to embodiments of the invention.

FIG. 26 illustrates multi-channel adaptive filtering according to embodiments of the invention.

FIG. 28E illustrates different functions to provide compression according to embodiments of the invention.

FIG. 34 illustrates processing acoustic signals from an array of microphones configured with a head wearable device, according to embodiments of the invention.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

Apparatuses and methods are described for detecting and processing acoustic signals containing both desired audio and undesired audio within a head wearable device. In one or more embodiments, noise cancellation architectures combine multi-channel noise cancellation and single channel noise cancellation to extract desired audio from undesired audio. In one or more embodiments, multi-channel acoustic signal compression is used for desired voice activity detection. In one or more embodiments, acoustic channels are auto-balanced. In one or more embodiments, a system automatically selects a subset of microphones for acoustic signal extraction from an array of possible microphones. In one or more embodiments, a user is provided with hearing assistance to facilitate hearing sounds from a local environment.

Figure 1:
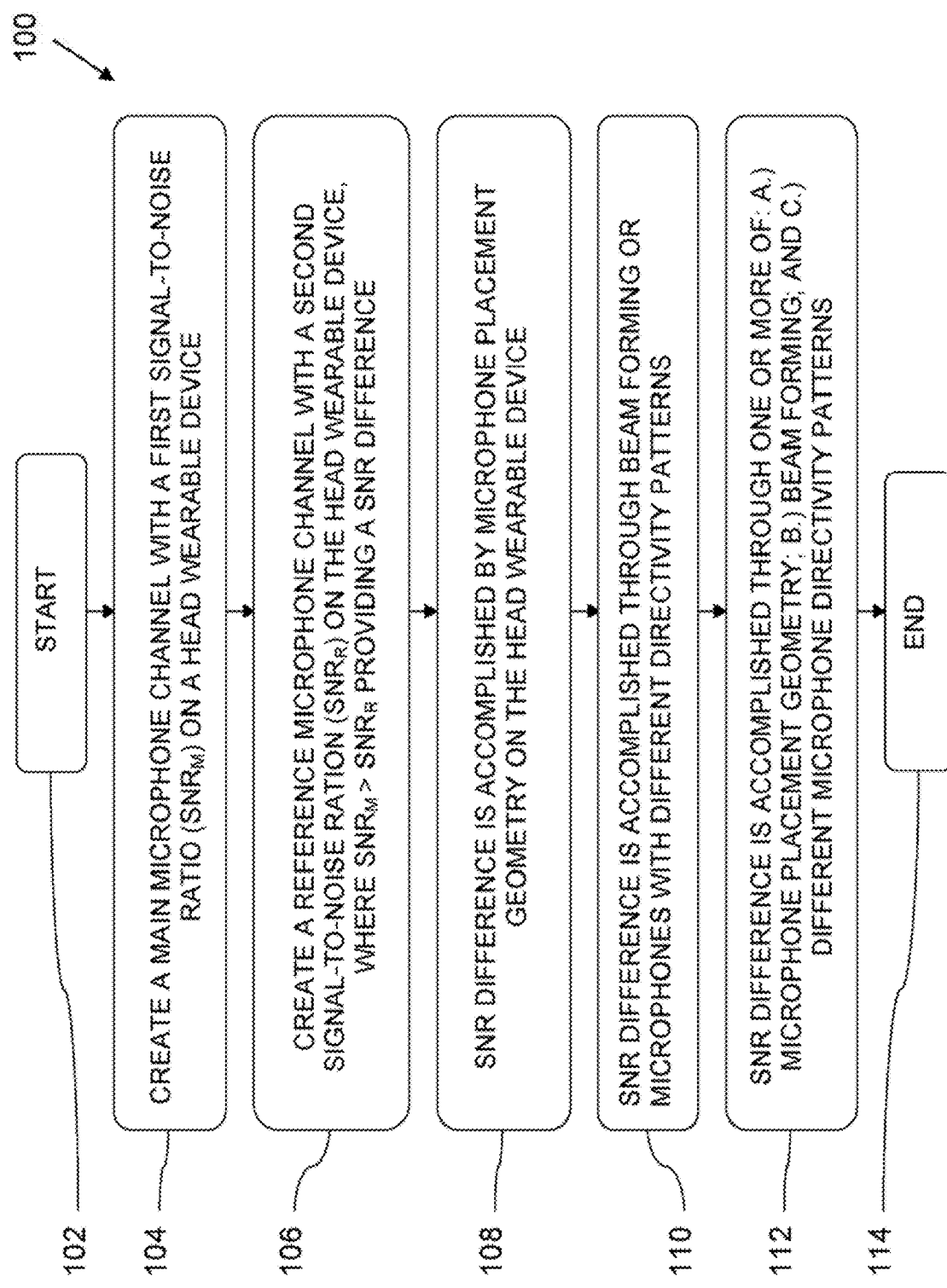
FIG. 1 illustrates a general process for microphone configuration on a head wearable device according to embodiments of the invention.

FIG. 1 illustrates a general process at 100 for microphone configuration on a head wearable device according to embodiments of the invention. With reference to FIG. 1, a process starts at a block 102. At a block 104, a "main" or "primary" microphone channel is created on a head wearable device using one or more microphones. The main microphone(s) is positioned to optimize reception of desired audio thereby enhancing a first signal-to-noise ratio associated with the main microphone, indicated as $SNR_M$. At a block 106, a reference microphone channel is created on the head wearable device using one or more microphones. The reference microphone(s) is positioned on the head wearable device to provide a lower signal-to-noise ratio with respect to detection of desired audio from the user, thereby resulting in a second signal-to-noise ratio indicated as $SNR_R$. Thus, at a block 108 a signal-to-noise ratio difference is accomplished by placement geometry of the microphones on the head wearable device, resulting in the first signal-to-noise ratio $SNR_M$ being greater than the second signal-to-noise ratio $SNR_R$.

At a block 110 a signal-to-noise ratio difference is accomplished through beamforming by creating different response patterns (directivity patterns) for the main microphone channel and the reference microphone channel(s). Utilizing different directivity patterns to create a signal-to-noise ratio difference is described more fully below in conjunction with the figures that follow.

In various embodiments, at a block 112 a signal-to-noise ratio difference is accomplished through a combination of one or more of microphone placement geometry, beamforming, and utilizing different directivity patterns for the main and reference channels. At a block 114 the process ends.

Figure 2:
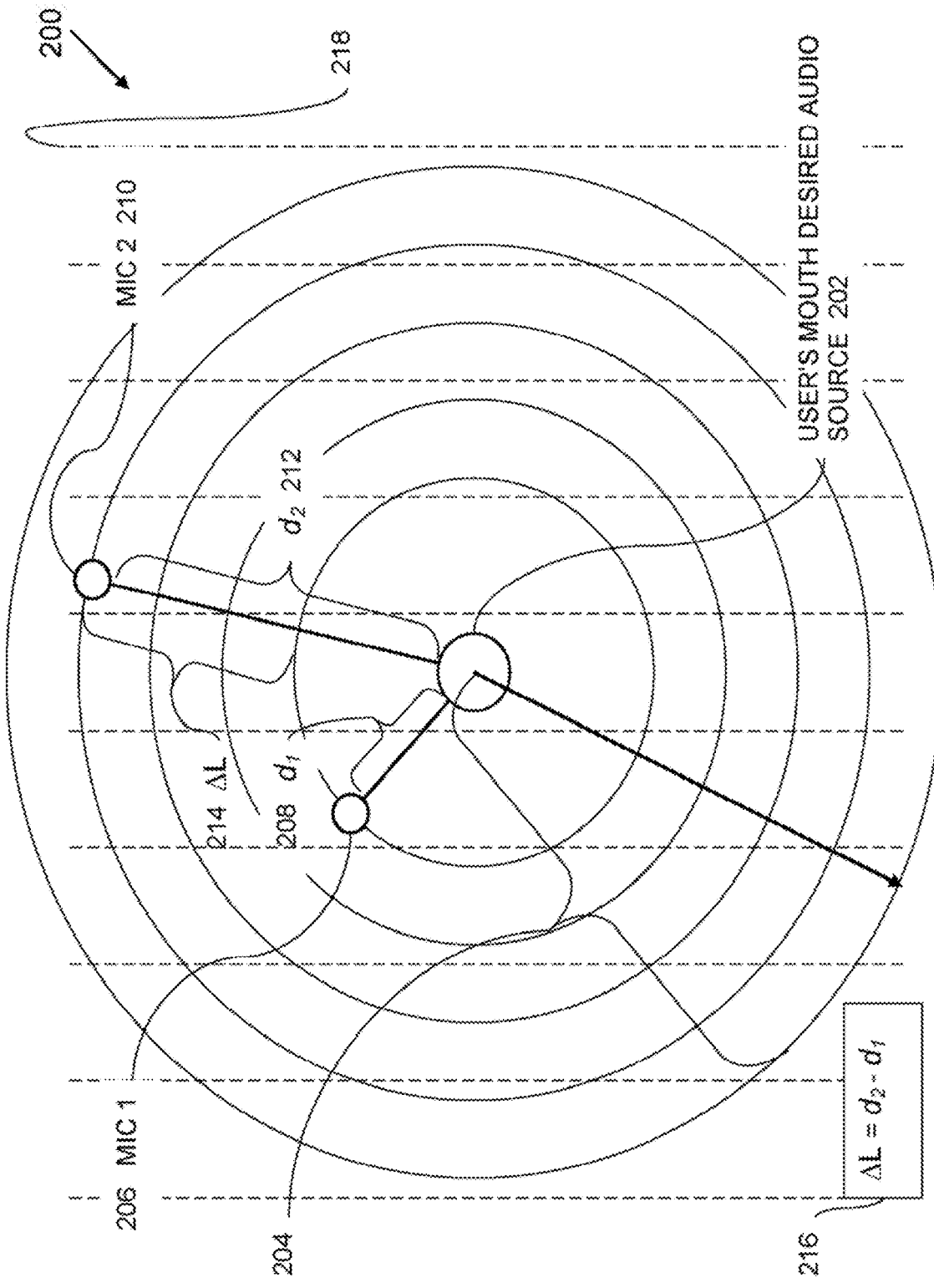
FIG. 2 illustrates microphone placement geometry according to embodiments of the invention.

FIG. 2 illustrates, generally at 200, microphone placement geometry according to embodiments of the invention. With reference to FIG. 200, a source of desired audio, a user's mouth is indicated at 202, from which desired audio 204 emanates. The source 202 provides desired audio 204 to the microphones mounted on a head wearable device. A first microphone 206 is positioned at a distance indicated by $d_1$ 208 from the source 202. A second microphone 210 is positioned at a distance indicated by $d_2$ 212 from the source 202. The system of 200 is also exposed to undesired audio as indicated by 218.

With respect to the source 202, the first microphone 206 and the second microphone 210 are at different acoustic distances from the source 202 as represented by ΔL at 214. The difference in acoustic distances ΔL 214 is given by equation 216. As used in this description of embodiments, the distances $d_1$ and $d_2$ represent the paths that the acoustic wave travels to reach the respective microphones 206 and 210. Thus, these distances might be linear or they might be curved depending on the particular location of a microphone on a head wearable device and the acoustic frequency of interest. For clarity in illustration, these paths and the corresponding distances have been indicated with straight lines however, no limitation is implied thereby.

Undesired audio 218 typically results from various sources that are located at distances that are much greater than the distances dr and $d_2$. For example, construction noise, car noise, airplane noise, etc. all originate at distances that are typically several orders of magnitude larger than $d_1$ and $d_2$. Thus, undesired audio 218 is substantially correlated at microphone locations 206 and 210 or is at least received at a fairly uniform level at each location. The difference in acoustic distance ΔL at 214 decreases an amplitude of the desired audio 204 received at the second microphone 210 relative to the first microphone 208, due to various mechanisms. One such mechanism is, for example, spherical spreading which causes the desired audio signal to fall off as a function of $1/r^2$, where r is the distance (e.g. 208 or 212) between a source (e.g., 202) and a receive location (e.g., 206 or 210). Reduction in desired audio at the second microphone location 210 decreases a signal-to-noise ratio at 210 relative to 206 since the noise amplitude is substantially the same at each location but the signal amplitude is decreased at 210 relative to the amplitude received at 206. Another related mechanism to path length is a difference in an acoustic impendence along one path versus another, thereby resulting in a curved acoustic path instead of a straight path. Collectively, the mechanisms combine to decrease an amplitude of desired audio received at a reference microphone location relative to a main microphone location. Thus, placement geometry is used to provide a signal-to-noise ratio difference between two microphone locations which is used by the noise cancellation system, which is described further below, to reduce undesired audio from the main microphone channel.

Microphone placement geometry admits various configurations for placement of a primary microphone and a reference microphone. In various embodiments, a general microphone placement methodology is described and presented in conjunction with FIG. 3A through FIG. 5C immediately below which permit microphones to be placed in various locations on a headwear device.

Figure 3A:
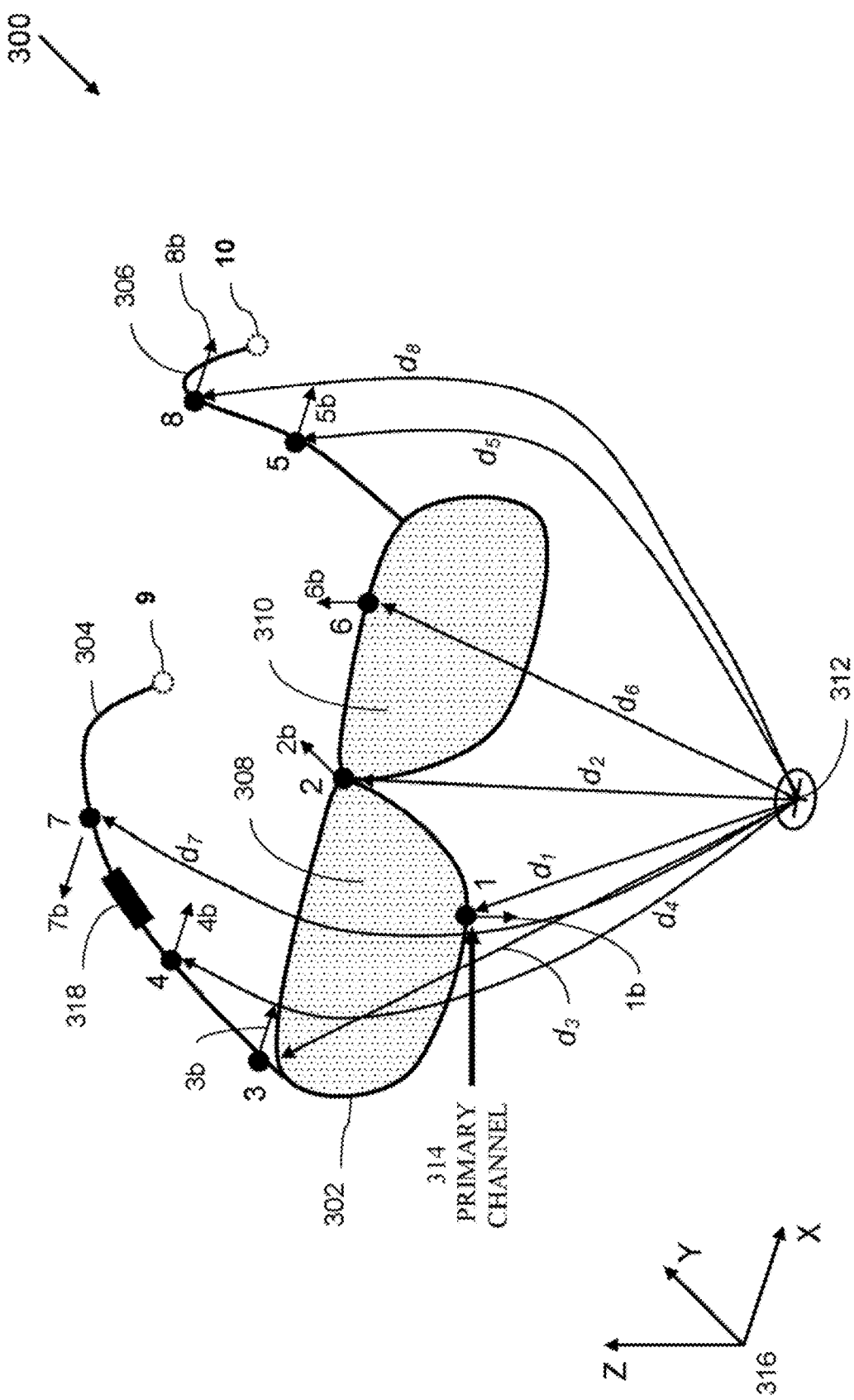
FIG. 3A illustrates generalized microphone placement with a primary microphone at a first location according to embodiments of the invention.

FIG. 3A illustrates, generally at 300, generalized microphone placement with a primary microphone at a first location according to embodiments of the invention. With reference to FIG. 3A, a head wearable device 302 is illustrated. As used in this detailed description of embodiments a head wearable device can be any of the devices that are configured to wear on a user's head such as but not limited to glasses, goggles, a helmet, a visor, a head band, etc. In the discussion presented in conjunction with FIG. 3A through FIG. 5C immediately below it is recognized that this discussion is equally applicable to any head wear device, such as those shown in FIG. 8 through FIG. 19 as well as to those head wearable devices not specifically shown in the figures herein. Thus, embodiments of the invention are applicable to head wearable devices that are as of yet unnamed or yet to be invented.

Referring back to FIG. 3A, in one embodiment, the head wearable device has a frame 302 with attached temple 304 and temple 306, a glass 308, and a glass 310. In various embodiments, the head wearable device 302 is a pair of glasses that are worn on a user's head. A number of microphones are located on the head wearable device 302, such as a microphone 1, a microphone 2, a microphone 3, a microphone 4, a microphone 5, a microphone 6, a microphone 7, a microphone 8, and optionally a microphone 9 and a microphone 10. In various embodiments, the head wearable device including frame 302/temples 304 and 306 as illustrated, can be sized to include electronics 318 for signal processing as described further below. Electronics 318 provides electrical coupling to the microphones mounted on the head wearable device 302.

The head wearable device 302 has an internal volume, defined by its structure, within which electronics 318 can be mounted. Alternatively electronics 318 can be mounted externally to the structure. In one or more embodiments, an access panel is provided to access the electronics 318. In other embodiments no access door is provided explicitly but the electronics 318 can be contained within the volume of the head wearable device 302. In such cases, the electronics 318 can be inserted prior to assembly of a head wearable device where one or more parts interlock together thereby forming a housing which captures the electronics 318 therein. In yet other embodiments, a head wearable device is molded around electronics 318 thereby encapsulating the electronics 318 within the volume of the head wearable device 302. In various non-limiting embodiments, electronics 318 include an adaptive noise cancellation unit, a single channel noise cancellation unit, a filter control, a power supply, a desired voice activity detector, a filter, etc. Other components of electronics 118 are described below in the figures that follow.

The head wearable device 302 can include a switch (not shown) which is used to power up or down the head wearable device 302. The head wearable device 302 can contain a data processing system within its volume for processing acoustic signals which are received by the microphones associated therewith. The data processing system can contain one or more of the elements of the system illustrated in FIG. 31 described further below. Thus, the illustrations of FIG. 3A through FIG. 5C do not limit embodiments of the invention.

The headwear device of FIG. 3A illustrates that microphones can be placed in any location on the device. The ten locations chosen for illustration within the figures are selected merely for illustration of the general principles of placement geometry and do not limit embodiments of the invention. Accordingly, microphones can be used in different locations other than those illustrated and different microphones can be used in the various locations. For the purpose of illustration and without any limitation, the measurements that were made in conjunction with the illustrations of FIG. 3A through FIG. 5C omni-directional microphones were used. In other embodiments, directive microphones are used. In the example configuration used for the signal-to-noise ratio measurements, each microphone was mounted within a housing and each housing had a port opening to the environment. A direction for a port associated with microphone 1 is shown by arrow 1b. A direction for a port associated with microphone 2 is shown by arrow 2b. A direction for a port associated with microphone 3 is shown by arrow 3*b*. A direction for a port associated with microphone 4 is shown by arrow 4*b*. A direction for a port associated with microphone 5 is shown by arrow 5*b*. A direction for a port associated with microphone 6 is shown by arrow 6*b*. A direction for a port associated with microphone 7 is shown by arrow 7*b*. A direction for a port associated with microphone 8 is shown by arrow 8*b*.

A user's mouth is illustrated at 312 and is analogous to the source of desired audio shown in FIG. 2 at 202. An acoustic path length (referred to herein as acoustic distance or distance) from the user's mouth 312 to each microphone is illustrated with an arrow from the user's mouth 312 to the respective microphone locations. For example, $d_1$ indicates the acoustic distance from the user's mouth 312 to microphone 1. $d_2$ indicates the acoustic distance from the user's mouth 312 to microphone 2. $d_3$ indicates the acoustic distance from the user's mouth 312 to microphone 3. $d_4$ indicates the acoustic distance from the user's mouth 312 to microphone 4. $d_5$ indicates the acoustic distance from the user's mouth 312 to microphone 5. $d_6$ indicates the acoustic distance from the user's mouth 312 to microphone 6. $d_7$ indicates the acoustic distance from the user's mouth 312 to microphone 7. $d_8$ indicates the acoustic distance from the user's mouth 312 to microphone 8. Similarly, optional microphone 9 and microphone 10 have acoustic distances as well; however they are not so labeled to preserve clarity in the figure.

In FIG. 3A, microphones 1, 2, 3, and 6 and the user's mouth 312 fall substantially in an X-Z plane (see coordinate system 316), the corresponding acoustic distances $d_1$, $d_2$, $d_3$, and $d_6$ have been indicated with substantially straight lines. The paths to microphones 4, 5, 7, and 8, i.e., $d_4$, $d_5$, $d_7$, and $d_8$ are represented as curved paths which reflect the fact that the user's head is not transparent to the acoustic field. Thus, in such cases, the acoustic path is somewhat curved. In general, the acoustic path between the source of desired audio and a microphone on the head wearable device can be linear or curved. As long as the path length is sufficiently different between a main microphone and a reference microphone the requisite signal-to-noise ratio difference will be obtained which is needed by the noise cancellation system in order to achieve an acceptable level of noise cancellation.

Figure 3C:
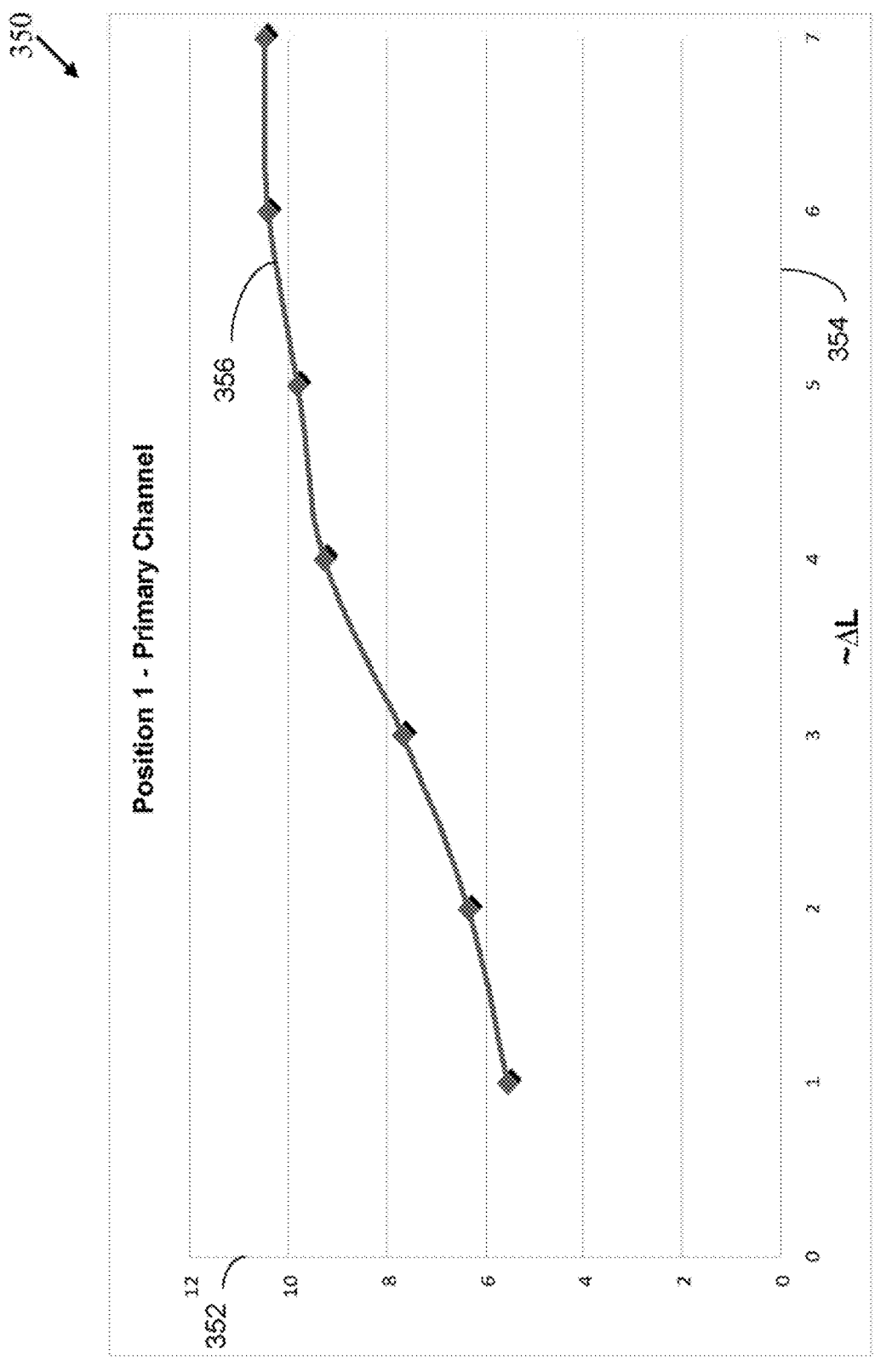
FIG. 3C illustrates signal-to-noise ratio difference versus increasing microphone acoustic separation distance for the data shown in FIG. 3B according to embodiments of the invention.

To make the measurements presented in FIG. 3B and FIG. 3C, an acoustic test facility was used to measure signal-to-noise ratio difference between primary and reference microphone locations. The test facility included a manikin with a built-in speaker was used to simulate a user wearing a head wearable device. A speaker positioned at a location of the user's mouth was used to produce the desired audio signal. The manikin was placed inside of an anechoic chamber of the acoustic test facility. Background noise was generated within the anechoic chamber with an array of speakers. A pink noise spectrum was used during the measurements; however, other weightings in frequency can be used for the background noise field. During these measurements, the spectral amplitude level of the background noise was set to 75 dB/uPa/Hz. A head wearable device was placed on the manikin. During the test, microphones were located at the positions shown in FIG. 3A on the head wearable device. A microphone for a main or primary channel is selected as microphone 1 for the first sequence of measurements which are illustrated in FIG. 3B and FIG. 3C directly below.

The desired audio signal consisted of the word "Camera." This word was transmitted through the speaker in the manikin. The received signal corresponding to the word "Camera" at microphone 1 was processed through the noise cancellation system (as described below in the figures that follow), gated in time, and averaged to produce the "signal" amplitude corresponding with microphone 1. The corresponding signal corresponding to the word "Camera" was measured in turn at each of the other microphones at locations 2, 3, 4, 5, 6, 7, and 8. Similarly, at each microphone location, background noise spectral levels were measured. With these measurements, signal-to-noise ratios were computed at each microphone location and then signal-to-noise ratio difference was computed for microphone pairs as shown in the figures directly below.

FIG. 3B illustrates, generally at 320, signal-to-noise ratio difference measurements for a main microphone as located in FIG. 3A, according to embodiments of the invention. With reference to FIG. 3B and FIG. 3A, microphone 1 is used as the main or primary microphone at 314. A variety of locations were then used to place the reference microphone, such as microphone 2, microphone 3, microphone 6, microphone 4, microphone 5, microphone 7, and microphone 8. In FIG. 3B, column 322 indicates the microphone pair used for a set of measurements. A column 324 indicates the approximate difference in acoustic path length between the given microphone pair of column 322. Approximate acoustic path length difference ~ΔL is given by equation 216 in FIG. 2. Column 326 lists a non-dimensional number ranging from 1 to 7 for the seven different microphone pairs used for signal-to-noise ratio measurements. A column 328 lists the signal-to-noise ratio difference for the given microphone pair listed in the column 322. Each row, 330, 332, 334, 336, 338, 340, and 342 lists a different microphone pair, where the reference microphone has changed while the main microphone 314 is held constant as microphone 1. Note that the approximate difference in acoustic path lengths for the various microphone pairs can be arranged in increasing order as shown by equation 344. The microphone pairs have been arranged in the rows 330-342 in increasing approximate acoustic path length difference 324 according to equation 344. Signal-to-noise ratio difference varies from 5.55 dB for microphone 2 used as a reference microphone to 10.48 dB when microphone 8 is used as the reference microphone.

FIG. 3C illustrates, generally at 350, signal-to-noise ratio difference versus increasing microphone acoustic separation distance for the data shown in FIG. 3B according to embodiments of the invention. With reference to FIG. 3C, signal-to-noise ratio difference is plotted on a vertical axis at 352 and the non-dimensional X value from column 326 (FIG. 3B) is plotted on the horizontal axis at 354. Note, as described above, the non-dimensional X value is representative of approximate acoustic path length difference ~ΔL. The X axis 354 does not correspond exactly with ~ΔL, but it is related to ~ΔL because the data have been arranged and plotted in increasing approximate acoustic path length difference ~ΔL. Such ordering of the data helps to illustrate the character of signal-to-noise ratio difference described above in conjunction with FIG. 2, i.e., signal-to-noise ratio difference will increase with increasing acoustic path length difference between main and reference microphones. This behavior is discerned by observing that signal-to-noise ratio difference is increasing as a function of ~ΔL, with a curve 356 which plots data from columns 328 as a function of the data from column 326 (FIG. 3B).

Figure 4A:
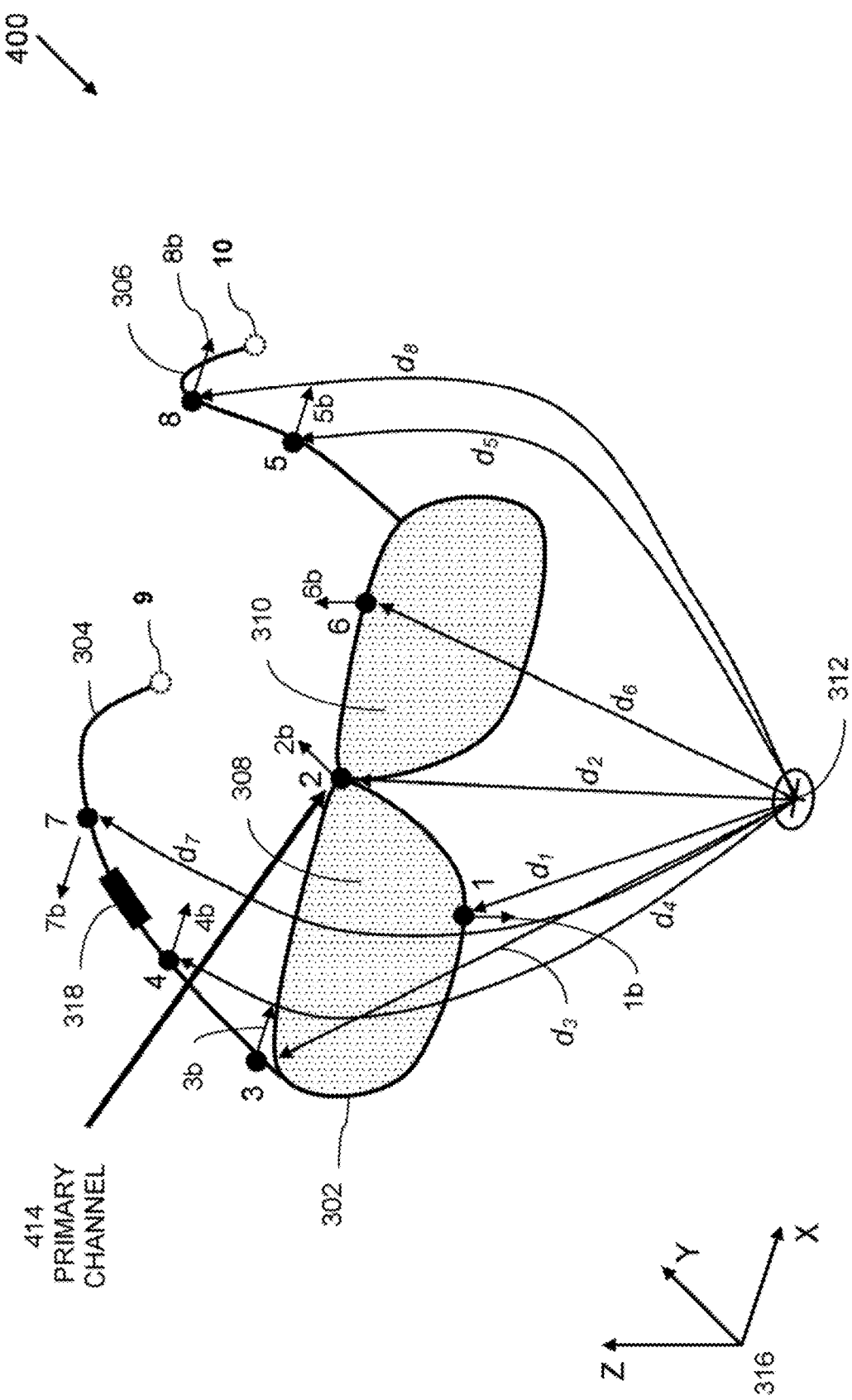
FIG. 4A illustrates generalized microphone placement with a primary microphone at a second location according to embodiments of the invention.

FIG. 4A illustrates, generally at 420 generalized microphone placements with a primary microphone at a second location according to embodiments of the invention. In FIG. 4A, the second location for the main microphone 414 is the location occupied by microphone 2. The tests described above were repeated with microphone 2 as the main microphone and the reference microphone locations were alternatively those of microphone 6, microphone 3, microphone 4, microphone 5, microphone 7, and microphone 8. These data are described below in conjunction with FIG. 4B and FIG. 4C.

FIG. 4B illustrates signal-to-noise ratio difference measurements for main microphone as located in FIG. 4A, according to embodiments of the invention. With reference to FIG. 4B and FIG. 4A, microphone 2 is used as the main or primary microphone 414. A variety of locations were then used to place the reference microphone, such as microphone 6, microphone 3, microphone 4, microphone 5, microphone 7, and microphone 8. In FIG. 4B, column 422 indicates the microphone pair used for a set of measurements. A column 424 indicates the approximate difference in acoustic path length between the given microphone pair of column 422. Approximate acoustic path length difference $\sim\Delta L$ is given by equation 216 in FIG. 2. Column 426 lists a non-dimensional number ranging from 1 to 6 for the six different microphone pairs used for signal-to-noise ratio measurements. A column 428 lists the signal-to-noise ratio difference for the given microphone pair listed in the column 422. Each row, 430, 432, 434, 336, 438, and 440 lists a different microphone pair, where the reference microphone has changed while the main microphone 414 is held constant as microphone 2. Note that the approximate difference in acoustic path lengths for the various microphone pairs can be arranged in increasing order as shown by equation 442. The microphone pairs have been arranged in the rows 430-440 in increasing approximate acoustic path length difference 424 according to equation 442. Signal-to-noise ratio difference varies from 1.2 dB for microphone 6 used as a reference microphone to 5.2 dB when microphone 8 is used as the reference microphone.

Figure 4C:
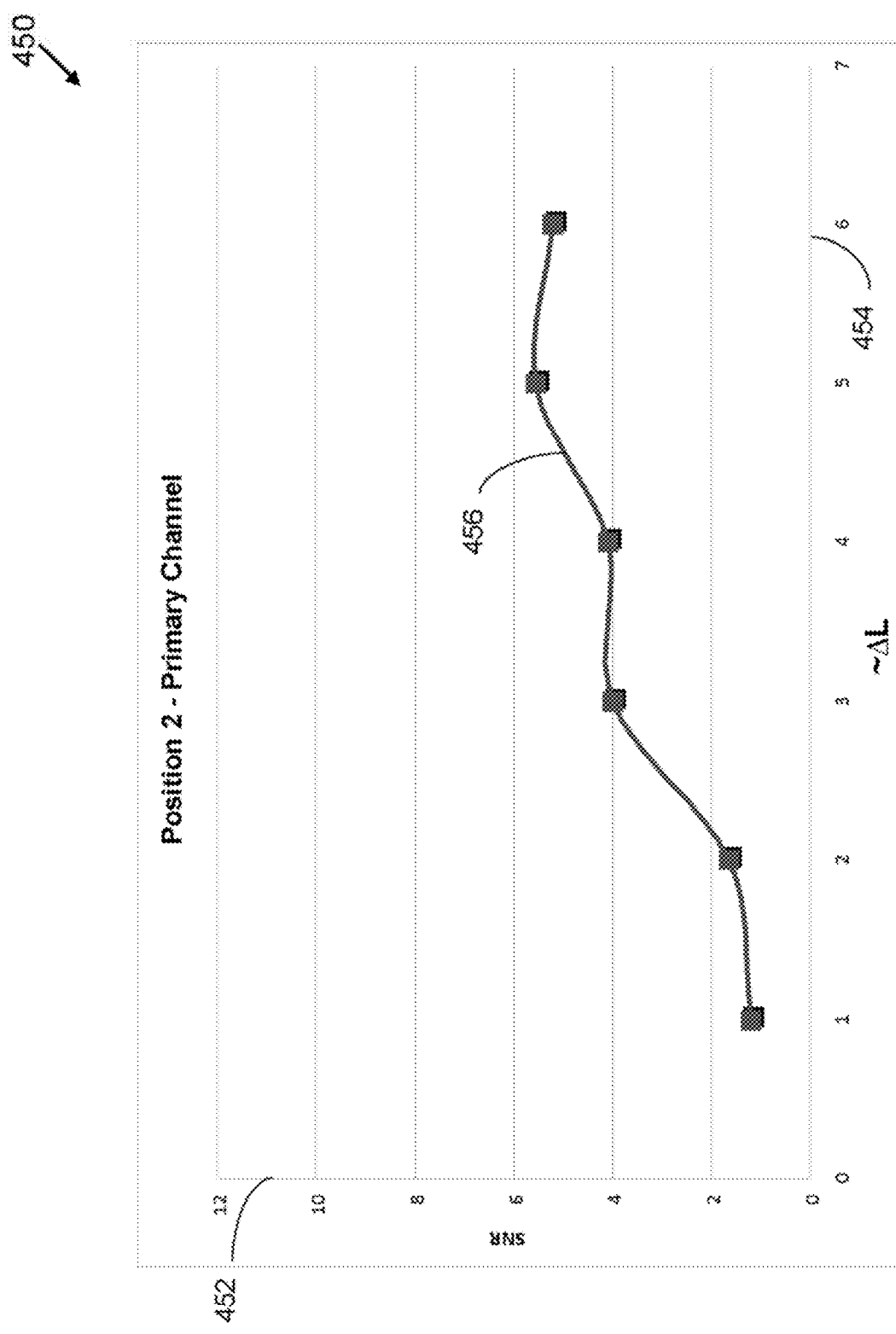
FIG. 4C illustrates signal-to-noise ratio difference versus increasing microphone acoustic separation distance for the data shown in FIG. 4B according to embodiments of the invention.

FIG. 4C illustrates signal-to-noise ratio difference versus increasing microphone acoustic separation distance for the data shown in FIG. 4B according to embodiments of the invention. With reference to FIG. 4C, signal-to-noise ratio difference is plotted on a vertical axis at 452 and the non-dimensional X value from column 426 (FIG. 4B) is plotted on the horizontal axis at 454. Note, as described above, the non-dimensional X value is representative of approximate acoustic path length difference $\sim\Delta L$. The X axis 454 does not correspond exactly with $\sim\Delta L$, but it is related to $\sim\Delta L$ because the data have been arranged and plotted in increasing approximate acoustic path length difference $\sim\Delta L$. Such ordering of the data helps to illustrate the character of signal-to-noise ratio difference described above in conjunction with FIG. 2, i.e., signal-to-noise ratio difference will increase with increasing acoustic path length difference between main and reference microphones. This behavior is discerned by observing that signal-to-noise ration difference is increasing as a function of $\sim\Delta L$, with a curve 456, which plots data from columns 428 as a function of the data from column 426 (FIG. 4B).

Figure 5A:
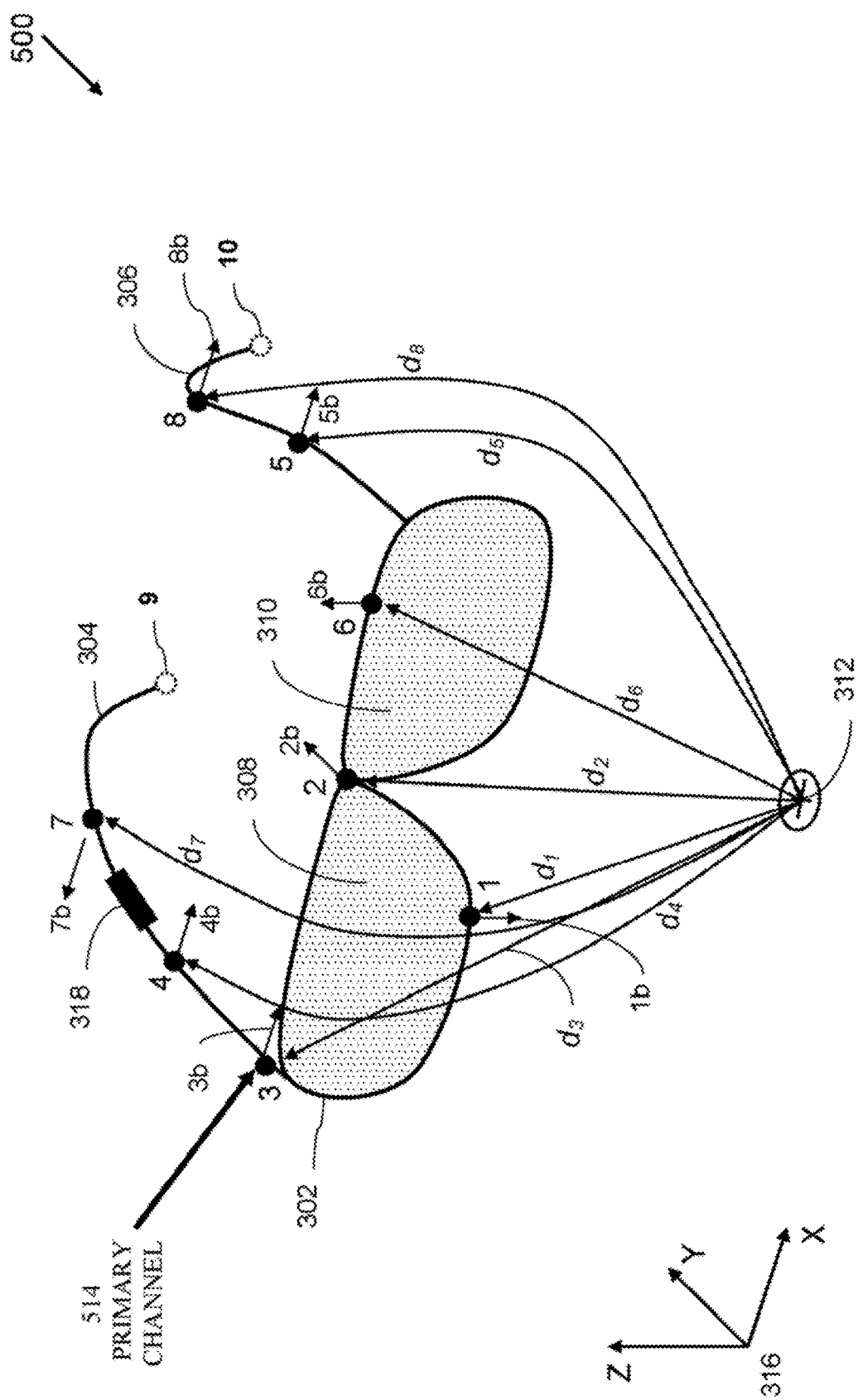
FIG. 5A illustrates generalized microphone placement with a primary microphone at a third location according to embodiments of the invention.

FIG. 5A illustrates generalized microphone placement with a primary microphone at a third location according to embodiments of the invention. In FIG. 5A, the third location for the main microphone 514 is the location occupied by microphone 3. The tests described above were repeated with microphone 3 as the main microphone and the reference microphone locations were alternatively those of microphone 6, microphone 4, microphone 5, microphone 7, and microphone 8. These data are described below in conjunction with FIG. 5B and FIG. 5C.

FIG. 5B illustrates signal-to-noise ratio difference measurements for main microphone as located in FIG. 5A, according to embodiments of the invention. With reference to FIG. 5B and FIG. 5A, microphone 3 is used as the main or primary microphone 514. A variety of locations were then used to place the reference microphone, such as microphone 6, microphone 4, microphone 5, microphone 7, and microphone 8. In FIG. 5B, column 522 indicates the microphone pair used for a set of measurements. A column 524 indicates the approximate difference in acoustic path length between the given microphone pair of column 522. Approximate acoustic path length difference $\sim\Delta L$ is given by equation 216 in FIG. 2. Column 526 lists a non-dimensional number ranging from 1 to 5 for the five different microphone pairs used for signal-to-noise ratio measurements. A column 528 lists the signal-to-noise ratio difference for the given microphone pair listed in the column 522. Each row, 530, 532, 534, 536, and 538 lists a different microphone pair, where the reference microphone has changed while the main microphone 514 is held constant as microphone 3. Note that the approximate difference in acoustic path lengths for the various microphone pairs can be arranged in increasing order as shown by equation 540. The microphone pairs have been arranged in the rows 530-538 in increasing approximate acoustic path length difference 524 according to equation 540. Signal-to-noise ratio difference varies from 0 dB for microphone 6 used as a reference microphone to 5.16 dB when microphone 7 is used as the reference microphone.

Figure 5C:
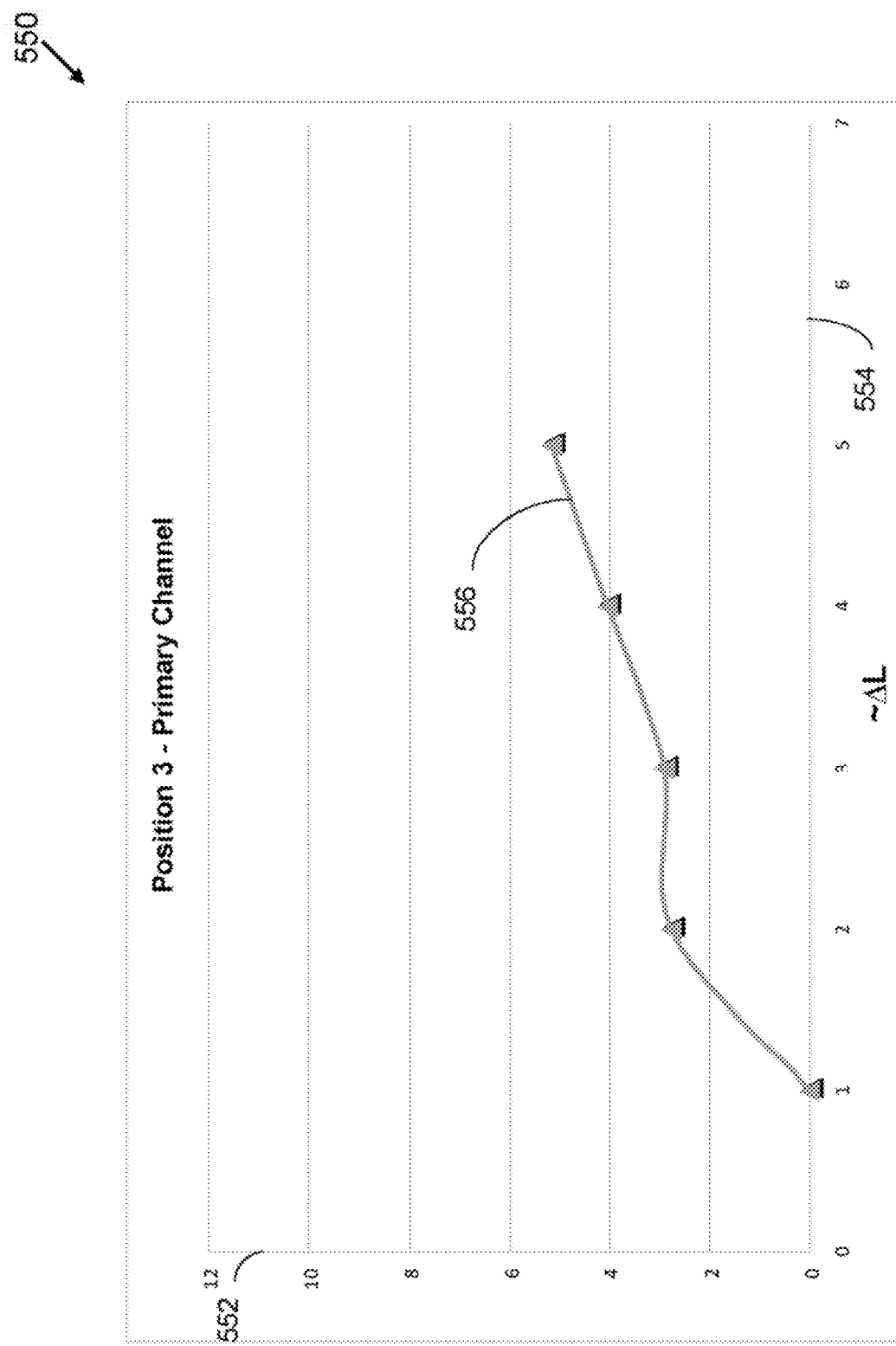
FIG. 5C illustrates signal-to-noise ratio difference versus increasing microphone acoustic separation distance for the data shown in FIG. 5B according to embodiments of the invention.

FIG. 5C illustrates signal-to-noise ratio difference versus increasing microphone acoustic separation distance for the data shown in FIG. 5B according to embodiments of the invention. With reference to FIG. 5C, signal-to-noise ratio difference is plotted on a vertical axis at 552 and the non-dimensional X value from column 526 (FIG. 5B) is plotted on the horizontal axis at 554. Note, as described above, the non-dimensional X value is representative of approximate acoustic path length difference $\sim\Delta L$. The X axis 554 does not correspond exactly with $\sim\Delta L$, but it is related to $\sim\Delta L$ because the data have been arranged and plotted in increasing approximate acoustic path length difference $\sim\Delta L$. Such ordering of the data helps to illustrate the character of signal-to-noise ratio difference described above in conjunction with FIG. 2, i.e., signal-to-noise ratio difference will increase with increasing acoustic path length difference between main and reference microphones. This behavior is discerned by observing that signal-to-noise ratio difference is increasing as a function of $\sim\Delta L$, with a curve 556, which plots data from columns 528 as a function of the data from column 526 (FIG. 5B).

Note that within the views presented in the figures above, specific locations for the microphones have been chosen for the purpose of illustration only. These locations do not limit embodiments of the invention. Other locations for microphones on a head wearable device are used in other embodiments.

Thus, as described above in conjunction with FIG. 1 block 108 and FIG. 2 through FIG. 5C, in various embodiments, microphone placement geometry is used to create an acoustic path length difference between two microphones and a corresponding signal-to-noise ratio difference between a main and a reference microphone. The signal-to-noise ratio difference can also be accomplished through the use of different directivity patterns for the main and reference microphones. In some embodiments beamforming is used to create different directivity patterns for a main and a reference channel. For example, in FIG. 5A, acoustic path lengths $d_3$ and $d_6$ are too similar in value, thus this choice of locations for the main and reference microphones did not produce an adequate signal-to-noise ratio difference (0 dB at column 528 row 530 FIG. 5B). In such a case, variation in microphone directivity pattern (one or both microphones) and/or beamforming can be used to create the needed signal-to-noise ratio difference between the main and the reference channels.

A directional microphone can be used to decrease reception of desired audio and/or to increase reception of undesired audio, thereby lowering a signal-to-noise ratio of a second microphone (reference microphone), which results in an increase in the signal-to-noise ratio difference between the primary and reference microphones. An example is illustrated in FIG. 3A using a second microphone (not shown) and the techniques taught in FIG. 6 and FIG. 7 below. In some embodiments, the second microphone can be substantially co-located with microphone 1. In other embodiments, the second microphone is located an equivalent distance from the source 312 as is the first microphone. In some embodiments, the second microphone is a directional microphone whose main response axis is substantially perpendicular to (or equivalently stated misaligned with) the acoustic path $d_1$. Thus, a null or a direction of lesser response to desired audio from 312 for the second microphone exists in the direction of desired audio $d_1$. This results in a decrease in the signal-to-noise ratio of the second microphone and an increase in a signal-to-noise ratio difference calculated between the first microphone and the second microphone. Note that the two microphones can be placed in any location on the head wearable device 302, which includes co-location as described above. In other embodiments, one or more microphone elements are used as inputs to a beamformer resulting in main and reference channels having different directivity patterns and a resulting signal-to-noise ratio difference there between.

Figure 6:
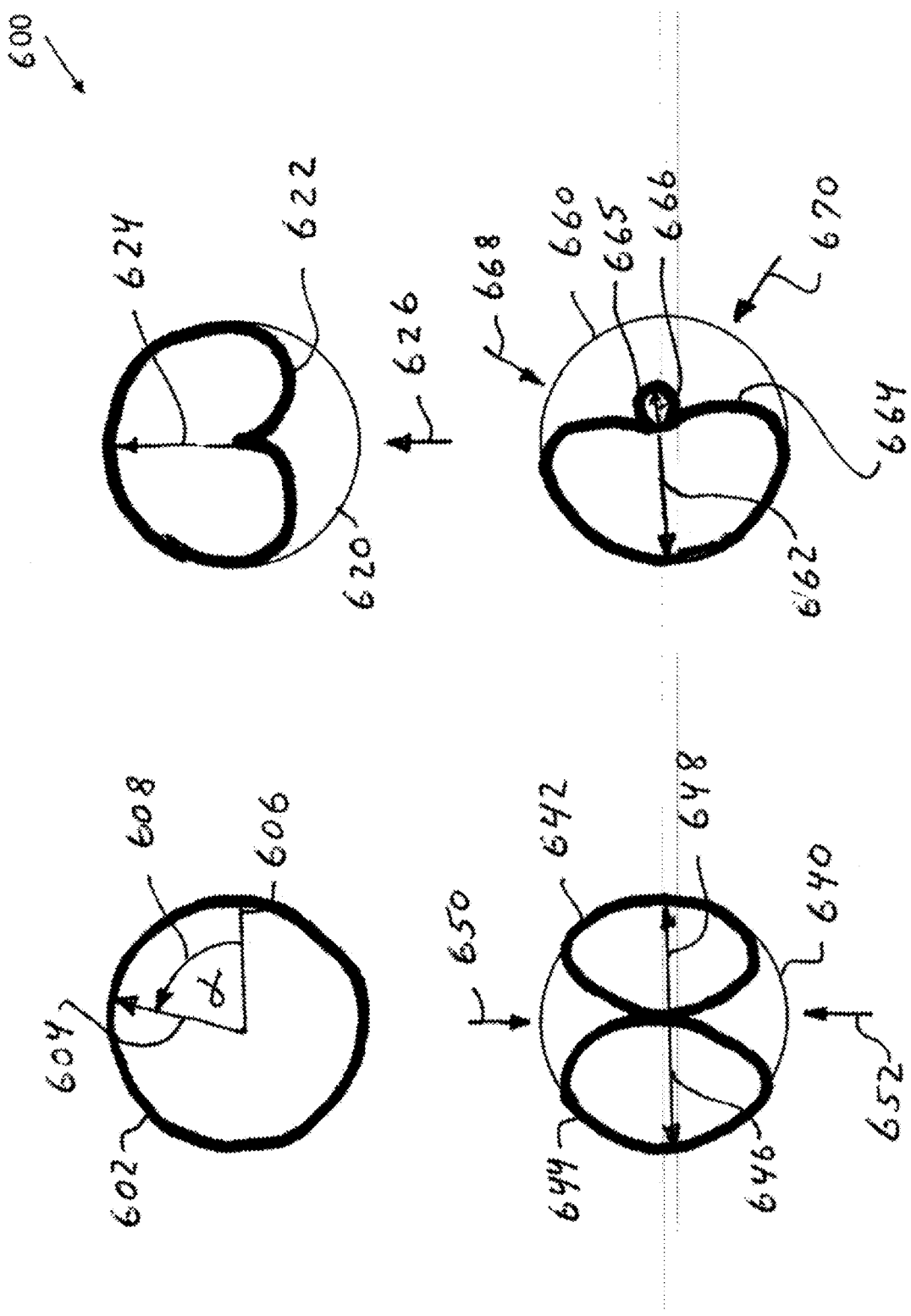
FIG. 6 illustrates microphone directivity patterns according to embodiments of the invention.

FIG. 6 illustrates, generally at 600, microphone directivity patterns according to embodiments of the invention. With reference to FIG. 6, an omni-directional microphone directivity pattern is illustrated with circle 602 having constant radius 604 indicating uniform sensitivity as a function of angle alpha (α) at 608 measured from reference 606.

An example of a directional microphone having a cardioid directivity pattern 622 is illustrated within plot 620 where the cardioid directivity pattern 622 has a peak sensitivity axis indicated at 624 and a null indicated at 626. A cardioid directivity pattern can be formed with two omni-directional microphones or with an omni-directional microphone and a suitable mounting structure for the microphone.

An example of a directional microphone having a bidirectional directivity pattern 642/644 is illustrated within plot 640 where a first lobe 642 of the bidirectional directivity pattern has a first peak sensitivity axis indicated at 648 the second lobe 644 has a second peak sensitivity axis indicated at 646. A first null exists at a direction 650 and a second null exists at a direction 652.

An example of a directional microphone having a super-cardioid directivity pattern is illustrated with plot 660 where the super-cardioid directivity pattern 664/665 has a peak sensitivity axis indicated at a direction 662, a minor sensitivity axis indicated at a direction 666 and nulls indicated at directions 668 and 670.

Figure 7:
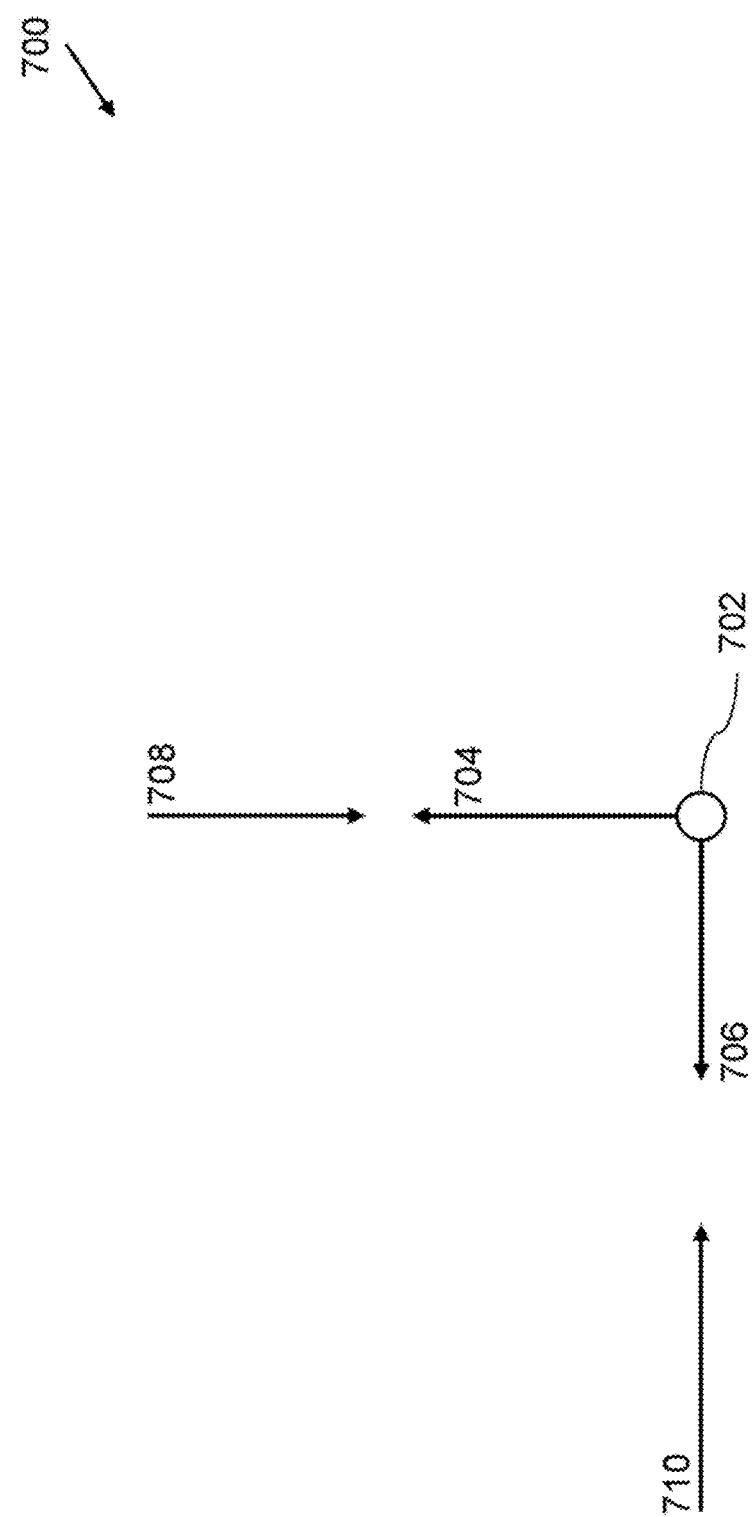
FIG. 7 illustrates a misaligned reference microphone response axis according to embodiments of the invention.

FIG. 7 illustrates, generally at 700, a misaligned reference microphone response axis according to embodiments of the invention. With reference to FIG. 7, a microphone is indicated at 702. The microphone 702 is a directional microphone having a main response axis 706 and a null in its directivity pattern indicated at 704. An incident acoustic field is indicated arriving from a direction 708. In various embodiments, the microphone 702 is for example a bidirectional microphone as illustrated in FIG. 6 above. Suitably positioned on a head wearable device, the directional microphone 702 decreases a signal-to-noise ratio when used as a reference microphone by limiting response to desired audio coming from direction 708 while responding to undesired audio, coming from a direction 710. The response of the directive microphone 702 will produce an increase in a signal-to-noise ratio difference as described above.

Thus, within the teachings of embodiments presented herein one or more main microphones and one or more reference microphones are placed in locations on a head wearable device to obtain suitable signal-to-noise ratio difference between a main and a reference microphone. Such signal-to-noise ratio difference enables extraction of desired audio from an acoustic signal containing both desired audio and undesired audio as described below in conjunction with the figures that follow. Microphones can be placed at various locations on the head wearable device, including co-locating a main and a reference microphone at a common position on a head wearable device.

In some embodiments, the techniques of microphone placement geometry are combined together with different directivity patterns obtained at the microphone level or through beamforming to produce a signal-to-noise ratio difference between a main and a reference channel according to a block 112 (FIG. 1).

Figure 8:
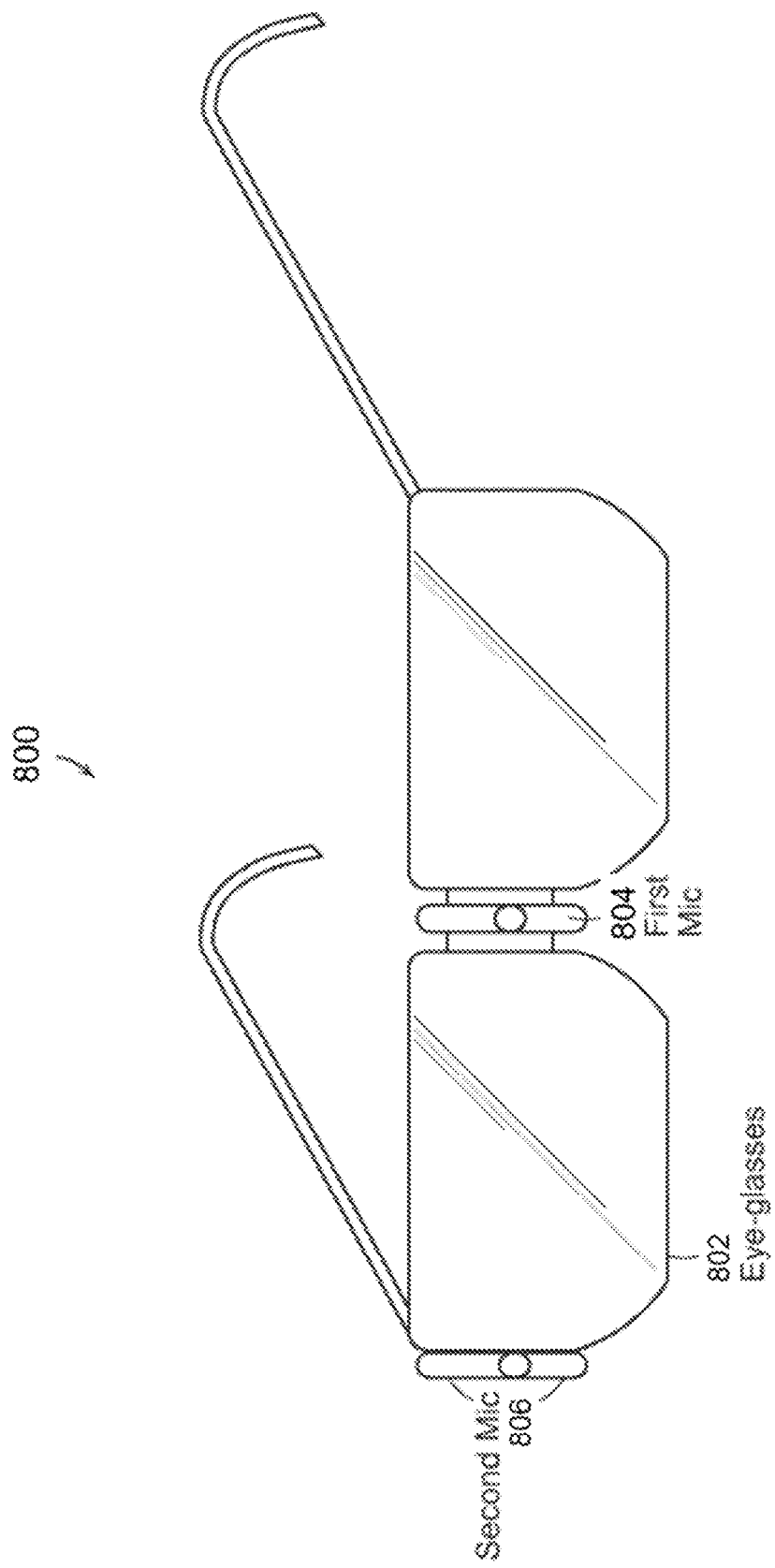
FIG. 8 is a diagram illustrating an embodiment of eyeglasses of the invention having two embedded microphones.

In various embodiments, a head wearable device is an eyewear device as described below in conjunction with the figures that follow. FIG. 8 is an illustration of an example of one embodiment of an eyewear device 800 of the invention. As shown therein, eyewear device 800 includes eyeglasses 802 having embedded microphones. The eyeglasses 802 have two microphones 804 and 806. First microphone 804 is arranged in the middle of the eyeglasses 802 frame. Second microphone 806 is arranged on the side of the eyeglasses 802 frame. The microphones 804 and 806 can be pressure-gradient microphone elements, either bi- or uni-directional. In one or more embodiments, each microphone 804 and 806 is a microphone assembly within a rubber boot. The rubber boot provides an acoustic port on the front and the back side of the microphone with acoustic ducts. The two microphones 804 and 806 and their respective boots can be identical. The microphones 804 and 806 can be sealed air-tight (e.g., hermetically sealed). The acoustic ducts are filled with windscreen material. The ports are sealed with woven fabric layers. The lower and upper acoustic ports are sealed with a water-proof membrane. The microphones can be built into the structure of the eyeglasses frame. Each microphone has top and bottom holes, being acoustic ports. In an embodiment, the two microphones 804 and 806, which can be pressure-gradient microphone elements, can each be replaced by two omni-directional microphones.

Figure 9:
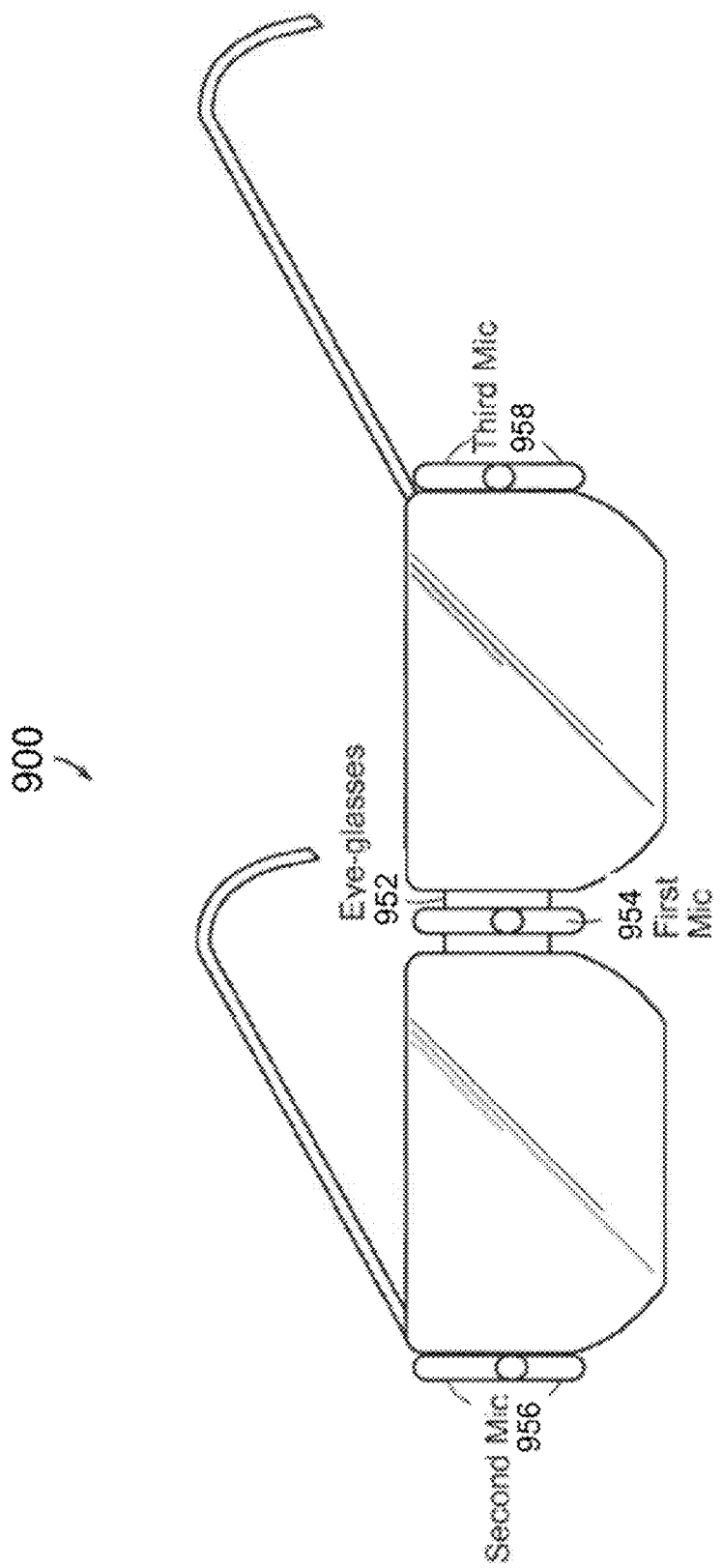
FIG. 9 is a diagram illustrating an embodiment of eyeglasses of the invention having three embedded microphones.

FIG. 9 is an illustration of another example of an embodiment of the invention. As shown in FIG. 9, eyewear device 900 includes eyeglasses 952 having three embedded microphones. The eyeglasses 952 of FIG. 9 are similar to the eyeglasses 802 of FIG. 8, but instead employ three microphones instead of two. The eyeglasses 952 of FIG. 9 have a first microphone 954 arranged in the middle of the eyeglasses 952, a second microphone 956 arranged on the left side of the eyeglasses 952, and a third microphone 958 arranged on the right side of the eyeglasses 952. The three microphones can be employed in the three-microphone embodiment described above.

Figure 10:
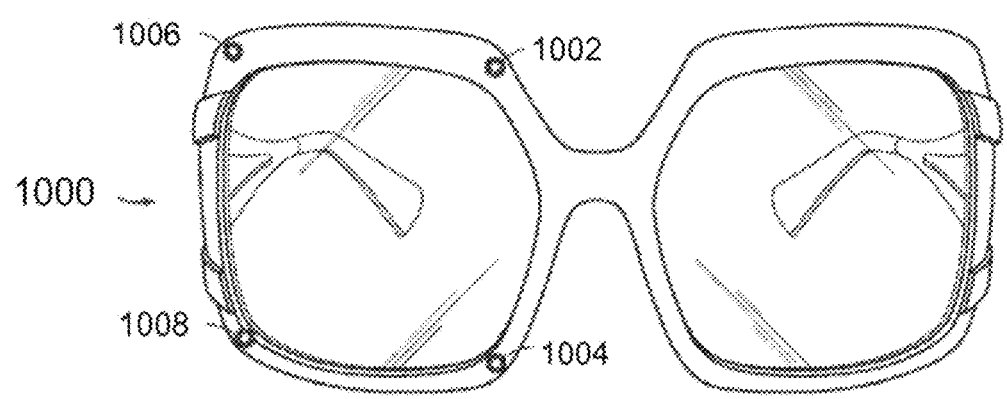
FIG. 10 is an illustration of another embodiment of the invention employing four omni directional microphones at four acoustic ports in place of two bidirectional microphones.

FIG. 10 is an illustration of an embodiment of eyewear 1000 of the present invention that replaces the two bi-directional microphones shown in FIG. 8, for example, with four omni-directional microphones 1002, 1004, 1006, 1008, and electronic beam steering. Replacing the two bi-directional microphones with four omni-directional microphones provides eyewear frame designers more flexibility and manufacturability. In example embodiments having four omni-directional microphones, the four omni-directional microphones can be located anywhere on the eyewear frame, preferably with the pairs of microphones lining up vertically about a lens. In this embodiment, omni-directional microphones 1002 and 1004 are main microphones for detecting the primary sound that is to be separated from interference, and microphones 1004, 1008 are reference microphones that detect background noise that is to be separated from the primary sound. The array of microphones can be omni directional microphones, wherein the omni-directional microphones can be any combination of the following: electret condenser microphones, analog microelectromechanical systems (MEMS) microphones, or digital MEMS microphones.

Figure 11:
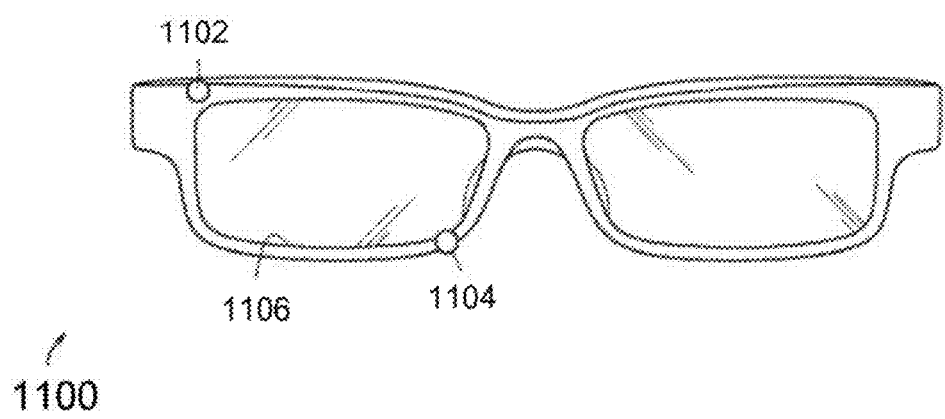
FIG. 11 is a schematic representation of eyewear of the invention employing two omni directional microphones placed diagonally across the lens opening defined by the front frame of the eyewear.

Another example embodiment of the present invention, shown in FIG. 11, includes an eyewear device with a noise canceling microphone array, the eyewear device including an eyeglasses frame 1100, an array of microphones coupled to the eyeglasses frame, the array of microphones including at least a first microphone 1102 and a second microphone 1104, the first microphone coupled to the eyeglasses frame about a temple region, the temple region can be located approximately between a top corner of a lens opening and a support arm, and providing a first audio channel output, and the second microphone coupled to the eyeglasses frame about an inner lower corner of the lens opening, and providing a second audio channel output. The second microphone is located diagonally across lens opening 1106, although it can be positioned anywhere along the inner frame of the lens, for example the lower corner, upper corner, or inner frame edge. Further, the second microphone can be along the inner edge of the lens at either the left or right of the nose bridge.

Figure 12:
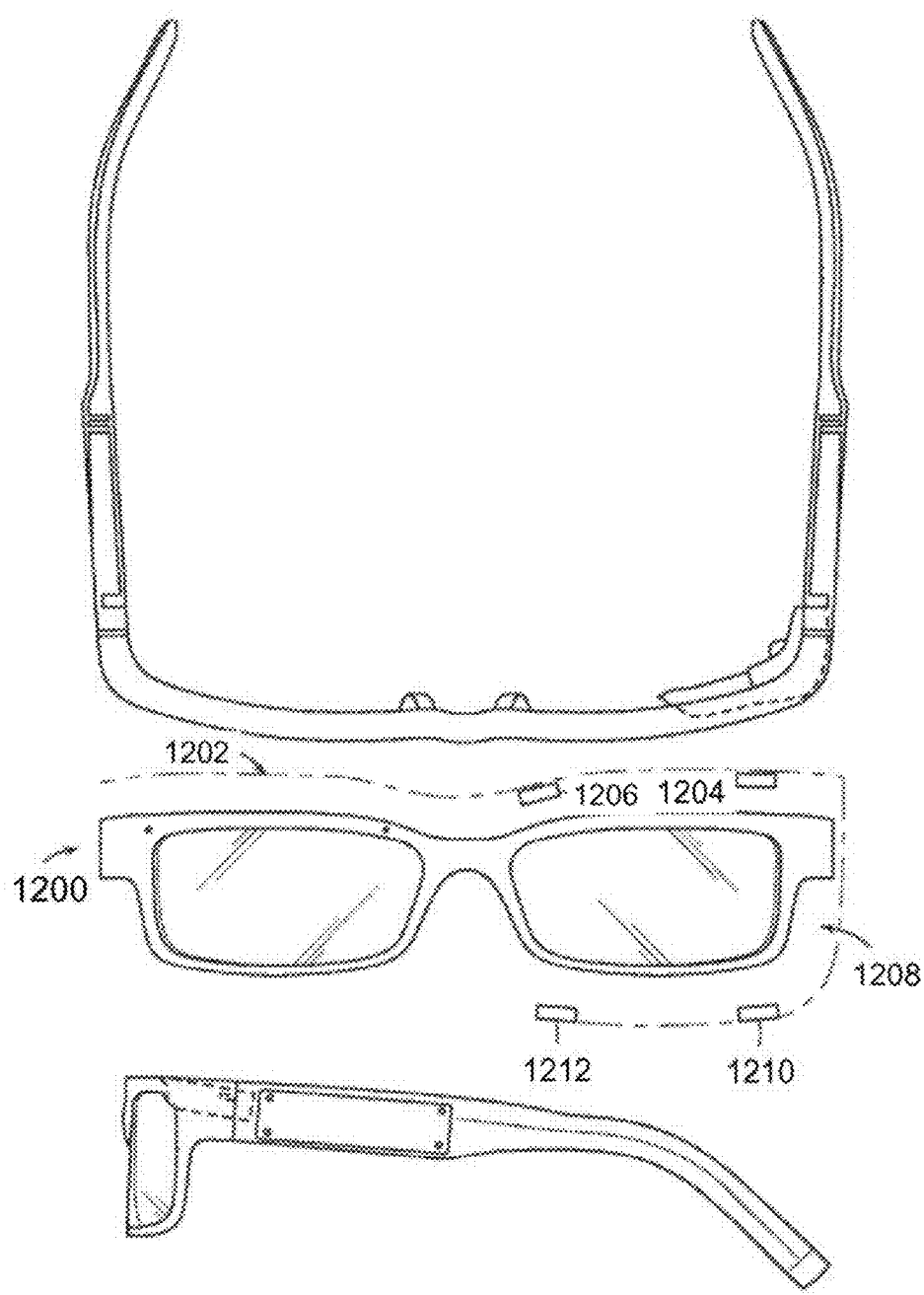
FIG. 12 is an illustration of another embodiment of the invention employing four omni directional microphones placed along the top and bottom portions of the eyeglasses frame.

In yet another embodiment of the invention, the array of microphones can be coupled to the eyeglasses frame using at least one flexible printed circuit board (PCB) strip, as shown in FIG. 12. In this embodiment, eyewear device of the invention 1200 includes upper flexible PCB strip 1202 including the first 1204 and fourth 1206 microphones and a lower flexible PCB strip 1208 including the second 1210 and third 1212 microphones.

Figure 13:
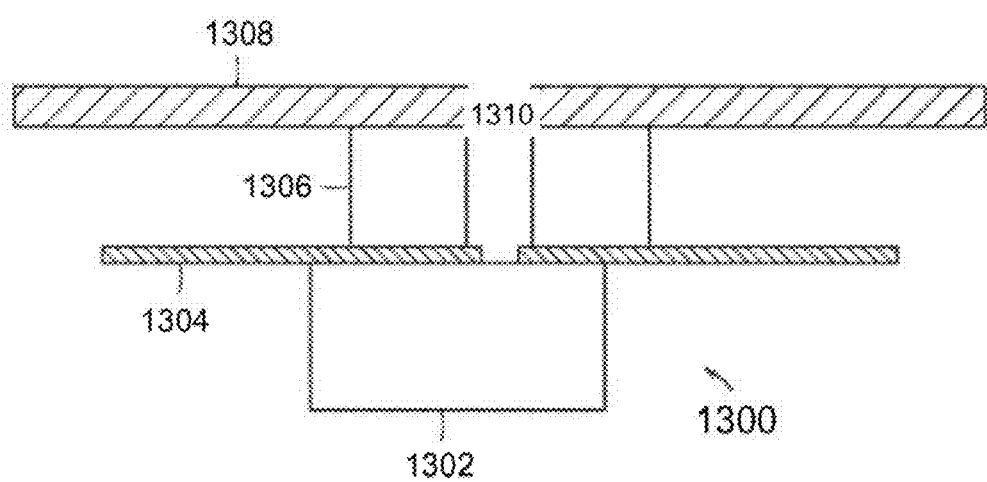
FIG. 13 is an illustration of another embodiment of the invention wherein microphones have been placed at a temple portion of the eyewear facing inward and at a lower center corner of the front frame of the eyewear and facing down.

In further example embodiments, the eyeglasses frame can further include an array of vents corresponding to the array of microphones. The array of microphones can be bottom port or top port microelectromechanical systems (M EMS) microphones. As can be seen in FIG. 13, which is a microphone component of the eyewear of FIG. 12, MEMS microphone component 1300 includes MEMS microphone 1302 is affixed to flexible printed circuit board (PCB) 1304. Gasket 1306 separates flexible PCB 1304 from device case 1308. Vent 1310 is defined by flexible PCB 1304, gasket 1306 and device case 1308. Vent 1310 is an audio canal to channel audio waves to MEMS microphone 1302. The first and fourth MEMS microphones can be coupled to the upper flexible PCB strip, the second and third MEMS microphones can be coupled to the lower flexible PCB strip, and the array of MEMS microphones can be arranged such that the bottom ports or top ports receive acoustic signals through the corresponding vents.

Figure 14:
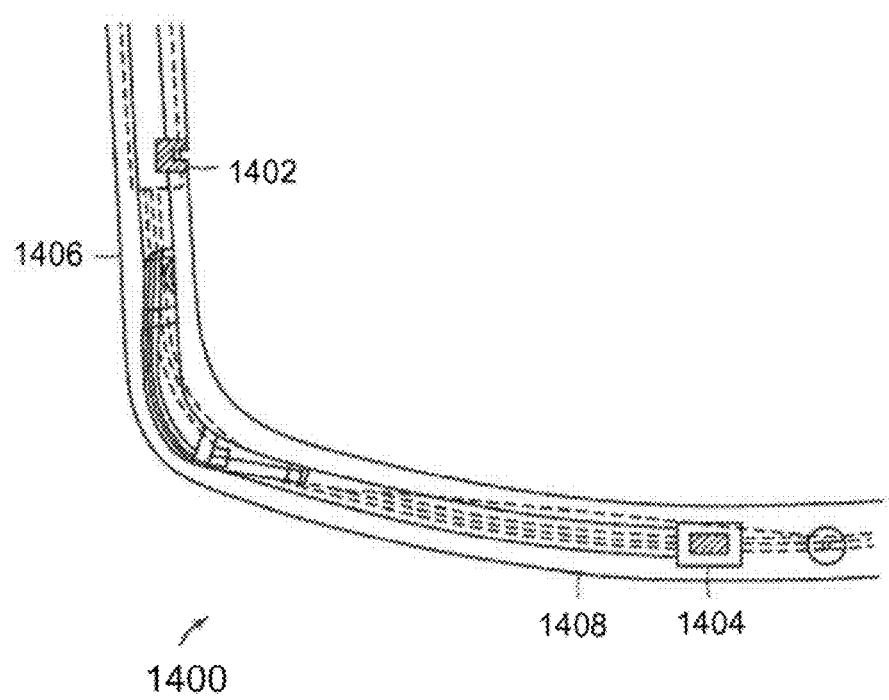
FIG. 14 is an illustration of another embodiment of the invention wherein microphones have been placed at a temple portion of the eyewear facing inward and at a lower center corner of the front frame of the eyewear and facing down.

FIG. 14 shows another alternate embodiment of eyewear 1400 where microphones 1402, 1404 are placed at the temple region 1406 and front frame 1408, respectively.

Figure 15:
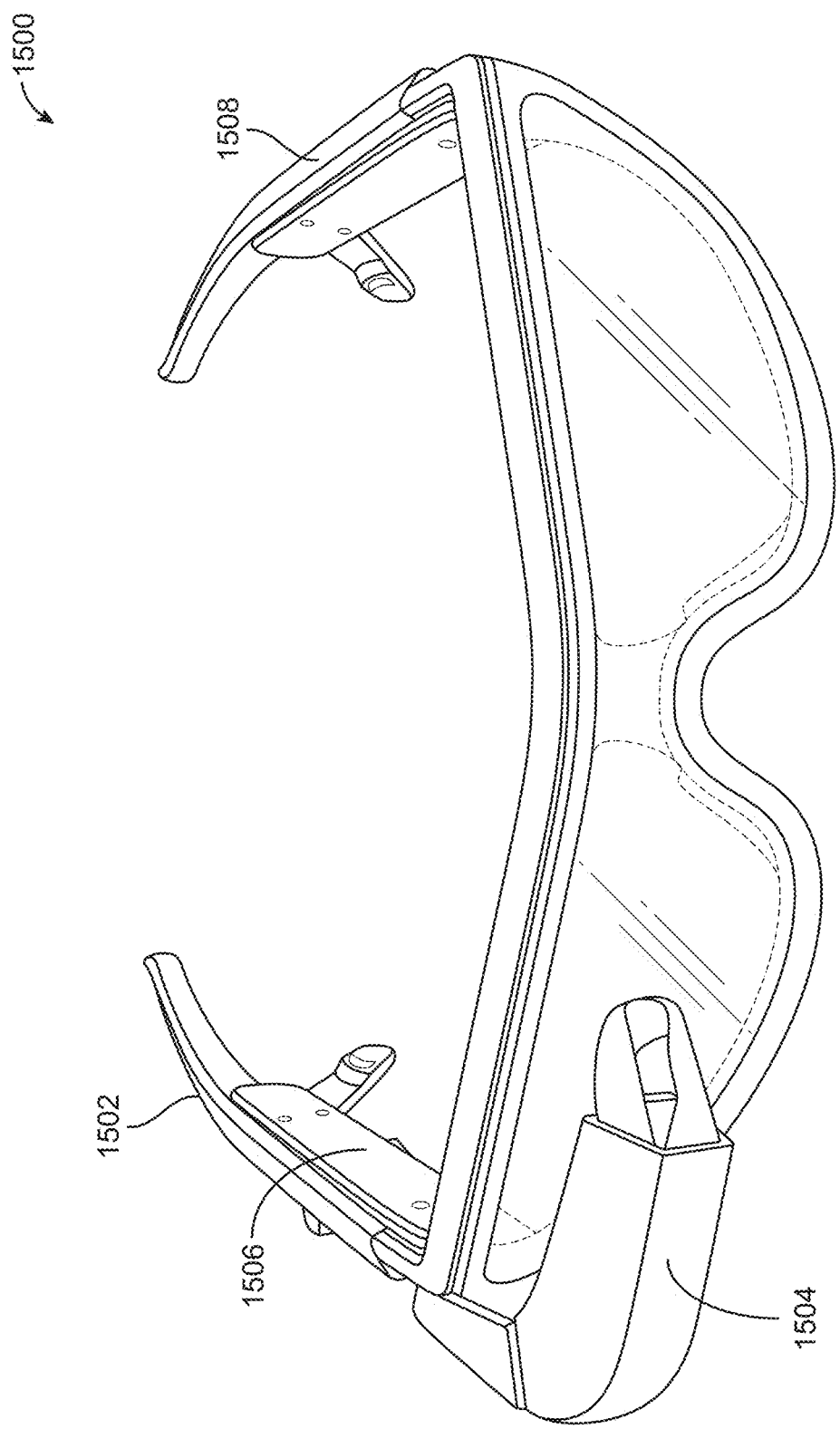
FIG. 15 illustrates an eye glass with built-in acoustic noise cancellation system according to embodiments of the invention.

FIG. 15 illustrates, generally at 1500, an eye glass with built-in acoustic noise cancellation system according to embodiments of the invention. With reference to FIG. 15, a head wearable device 1502 includes one or more microphones used for a main acoustic channel and one or more microphones used for a reference acoustic channel. The head wearable device 1502 is configured as a wearable computer with information display 1504. In various embodiments, electronics are included at 1506 and/or at 1508. In various embodiments, electronics can include noise cancellation electronics which are described more fully below in conjunction with the figures that follow. In other embodiments, noise cancellation electronics are not co-located with the head wearable device 1502 but are located externally from the head wearable device 1502. In such embodiments, a wireless communication link such as is compatible with the Bluetooth® protocol, ZigBee®, etc. is provided to send the acoustic signals received from the microphones to an external location for processing by noise cancellation electronics.

Figure 16:
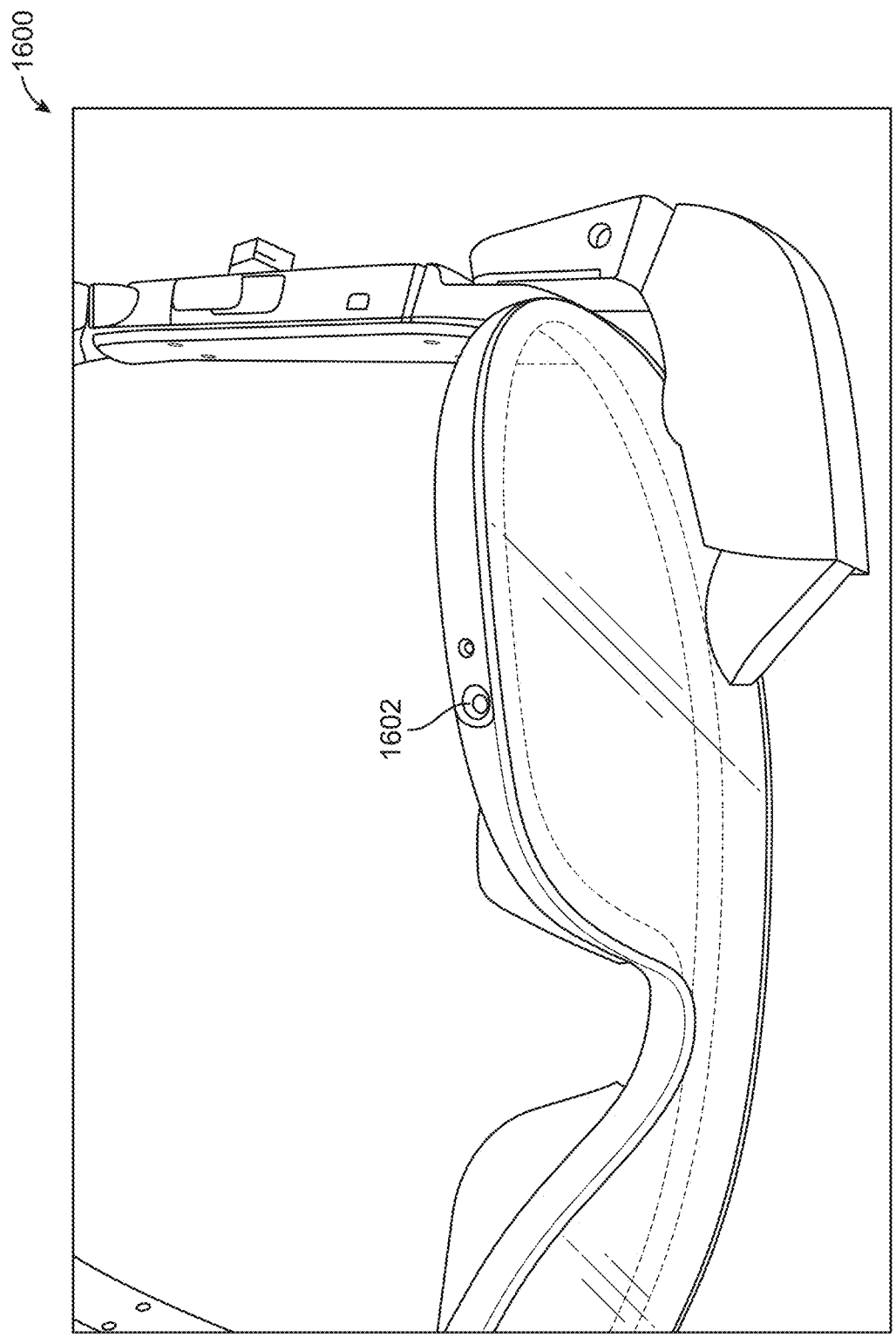
FIG. 16 illustrates a primary microphone location in the head wearable device from FIG. 15 according to embodiments of the invention.

FIG. 16 illustrates, generally at 1600, a primary microphone location in the head wearable device from FIG. 15 according to embodiments of the invention. With reference to FIG. 16, a main microphone location is illustrated at 1602.

Figure 17:
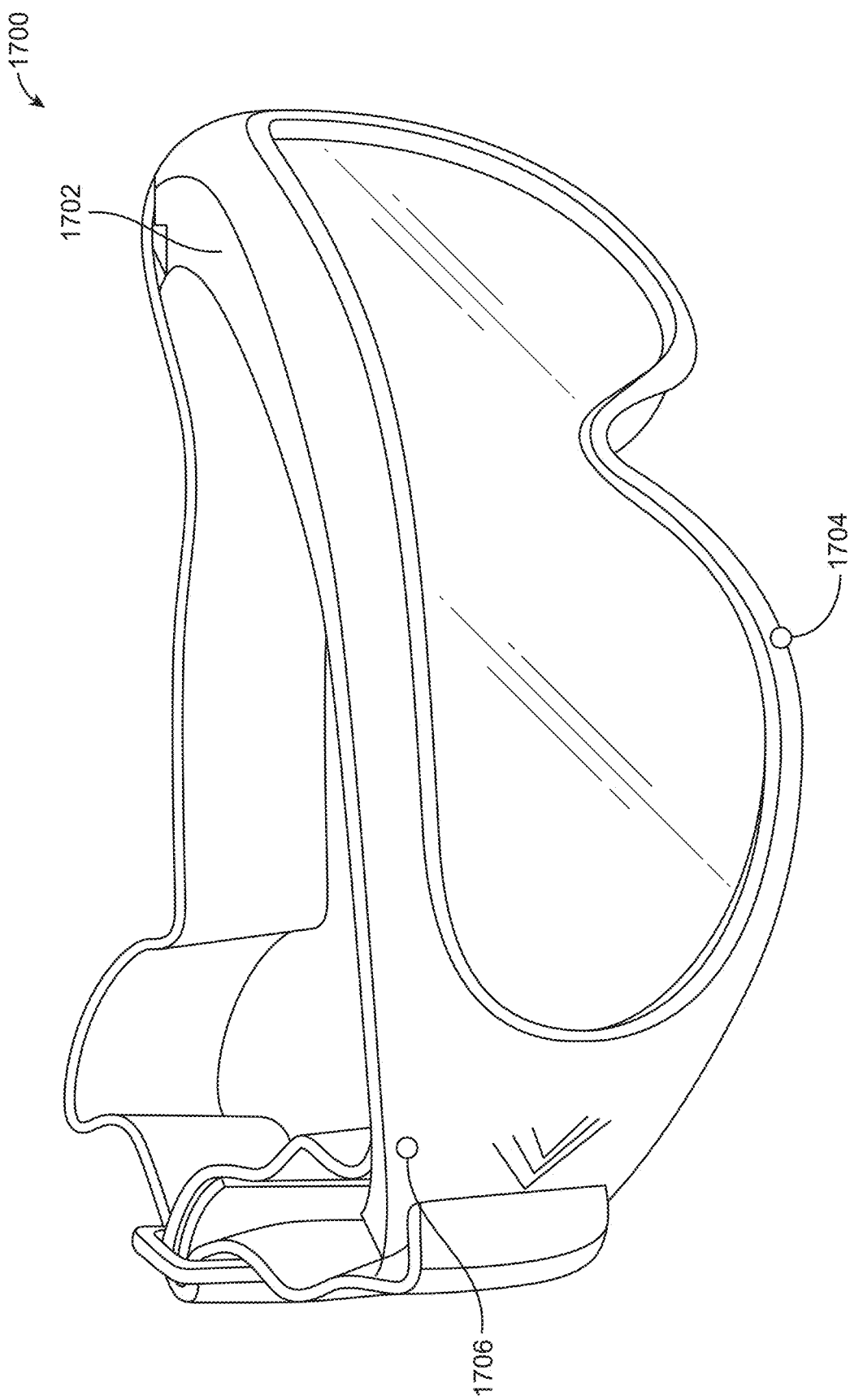
FIG. 17 illustrates goggles with built-in acoustic noise cancellation system according to embodiments of the invention.

FIG. 17 illustrates, generally at 1700, goggles with built-in acoustic noise cancellation system according to embodiments of the invention. With reference to FIG. 17, a head wearable device in the form of goggles 1702 is configured with a main microphone at a location 1704 and a reference microphone at a location 1706. In various embodiments, noise cancellation electronics are included within goggles 1702. Noise cancellation electronics are described more fully below in conjunction with the figures that follow. In other embodiments, noise cancellation electronics are not co-located with the head wearable device 1702 but are located external from the head wearable device 1702. In such embodiments, a wireless communication link such as is compatible with the Bluetooth® protocol, ZigBee® protocol, etc. is provided to send the acoustic signals received from the microphones to an external location for processing by noise cancellation electronics.

Figure 18:
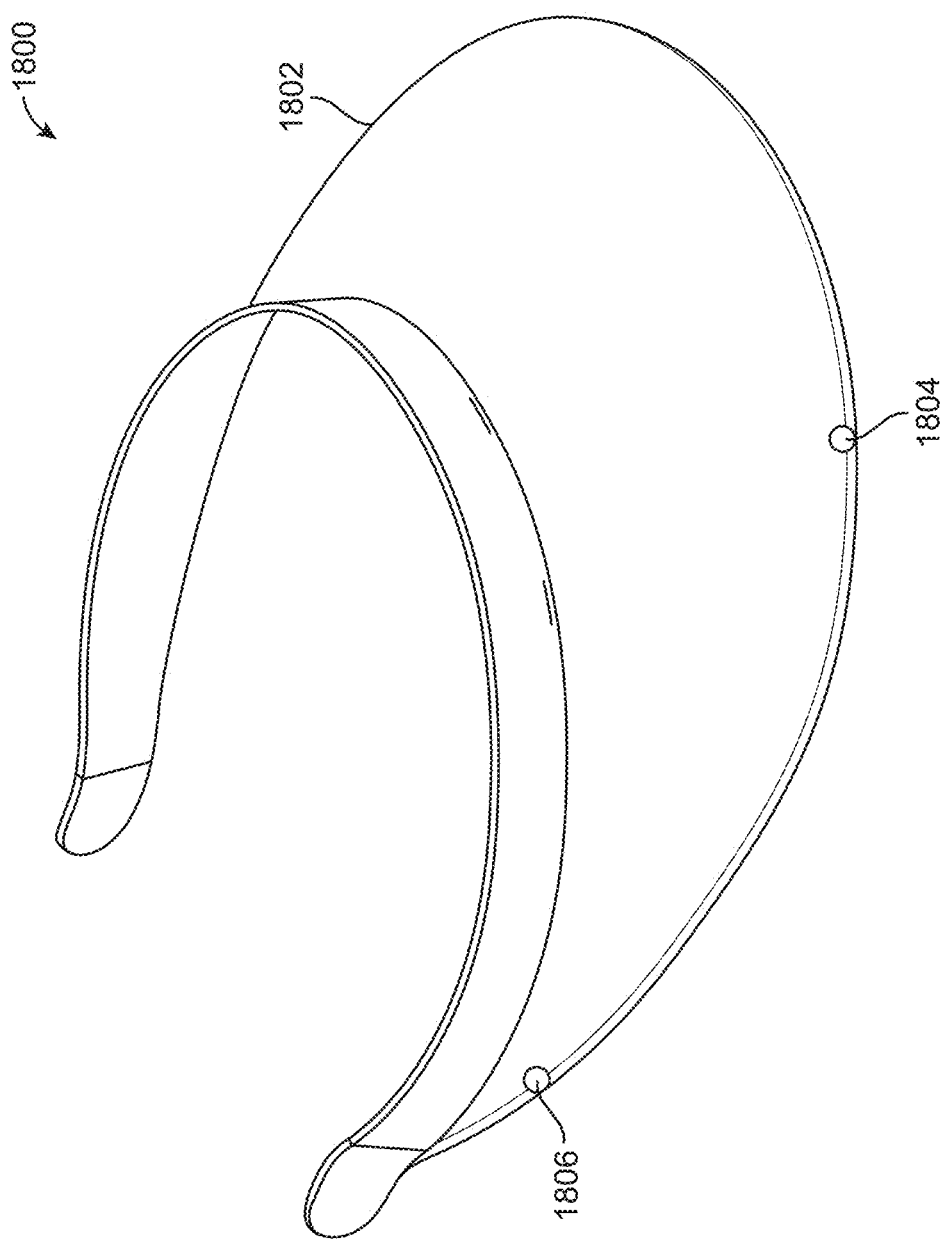
FIG. 18 illustrates a visor with built-in acoustic noise cancellation system according to embodiments of the invention.

FIG. 18 illustrates, generally at 1800, a visor with built-in acoustic noise cancellation system according to embodiments of the invention. With reference to FIG. 18, a head wearable device in the form of a visor 1802 has a main microphone 1804 and a reference microphone 1806. In various embodiments, noise cancellation electronics are included within the visor 1802. Noise cancellation electronics are described more fully below in conjunction with the figures that follow. In other embodiments, noise cancellation electronics are not co-located with the head wearable device 1802 but are located external from the head wearable device 1802. In such embodiments, a wireless communication link such as is compatible with the Bluetooth® protocol, ZigBee® protocol, etc. is provided to send the acoustic signals received from the microphones to an external location for processing by noise cancellation electronics.

Figure 19:
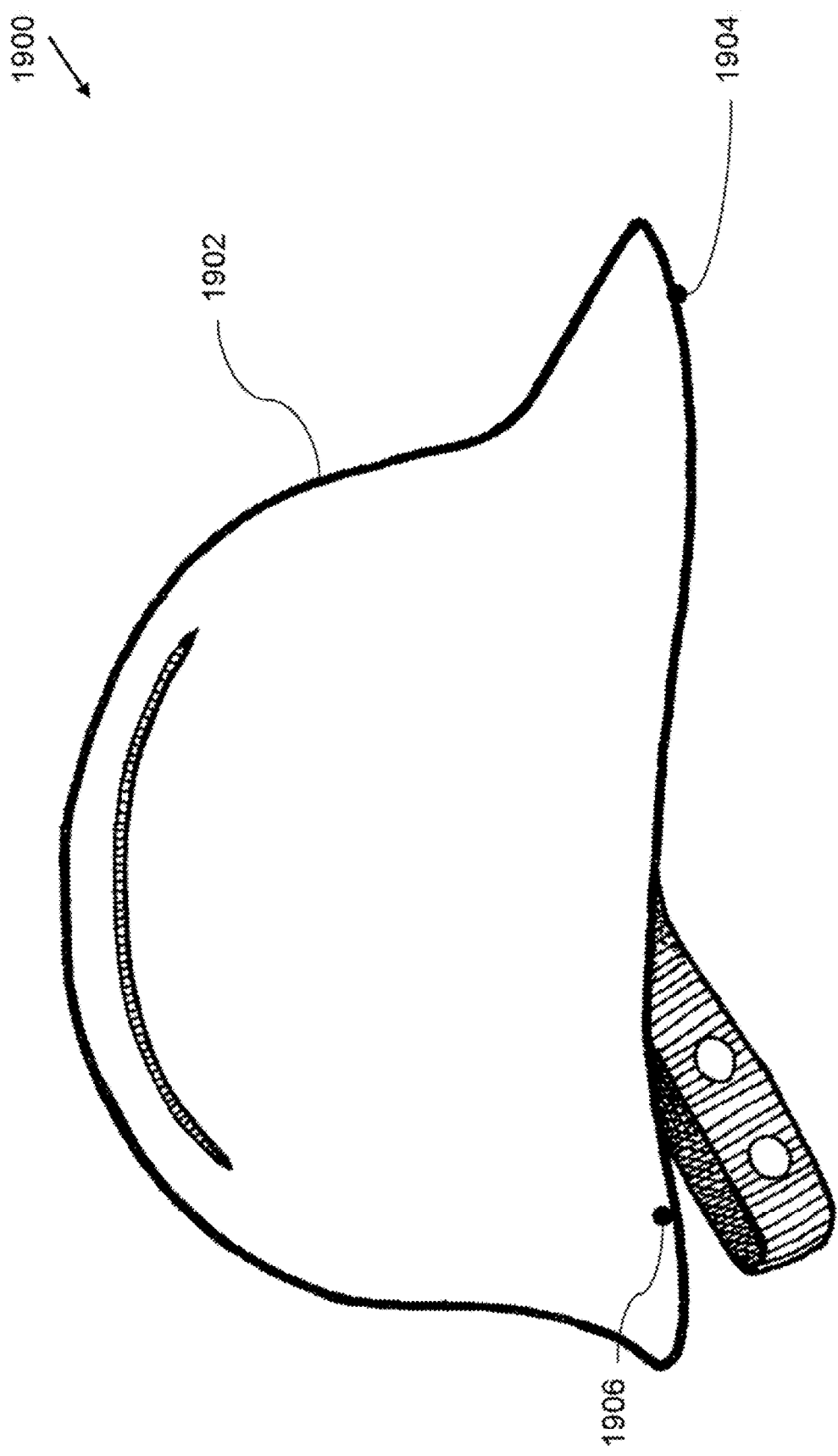
FIG. 19 illustrates a helmet with built-in acoustic noise cancellation system according to embodiments of the invention.

FIG. 19 illustrates, generally at 1900, a helmet with built-in acoustic noise cancellation system according to embodiments of the invention. With reference to FIG. 19, a head wearable device in the form of a helmet 1902 has a main microphone 1904 and a reference microphone 1906. In various embodiments, noise cancellation electronics are included within the helmet 1902. Noise cancellation electronics are described more fully below in conjunction with the figures that follow. In other embodiments, noise cancellation electronics are not co-located with the head wearable device 1902 but are located external from the head wearable device 1902. In such embodiments, a wireless communication link such as is compatible with the Bluetooth® protocol, ZigBee® protocol, etc. is provided to send the acoustic signals received from the microphones to an external location for processing by noise cancellation electronics.

Figure 20:
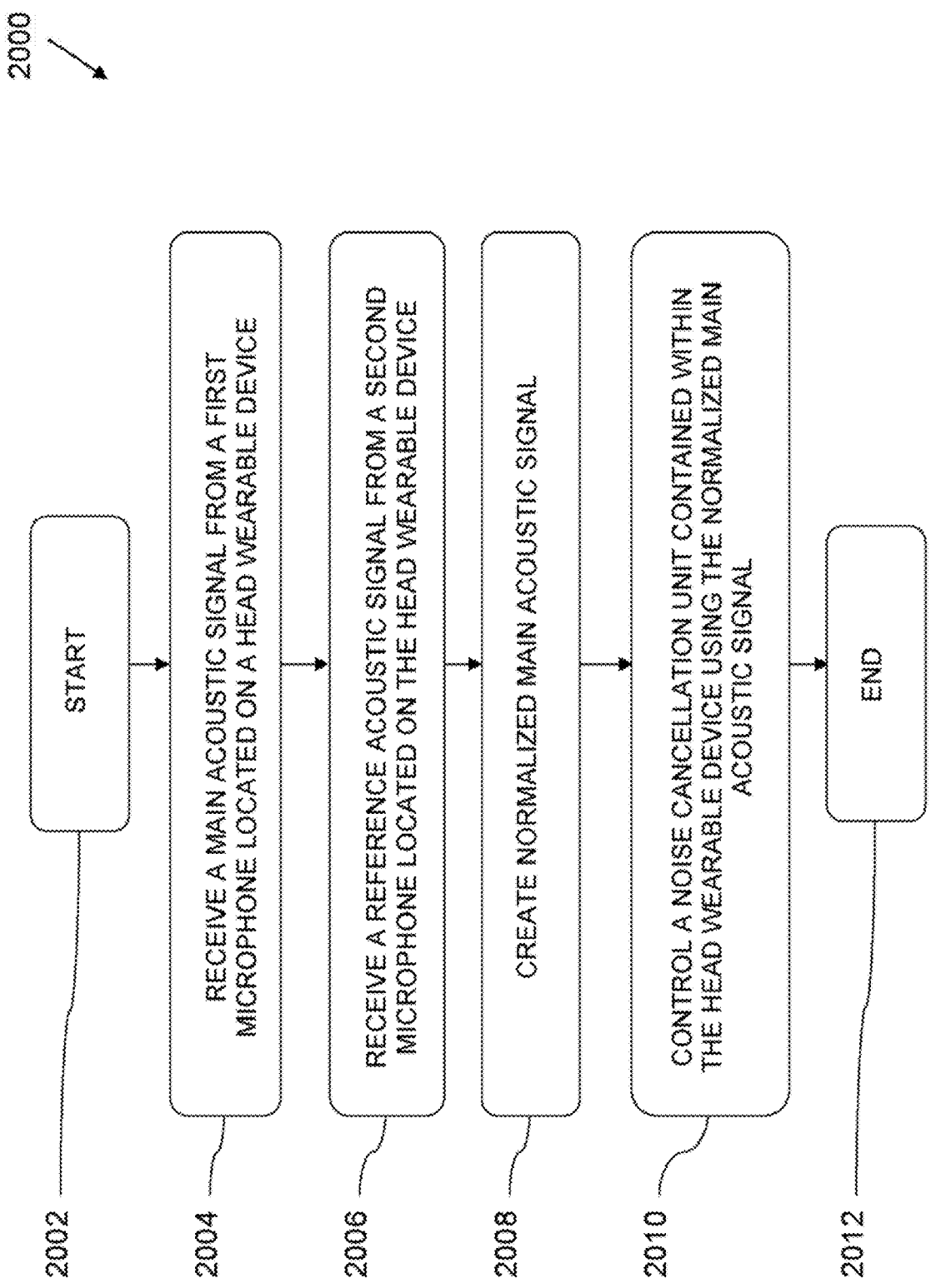
FIG. 20 illustrates a process for extracting a desired audio signal according to embodiments of the invention.

FIG. 20 illustrates, generally at 2000, a process for extracting a desired audio signal according to embodiments of the invention. With reference to FIG. 20, a process starts at a block 2002. At a block 2004, a main acoustic signal is received from a main microphone located on a head wearable device. At a block 2006, a reference acoustic signal is received from a reference microphone located on the head wearable device. At a block 2008, a normalized main acoustic signal is formed. In various embodiments, the normalized main acoustic signal is formed using one or more reference acoustic signals as described in the figures below. At a block 2010 the normalized main acoustic signal is used to control noise cancellation using an acoustic signal processing system contained within the head wearable device. The process stops at a block 2012.

Figure 21:
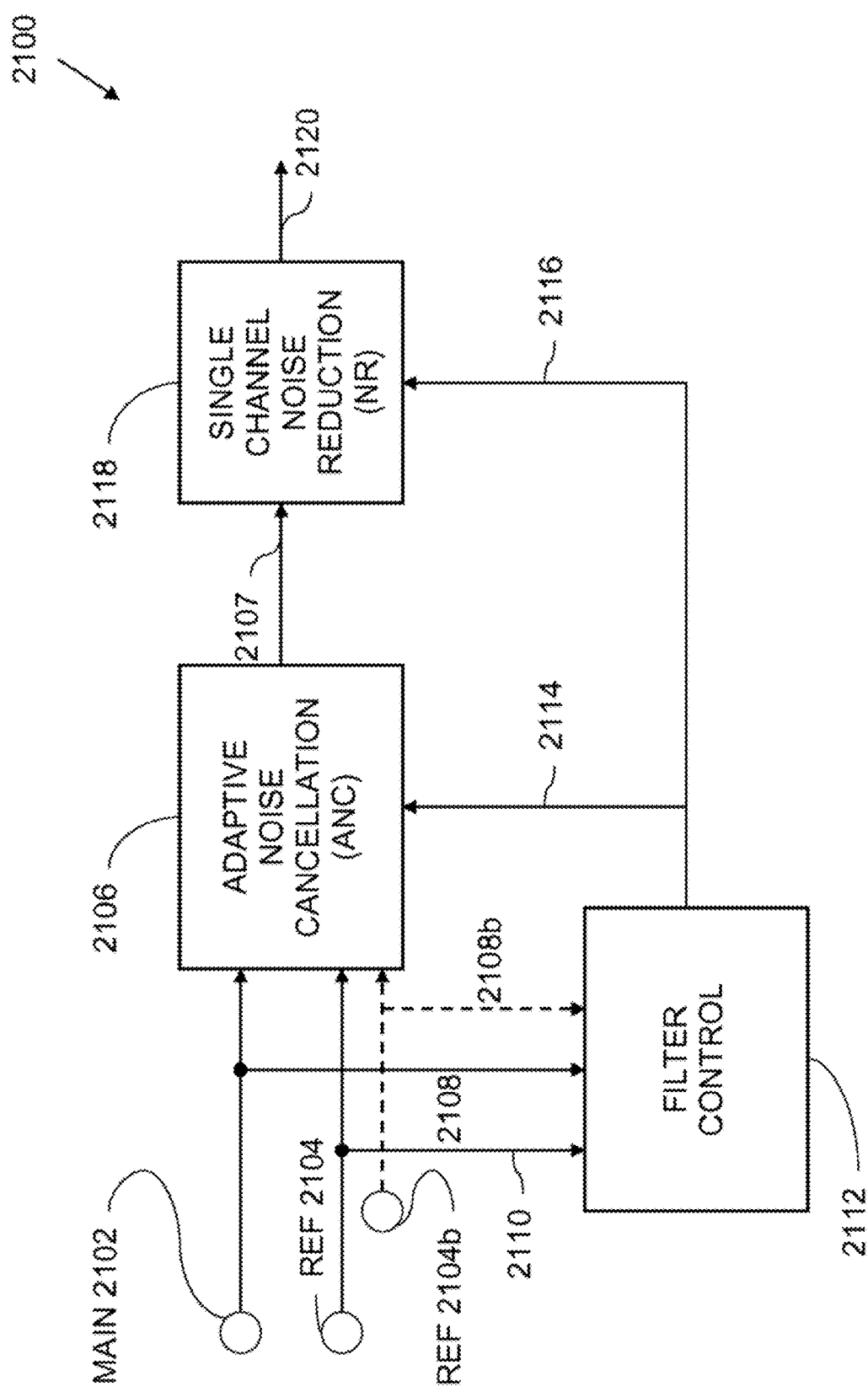
FIG. 21 illustrates system architecture, according to embodiments of the invention.

FIG. 21 illustrates, generally at 2100, system architecture, according to embodiments of the invention. With reference to FIG. 21, two acoustic channels are input into an adaptive noise cancellation unit 2106. A first acoustic channel, referred to herein as main channel 2102, is referred to in this description of embodiments synonymously as a "primary" or a "main" channel. The main channel 2102 contains both desired audio and undesired audio. The acoustic signal input on the main channel 2102 arises from the presence of both desired audio and undesired audio on one or more acoustic elements as described more fully below in the figures that follow. Depending on the configuration of a microphone or microphones used for the main channel the microphone elements can output an analog signal. The analog signal is converted to a digital signal with an analog-to-digital converter (AD) converter (not shown). Additionally, amplification can be located proximate to the microphone element(s) or AD converter. A second acoustic channel, referred to herein as reference channel 2104 provides an acoustic signal which also arises from the presence of desired audio and undesired audio. Optionally, a second reference channel 2104*b* can be input into the adaptive noise cancellation unit 2106. Similar to the main channel and depending on the configuration of a microphone or microphones used for the reference channel, the microphone elements can output an analog signal. The analog signal is converted to a digital signal with an analog-to-digital converter (AD) converter (not shown). Additionally, amplification can be located proximate to the microphone element(s) or AD converter. In some embodiments the microphones are implemented as digital microphones.

In some embodiments, the main channel 2102 has an omni-directional response and the reference channel 2104 has an omni-directional response. In some embodiments, the acoustic beam patterns for the acoustic elements of the main channel 2102 and the reference channel 2104 are different. In other embodiments, the beam patterns for the main channel 2102 and the reference channel 2104 are the same; however, desired audio received on the main channel 2102 is different from desired audio received on the reference channel 2104. Therefore, a signal-to-noise ratio for the main channel 2102 and a signal-to-noise ratio for the reference channel 2104 are different. In general, the signal-to-noise ratio for the reference channel is less than the signal-to-noise-ratio of the main channel. In various embodiments, by way of non-limiting examples, a difference between a main channel signal-to-noise ratio and a reference channel signal-to-noise ratio is approximately 1 or 2 decibels (dB) or more. In other non-limiting examples, a difference between a main channel signal-to-noise ratio and a reference channel signal-to-noise ratio is 1 decibel (dB) or less. Thus, embodiments of the invention are suited for high noise environments, which can result in low signal-to-noise ratios with respect to desired audio as well as low noise environments, which can have higher signal-to-noise ratios. As used in this description of embodiments, signal-to-noise ratio means the ratio of desired audio to undesired audio in a channel. Furthermore, the term "main channel signal-to-noise ratio" is used interchangeably with the term "main signal-to-noise ratio." Similarly, the term "reference channel signal-to-noise ratio" is used interchangeably with the term "reference signal-to-noise ratio."

The main channel 2102, the reference channel 2104, and optionally a second reference channel 2104*b* provide inputs to an adaptive noise cancellation unit 2106. While a second reference channel is shown in the figures, in various embodiments, more than two reference channels are used. Adaptive noise cancellation unit 2106 filters undesired audio from the main channel 2102, thereby providing a first stage of filtering with multiple acoustic channels of input. In various embodiments, the adaptive noise cancellation unit 2106 utilizes an adaptive finite impulse response (FIR) filter. The environment in which embodiments of the invention are used can present a reverberant acoustic field. Thus, the adaptive noise cancellation unit 2106 includes a delay for the main channel sufficient to approximate the impulse response of the environment in which the system is used. A magnitude of the delay used will vary depending on the particular application that a system is designed for including whether or not reverberation must be considered in the design. In some embodiments, for microphone channels positioned very closely together (and where reverberation is not significant) a magnitude of the delay can be on the order of a fraction of a millisecond. Note that at the low end of a range of values, which could be used for a delay, an acoustic travel time between channels can represent a minimum delay value. Thus, in various embodiments, a delay value can range from approximately a fraction of a millisecond to approximately 500 milliseconds or more depending on the application. Further description of the adaptive noise cancellation unit 1106 and the components associated therewith are provided below in conjunction with the figures that follow.

An output 2107 of the adaptive noise cancellation unit 2106 is input into a single channel noise cancellation unit 2118. The single channel noise cancellation unit 2118 filters the output 2107 and provides a further reduction of undesired audio from the output 2107, thereby providing a second stage of filtering. The single channel noise cancellation unit 2118 filters mostly stationary contributions to undesired audio. The single channel noise cancellation unit 2118 includes a linear filter, such as for example a Wiener filter, a Minimum Mean Square Error (MMSE) filter implementation, a linear stationary noise filter, or other Bayesian filtering approaches which use prior information about the parameters to be estimated. Filters used in the single channel noise cancellation unit 2118 are described more fully below in conjunction with the figures that follow.

Acoustic signals from the main channel 2102 are input at 2108 into a filter control 2112. Similarly, acoustic signals from the reference channel 2104 are input at 2110 into the filter control 2112. An optional second reference channel is input at 2108*b* into the filter control 2112. Filter control 2112 provides control signals 2114 for the adaptive noise cancellation unit 2106 and control signals 2116 for the single channel noise cancellation unit 2118. In various embodiments, the operation of filter control 2112 is described more completely below in conjunction with the figures that follow. An output 2120 of the single channel noise cancellation unit 2118 provides an acoustic signal which contains mostly desired audio and a reduced amount of undesired audio.

The system architecture shown in FIG. 21 can be used in a variety of different systems used to process acoustic signals according to various embodiments of the invention. Some examples of the different acoustic systems are, but are not limited to, a mobile phone, a handheld microphone, a boom microphone, a microphone headset, a hearing aid, a hands free microphone device, a wearable system embedded in a frame of an eyeglass, a near-to-eye (NTE) headset display or headset computing device, a head wearable device of general configuration such as but not limited to glasses, goggles, a visor, a head band, a helmet, etc. The environments that these acoustic systems are used in can have multiple sources of acoustic energy incident upon the acoustic elements that provide the acoustic signals for the main channel 2102 and the reference channel 2104. In various embodiments, the desired audio is usually the result of a user's own voice (see FIG. 2 above). In various embodiments, the undesired audio is usually the result of the combination of the undesired acoustic energy from the multiple sources that are incident upon the acoustic elements used for both the main channel and the reference channel. Thus, the undesired audio is statistically uncorrelated with the desired audio. In addition, there is a non-causal relationship between the undesired audio in the main channel and the undesired audio in the reference channel. In such a case, echo cancellation does not work because of the non-causal relationship and because there is no measurement of a pure noise signal (undesired audio) apart from the signal of interest (desired audio). In echo cancellation noise reduction systems, a speaker, which generated the acoustic signal, provides a measure of a pure noise signal. In the context of the embodiments of the system described herein, there is no speaker, or noise source from which a pure noise signal could be extracted.

Figure 22:
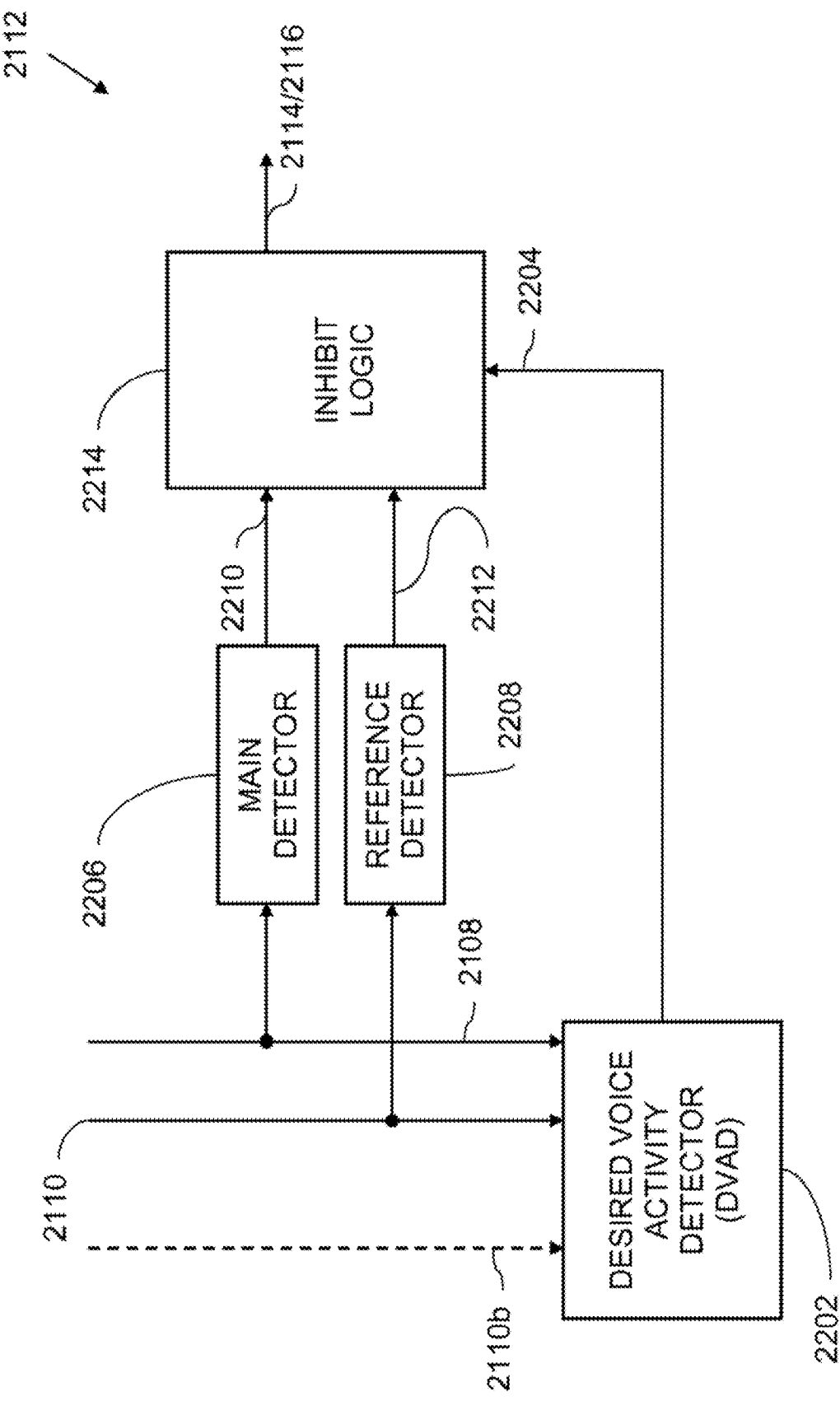
FIG. 22 illustrates filter control, according to embodiments of the invention.

FIG. 22 illustrates, generally at 2112, filter control, according to embodiments of the invention. With reference to FIG. 22, acoustic signals from the main channel 2102 are input at 2108 into a desired voice activity detection unit 2202. Acoustic signals at 2108 are monitored by main channel activity detector 2206 to create a flag that is associated with activity on the main channel 2102 (FIG. 21). Optionally, acoustic signals at 2110b are monitored by a second reference channel activity detector (not shown) to create a flag that is associated with activity on the second reference channel. Optionally, an output of the second reference channel activity detector is coupled to the inhibit control logic 2214. Acoustic signals at 2110 are monitored by reference channel activity detector 2208 to create a flag that is associated with activity on the reference channel 2104 (FIG. 21). The desired voice activity detection unit 2202 utilizes acoustic signal inputs from 2110, 2108, and optionally 2110b to produce a desired voice activity signal 2204. The operation of the desired voice activity detection unit 2202 is described more completely below in the figures that follow.

In various embodiments, inhibit logic unit 2214 receives as inputs, information regarding main channel activity at 2210, reference channel activity at 2212, and information pertaining to whether desired audio is present at 2204. In various embodiments, the inhibit logic 2214 outputs filter control signal 2114/2116 which is sent to the adaptive noise cancellation unit 2106 and the single channel noise cancellation unit 2118 of FIG. 21 for example. The implementation and operation of the main channel activity detector 2206, the reference channel activity detector 2208 and the inhibit logic 2214 are described more fully in U.S. Pat. No. 7,386,135 titled "Cardioid Beam With A Desired Null Based Acoustic Devices, Systems and Methods," which is hereby incorporated by reference.

In operation, in various embodiments, the system of FIG. 21 and the filter control of FIG. 22 provide for filtering and removal of undesired audio from the main channel 2102 as successive filtering stages are applied by adaptive noise cancellation unit 2106 and single channel nose cancellation unit 2118. In one or more embodiments, throughout the system, application of the signal processing is applied linearly. In linear signal processing an output is linearly related to an input. Thus, changing a value of the input, results in a proportional change of the output. Linear application of signal processing processes to the signals preserves the quality and fidelity of the desired audio, thereby substantially eliminating or minimizing any non-linear distortion of the desired audio. Preservation of the signal quality of the desired audio is useful to a user in that accurate reproduction of speech helps to facilitate accurate communication of information.

In addition, algorithms used to process speech, such as Speech Recognition (SR) algorithms or Automatic Speech Recognition (ASR) algorithms benefit from accurate presentation of acoustic signals which are substantially free of non-linear distortion. Thus, the distortions which can arise from the application of signal processing processes which are non-linear are eliminated by embodiments of the invention. The linear noise cancellation algorithms, taught by embodiments of the invention, produce changes to the desired audio which are transparent to the operation of SR and ASR algorithms employed by speech recognition engines. As such, the error rates of speech recognition engines are greatly reduced through application of embodiments of the invention.

Figure 23:
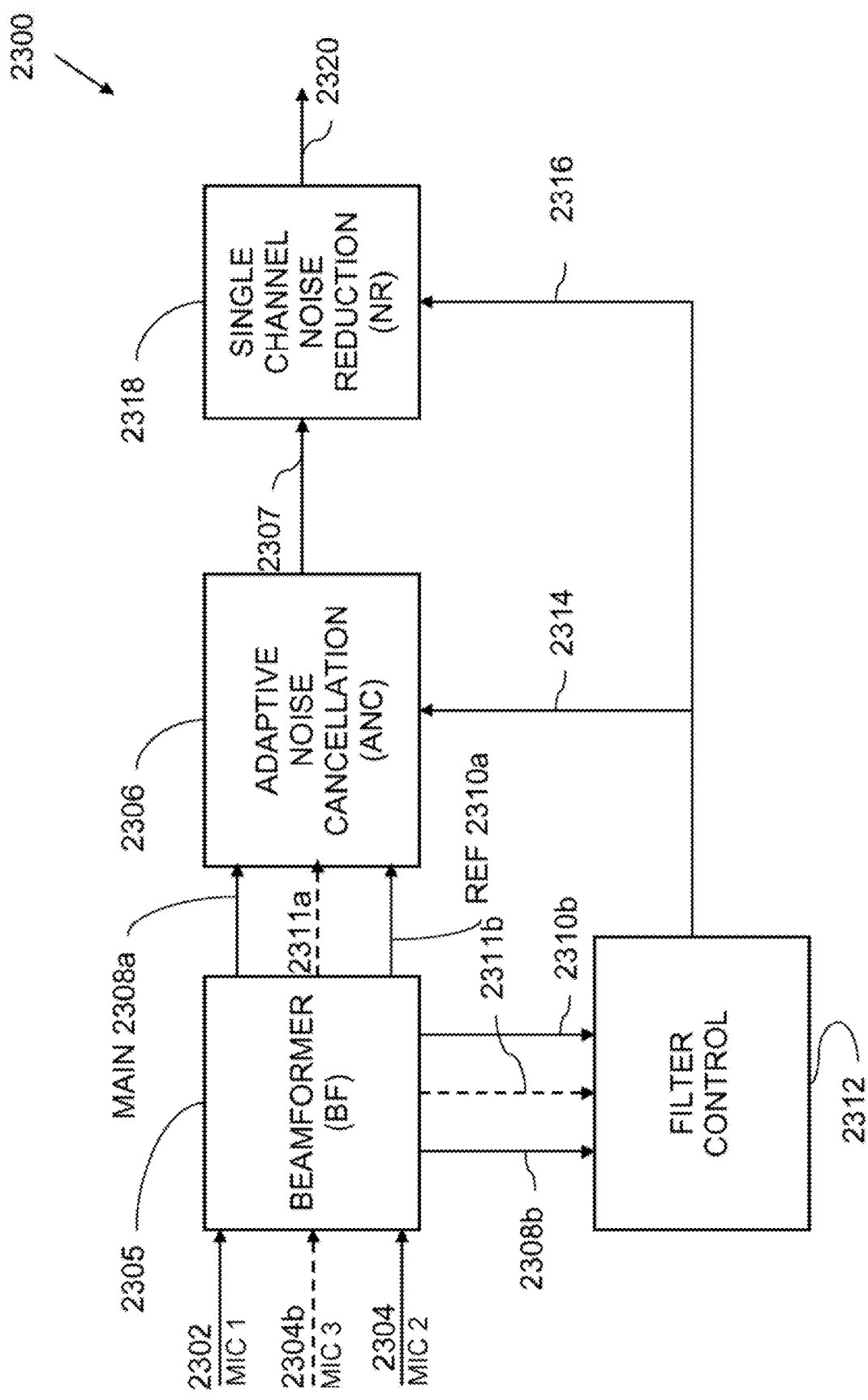
FIG. 23 illustrates another diagram of system architecture, according to embodiments of the invention.

FIG. 23 illustrates, generally at 2300, another diagram of system architecture, according to embodiments of the invention. With reference to FIG. 23, in the system architecture presented therein, a first channel provides acoustic signals from a first microphone at 2302 (nominally labeled in the figure as MIC 1). A second channel provides acoustic signals from a second microphone at 2304 (nominally labeled in the figure as MIC 2). In various embodiments, one or more microphones can be used to create the signal from the first microphone 2302. In various embodiments, one or more microphones can be used to create the signal from the second microphone 2304. In some embodiments, one or more acoustic elements can be used to create a signal that contributes to the signal from the first microphone 2302 and to the signal from the second microphone 2304 (see FIG. 25C described below). Thus, an acoustic element can be shared by 2302 and 2304. In various embodiments, arrangements of acoustic elements which provide the signals at 2302, 2304, the main channel, and the reference channel are described below in conjunction with the figures that follow.

A beamformer 2305 receives as inputs, the signal from the first microphone 2302 and the signal from the second microphone 2304 and optionally a signal from a third microphone 2304b (nominally labeled in the figure as MIC 3). The beamformer 2305 uses signals 2302, 2304 and optionally 2304b to create a main channel 2308a which contains both desired audio and undesired audio. The beamformer 2305 also uses signals 2302, 2304, and optionally 2304b to create one or more reference channels 2310a and optionally 2311a. A reference channel contains both desired audio and undesired audio. A signal-to-noise ratio of the main channel, referred to as "main channel signal-to-noise ratio" is greater than a signal-to-noise ratio of the reference channel, referred to herein as "reference channel signal-to-noise ratio." The beamformer 2305 and/or the arrangement of acoustic elements used for MIC 1 and MIC 2 provide for a main channel signal-to-noise ratio which is greater than the reference channel signal-to-noise ratio.

The beamformer 2305 is coupled to an adaptive noise cancellation unit 2306 and a filter control unit 2312. A main channel signal is output from the beamformer 2305 at 2308a and is input into an adaptive noise cancellation unit 2306. Similarly, a reference channel signal is output from the beamformer 2305 at 2310a and is input into the adaptive noise cancellation unit 2306. The main channel signal is also output from the beamformer 2305 and is input into a filter control 2312 at 2308b. Similarly, the reference channel signal is output from the beamformer 2305 and is input into the filter control 2312 at 2310b. Optionally, a second reference channel signal is output at 2311a and is input into the adaptive noise cancellation unit 2306 and the optional second reference channel signal is output at 2311b and is input into the filter control 2012.

The filter control 2312 uses inputs 2308b, 2310b, and optionally 2311b to produce channel activity flags and desired voice activity detection to provide filter control signal 2314 to the adaptive noise cancellation unit 2306 and filter control signal 2316 to a single channel noise reduction unit 2318.

The adaptive noise cancellation unit 2306 provides multi-channel filtering and filters a first amount of undesired audio from the main channel 2308a during a first stage of filtering to output a filtered main channel at 2307. The single channel noise reduction unit 2318 receives as an input the filtered main channel 2307 and provides a second stage of filtering, thereby further reducing undesired audio from 2307. The single channel noise reduction unit 2318 outputs mostly desired audio at 2320.

In various embodiments, different types of microphones can be used to provide the acoustic signals needed for the embodiments of the invention presented herein. Any transducer that converts a sound wave to an electrical signal is suitable for use with embodiments of the invention taught herein. Some non-limiting examples of microphones are, but are not limited to, a dynamic microphone, a condenser microphone, an Electret Condenser Microphone, (ECM), and a microelectromechanical systems (MEMS) microphone. In other embodiments a condenser microphone (CM) is used. In yet other embodiments micro-machined microphones are used. Microphones based on a piezoelectric film are used with other embodiments. Piezoelectric elements are made out of ceramic materials, plastic material, or film. In yet other embodiments, micromachined arrays of microphones are used. In yet other embodiments, silicon or polysilicon micromachined microphones are used. In some embodiments, bi-directional pressure gradient microphones are used to provide multiple acoustic channels. Various microphones or microphone arrays including the systems described herein can be mounted on or within structures such as eyeglasses or headsets.

Figure 24A:
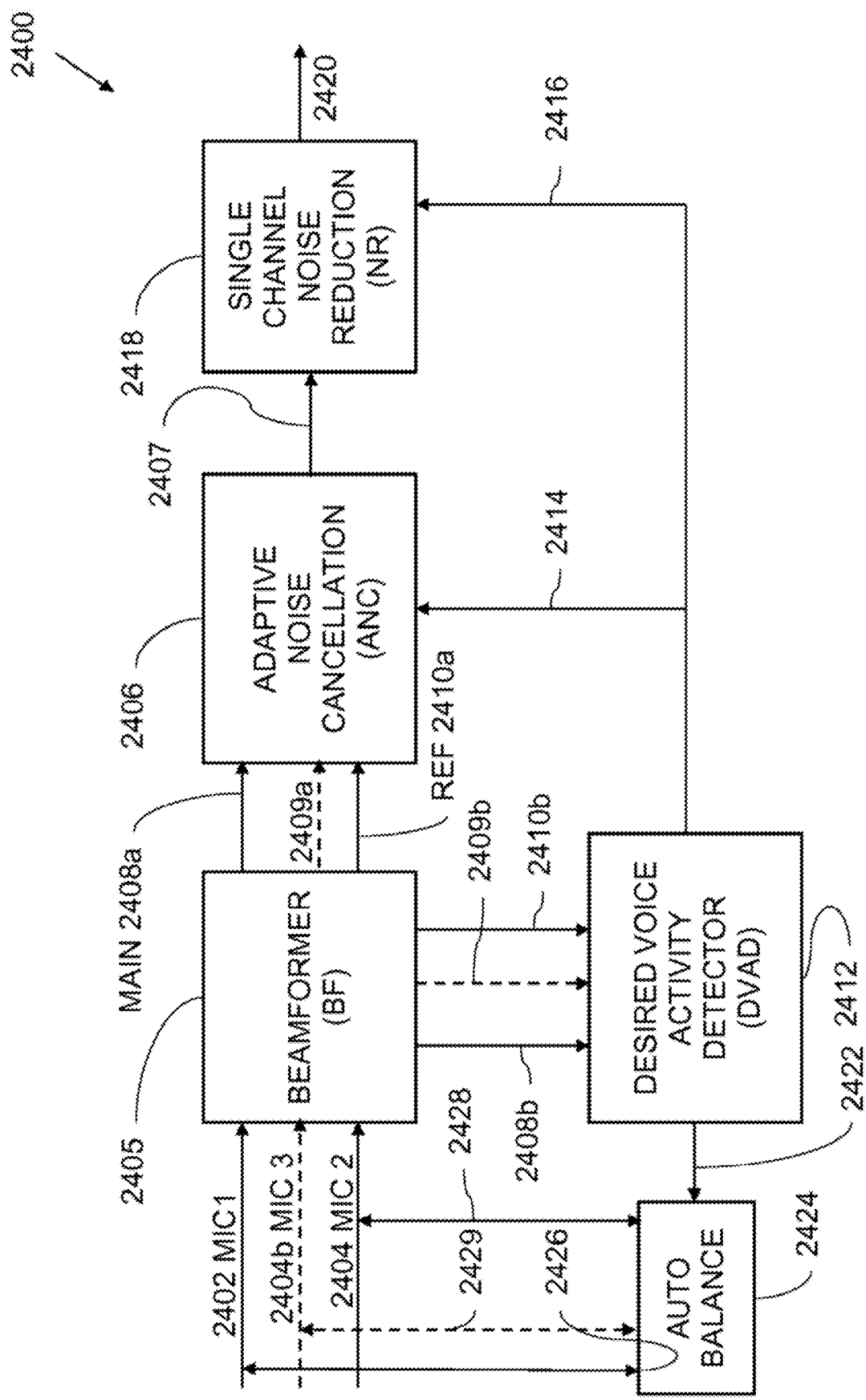
FIG. 24A illustrates another diagram of system architecture incorporating auto-balancing, according to embodiments of the invention.

FIG. 24A illustrates, generally at 2400, another diagram of system architecture incorporating auto-balancing, according to embodiments of the invention. With reference to FIG. 24A, in the system architecture presented therein, a first channel provides acoustic signals from a first microphone at 2402 (nominally labeled in the figure as MIC 1). A second channel provides acoustic signals from a second microphone at 2404 (nominally labeled in the figure as MIC 2). In various embodiments, one or more microphones can be used to create the signal from the first microphone 2402. In various embodiments, one or more microphones can be used to create the signal from the second microphone 2404. In some embodiments, as described above in conjunction with FIG. 23, one or more acoustic elements can be used to create a signal that becomes part of the signal from the first microphone 2402 and the signal from the second microphone 2404. In various embodiments, arrangements of acoustic elements which provide the signals 2402, 2404, the main channel, and the reference channel are described below in conjunction with the figures that follow.

A beamformer 2405 receives as inputs, the signal from the first microphone 2402 and the signal from the second microphone 2404. The beamformer 2405 uses signals 2402 and 2404 to create a main channel which contains both desired audio and undesired audio. The beamformer 2405 also uses signals 2402 and 2404 to create a reference channel. Optionally, a third channel provides acoustic signals from a third microphone at 2404b (nominally labeled in the figure as MIC 3), which are input into the beamformer 2405. In various embodiments, one or more microphones can be used to create the signal 2404b from the third microphone. The reference channel contains both desired audio and undesired audio. A signal-to-noise ratio of the main channel, referred to as "main channel signal-to-noise ratio" is greater than a signal-to-noise ratio of the reference channel, referred to herein as "reference channel signal-to-noise ratio." The beamformer 2405 and/or the arrangement of acoustic elements used for MIC 1, MIC 2, and optionally MIC 3 provide for a main channel signal-to-noise ratio that is greater than the reference channel signal-to-noise ratio. In some embodiments bi-directional pressure-gradient microphone elements provide the signals 2402, 2404, and optionally 2404b.

The beamformer 2405 is coupled to an adaptive noise cancellation unit 2406 and a desired voice activity detector 2412 (filter control). A main channel signal is output from the beamformer 2405 at 2408a and is input into an adaptive noise cancellation unit 2406. Similarly, a reference channel signal is output from the beamformer 2405 at 2410a and is input into the adaptive noise cancellation unit 2406. The main channel signal is also output from the beamformer 2405 and is input into the desired voice activity detector 2412 at 2408b. Similarly, the reference channel signal is output from the beamformer 2405 and is input into the desired voice activity detector 2412 at 2410b. Optionally, a second reference channel signal is output at 2409a from the beamformer 2405 and is input to the adaptive noise cancellation unit 2406, and the second reference channel signal is output at 2409b from the beamformer 2405 and is input to the desired vice activity detector 2412.

The desired voice activity detector 2412 uses input 2408b, 2410b, and optionally 2409b to produce filter control signal 2414 for the adaptive noise cancellation unit 2408 and filter control signal 2416 for a single channel noise reduction unit 2418. The adaptive noise cancellation unit 2406 provides multi-channel filtering and filters a first amount of undesired audio from the main channel 2408a during a first stage of filtering to output a filtered main channel at 2407. The single channel noise reduction unit 2418 receives as an input the filtered main channel 2407 and provides a second stage of filtering, thereby further reducing undesired audio from 2407. The single channel noise reduction unit 2418 outputs mostly desired audio at 2420

The desired voice activity detector 2412 provides a control signal 2422 for an auto-balancing unit 2424. The auto-balancing unit 2424 is coupled at 2426 to the signal path from the first microphone 2402. The auto-balancing unit 2424 is also coupled at 2428 to the signal path from the second microphone 2404. Optionally, the auto-balancing unit 2424 is also coupled at 2429 to the signal path from the third microphone 2404b. The auto-balancing unit 2424 balances the microphone response to far field signals over the operating life of the system. Keeping the microphone channels balanced increases the performance of the system and maintains a high level of performance by preventing drift of microphone sensitivities. The auto-balancing unit is described more fully below in conjunction with the figures that follow.

Figure 24B:
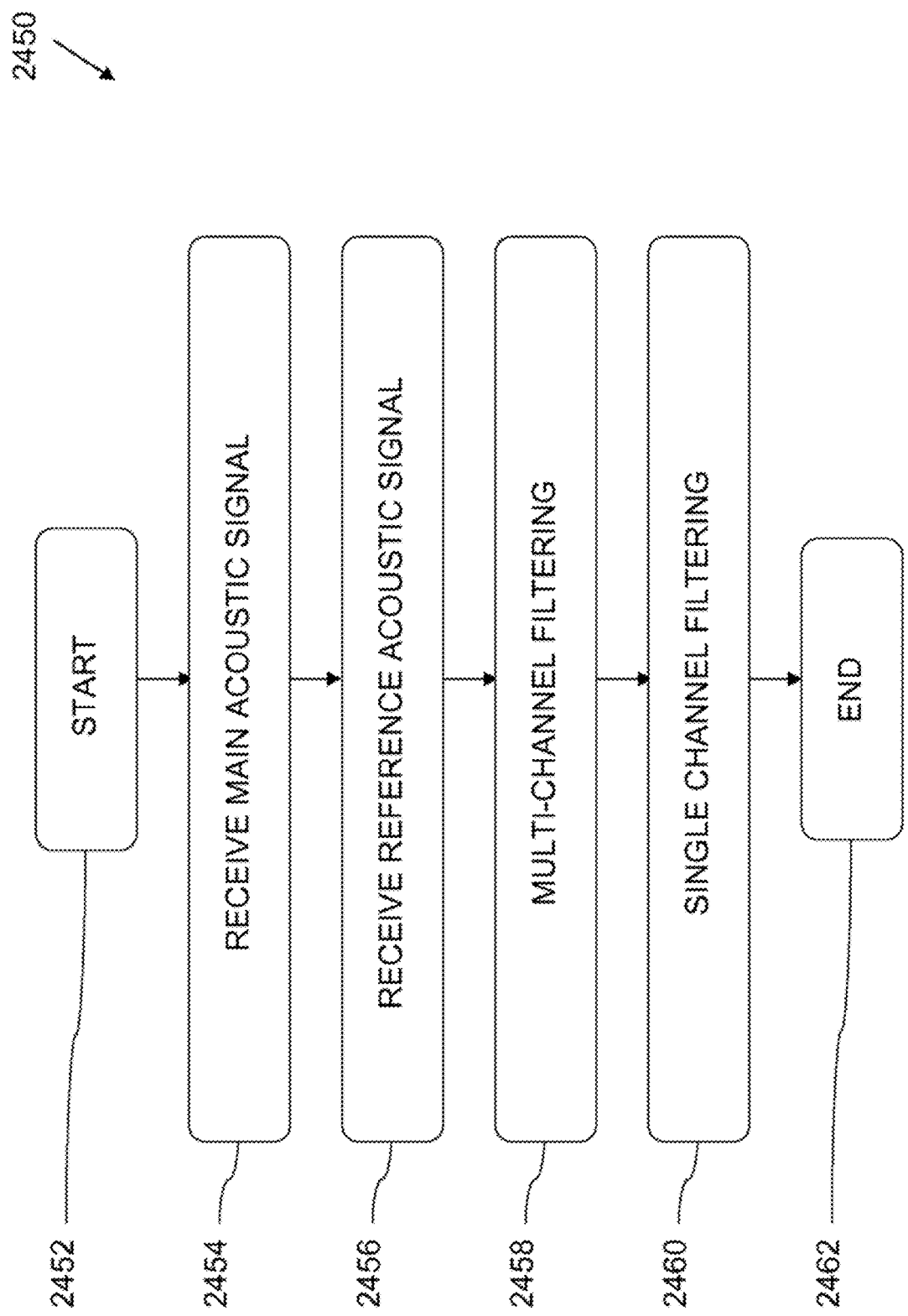
FIG. 24B illustrates processes for noise reduction, according to embodiments of the invention.

FIG. 24B illustrates, generally at 2450, processes for noise reduction, according to embodiments of the invention. With reference to FIG. 24B, a process begins at a block 2452. At a block 2454 a main acoustic signal is received by a system. The main acoustic signal can be for example, in various embodiments such a signal as is represented by 2102 (FIG. 21), 2302/2308a/2308b (FIG. 23), or 2402/2408a/2408b (FIG. 24A). At a block 2456 a reference acoustic signal is received by the system. The reference acoustic signal can be for example, in various embodiments such a signal as is represented by 2104 and optionally 2104b (FIG. 21), 2304/2310a/2310b and optionally 2304b/2311a/2311b (FIG. 23), or 2404/2410a/2410b and optionally 2404b/2409a/2409b (FIG. 24A). At a block 2458 adaptive filtering is performed with multiple channels of input, such as using for example the adaptive filter unit 2106 (FIG. 21), 2306 (FIG. 23), and 2406 (FIG. 24A) to provide a filtered acoustic signal for example as shown at 2107 (FIG. 21), 2307 (FIG. 23), and 2407 (FIG. 24A). At a block 2460 a single channel unit is used to filter the filtered acoustic signal which results from the process of the block 2458. The single channel unit can be for example, in various embodiments, such a unit as is represented by 2118 (FIG. 21), 2318 (FIG. 23), or 2418 (FIG. 24A). The process ends at a block 2462.

In various embodiments, the adaptive noise cancellation unit, such as 2106 (FIG. 21), 2306 (FIG. 23), and 2406 (FIG. 24A) is implemented in an integrated circuit device, which may include an integrated circuit package containing the integrated circuit. In some embodiments, the adaptive noise cancellation unit 2106 or 2306 or 2406 is implemented in a single integrated circuit die. In other embodiments, the adaptive noise cancellation unit 2106 or 2306 or 2406 is implemented in more than one integrated circuit die of an integrated circuit device which may include a multi-chip package containing the integrated circuit.

In various embodiments, the single channel noise cancellation unit, such as 2018 (FIG. 21), 2318 (FIG. 23), and 2418 (FIG. 24A) is implemented in an integrated circuit device, which may include an integrated circuit package containing the integrated circuit. In some embodiments, the single channel noise cancellation unit 2118 or 2318 or 2418 is implemented in a single integrated circuit die. In other embodiments, the single channel noise cancellation unit 2118 or 2318 or 2418 is implemented in more than one integrated circuit die of an integrated circuit device which may include a multi-chip package containing the integrated circuit.

In various embodiments, the filter control, such as 2112 (FIGS. 21 & 22) or 2312 (FIG. 23) is implemented in an integrated circuit device, which may include an integrated circuit package containing the integrated circuit. In some embodiments, the filter control 2112 or 2312 is implemented in a single integrated circuit die. In other embodiments, the filter control 2112 or 2312 is implemented in more than one integrated circuit die of an integrated circuit device which may include a multi-chip package containing the integrated circuit.

In various embodiments, the beamformer, such as 2305 (FIG. 23) or 2405 (FIG. 24A) is implemented in an integrated circuit device, which may include an integrated circuit package containing the integrated circuit. In some embodiments, the beamformer 2305 or 2405 is implemented in a single integrated circuit die. In other embodiments, the beamformer 2305 or 2405 is implemented in more than one integrated circuit die of an integrated circuit device which may include a multi-chip package containing the integrated circuit.

Figure 25A:
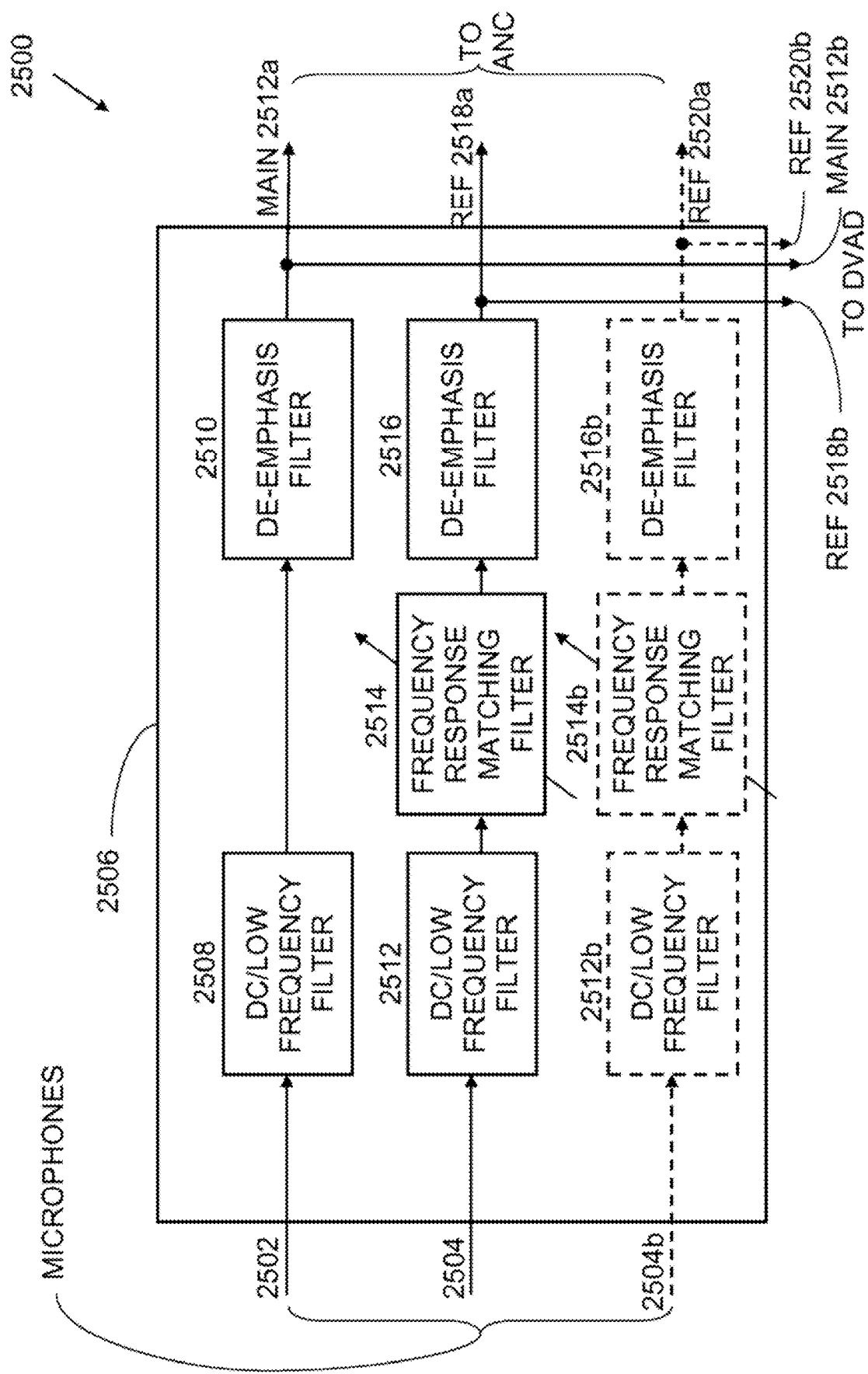
FIG. 25A illustrates beamforming according to embodiments of the invention.

FIG. 25A illustrates, generally at 2500, beamforming according to embodiments of the invention. With reference to FIG. 25A, a beamforming block 2506 is applied to two microphone inputs 2502 and 2504. In one or more embodiments, the microphone input 2502 can originate from a first directional microphone and the microphone input 2504 can originate from a second directional microphone or microphone signals 2502 and 2504 can originate from omni-directional microphones. In yet other embodiments, microphone signals 2502 and 2504 are provided by the outputs of a bi-directional pressure gradient microphone. Various directional microphones can be used, such as but not limited to, microphones having a cardioid beam pattern, a dipole beam pattern, an omni-directional beam pattern, or a user defined beam pattern. In some embodiments, one or more acoustic elements are configured to provide the microphone input 2502 and 2504.

In various embodiments, beamforming block 2506 includes a filter 2508. Depending on the type of microphone used and the specific application, the filter 2508 can provide a direct current (DC) blocking filter which filters the DC and very low frequency components of Microphone input 2502. Following the filter 2508, in some embodiments additional filtering is provided by a filter 2510. Some microphones have non-flat responses as a function of frequency. In such a case, it can be desirable to flatten the frequency response of the microphone with a de-emphasis filter. The filter 2510 can provide de-emphasis, thereby flattening a microphone's frequency response. Following de-emphasis filtering by the filter 2510, a main microphone channel is supplied to the adaptive noise cancellation unit at 2512a and the desired voice activity detector at 2512b.

A microphone input 2504 is input into the beamforming block 2506 and in some embodiments is filtered by a filter 2512. Depending on the type of microphone used and the specific application, the filter 2512 can provide a direct current (DC) blocking filter which filters the DC and very low frequency components of Microphone input 2504. A filter 2514 filters the acoustic signal which is output from the filter 2512. The filter 2514 adjusts the gain, phase, and can also shape the frequency response of the acoustic signal. Following the filter 2514, in some embodiments additional filtering is provided by a filter 2516. Some microphones have non-flat responses as a function of frequency. In such a case, it can be desirable to flatten the frequency response of the microphone with a de-emphasis filter. The filter 2516 can provide de-emphasis, thereby flattening a microphone's frequency response. Following de-emphasis filtering by the filter 2516, a reference microphone channel is supplied to the adaptive noise cancellation unit at 2518*a* and to the desired voice activity detector at 2518*b*.

Optionally, a third microphone channel is input at 2504*b* into the beamforming block 2506. Similar to the signal path described above for the channel 2504, the third microphone channel is filtered by a filter 2512*b*. Depending on the type of microphone used and the specific application, the filter 2512*b* can provide a direct current (DC) blocking filter which filters the DC and very low frequency components of Microphone input 2504*b*. A filter 2514*b* filters the acoustic signal which is output from the filter 2512*b*. The filter 2514*b* adjusts the gain, phase, and can also shape the frequency response of the acoustic signal. Following the filter 2514*b*, in some embodiments additional filtering is provided by a filter 2516*b*. Some microphones have non-flat responses as a function of frequency. In such a case, it can be desirable to flatten the frequency response of the microphone with a de-emphasis filter. The filter 2516*b* can provide de-emphasis, thereby flattening a microphone's frequency response. Following de-emphasis filtering by the filter 2516*b*, a second reference microphone channel is supplied to the adaptive noise cancellation unit at 2520*a* and to the desired voice activity detector at 2520*b*

Figure 25B:
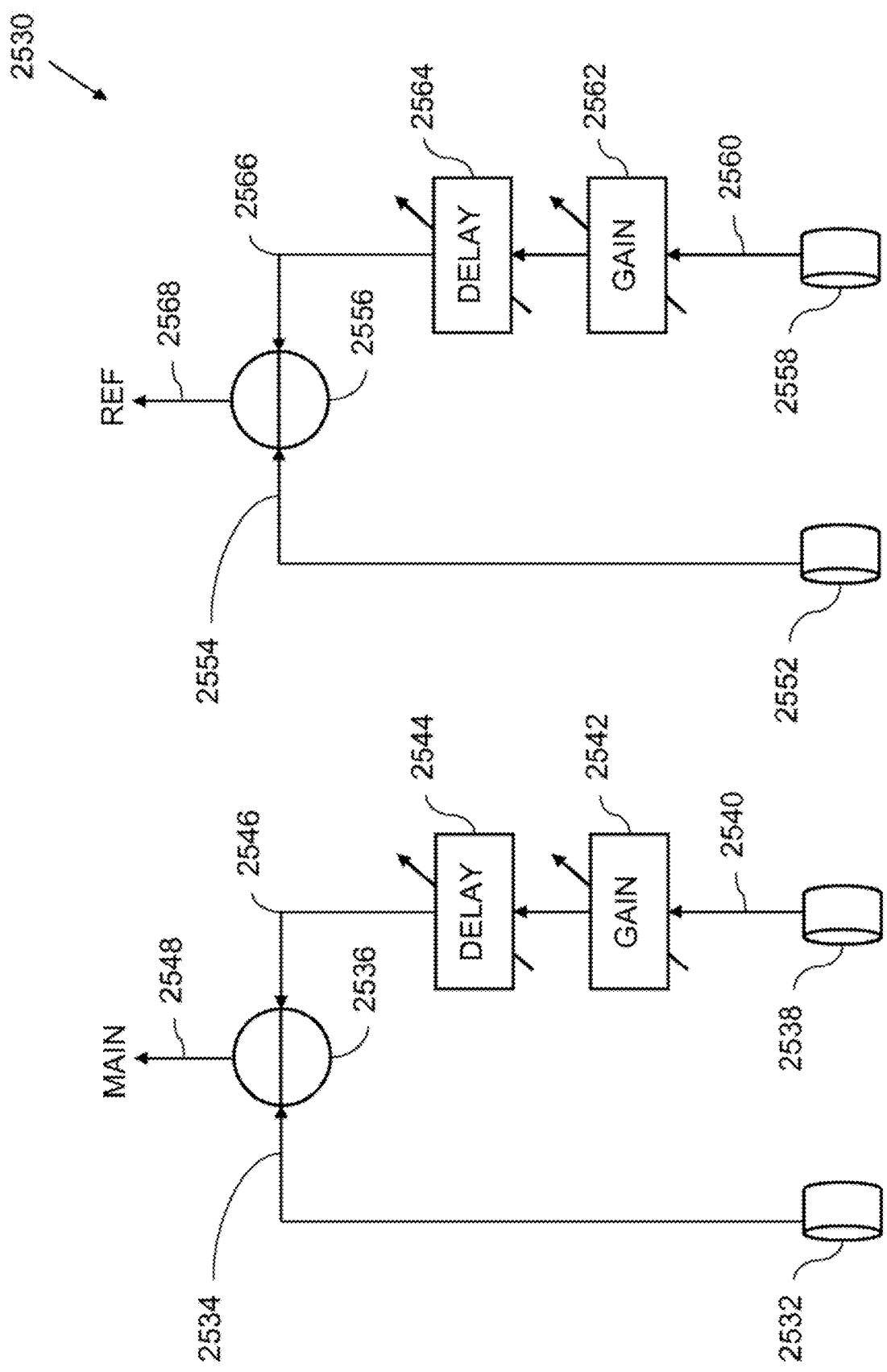
FIG. 25B presents another illustration of beamforming according to embodiments of the invention.

FIG. 25B presents, generally at 2530, another illustration of beamforming according to embodiments of the invention. With reference to FIG. 25B, a beam pattern is created for a main channel using a first microphone 2532 and a second microphone 2538. A signal 2534 output from the first microphone 2532 is input to an adder 2536. A signal 2540 output from the second microphone 2538 has its amplitude adjusted at a block 2542 and its phase adjusted by applying a delay at a block 2544 resulting in a signal 2546 which is input to the adder 2536. The adder 2536 subtracts one signal from the other resulting in output signal 2548. Output signal 2548 has a beam pattern which can take on a variety of forms depending on the initial beam patterns of microphone 2532 and 2538 and the gain applied at 2542 and the delay applied at 2544. By way of non-limiting example, beam patterns can include cardioid, dipole, etc.

A beam pattern is created for a reference channel using a third microphone 2552 and a fourth microphone 2558. A signal 2554 output from the third microphone 2552 is input to an adder 2556. A signal 2560 output from the fourth microphone 2558 has its amplitude adjusted at a block 2562 and its phase adjusted by applying a delay at a block 2564 resulting in a signal 2566 which is input to the adder 2556. The adder 2556 subtracts one signal from the other resulting in output signal 2568. Output signal 2568 has a beam pattern which can take on a variety of forms depending on the initial beam patterns of microphone 2552 and 2558 and the gain applied at 2562 and the delay applied at 2564. By way of non-limiting example, beam patterns can include cardioid, dipole, etc.

Figure 25C:
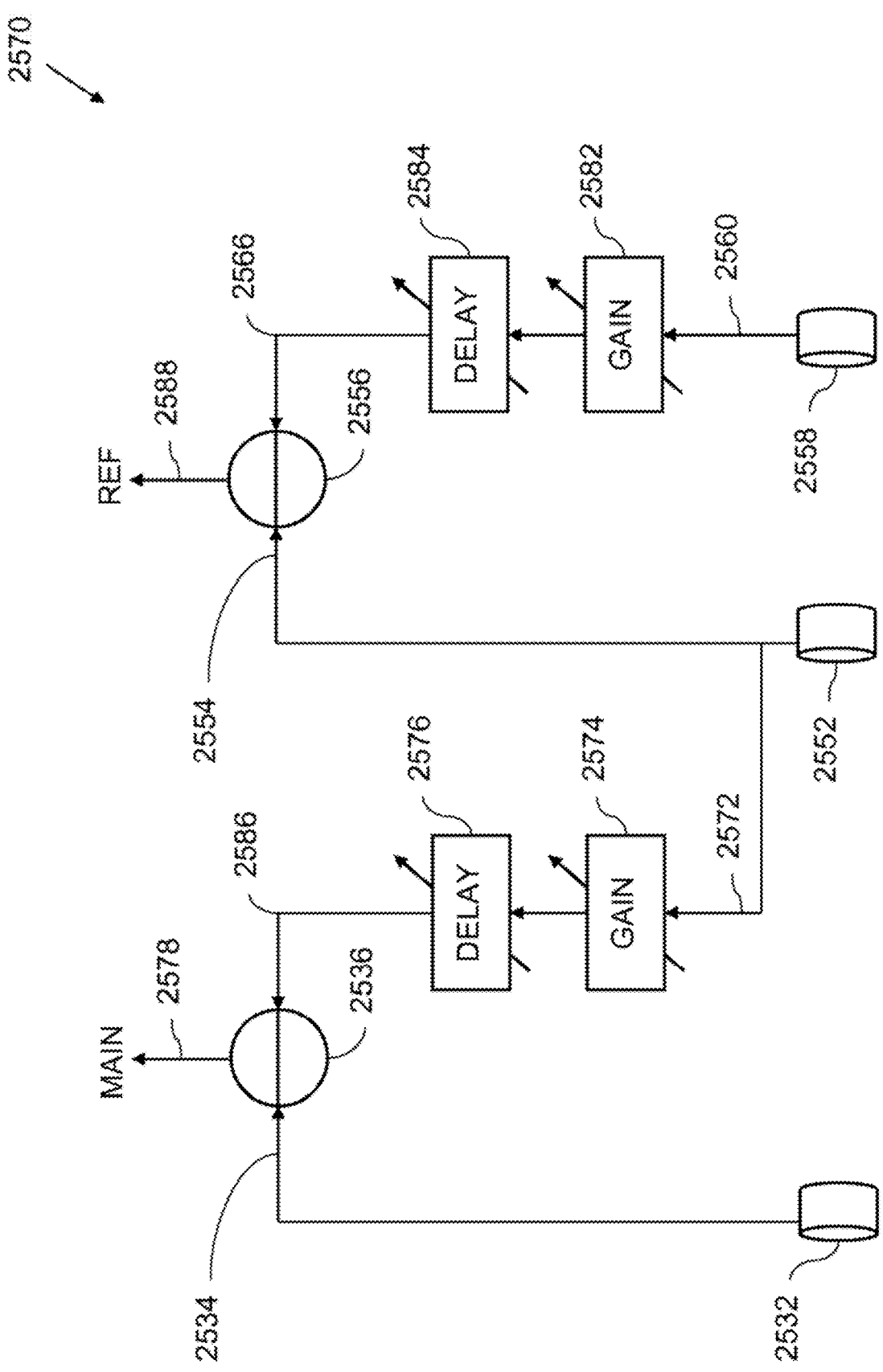
FIG. 25C illustrates beamforming with shared acoustic elements according to embodiments of the invention.

FIG. 25C illustrates, generally at 2570, beamforming with shared acoustic elements according to embodiments of the invention. With reference to FIG. 25C, a microphone 2552 is shared between the main acoustic channel and the reference acoustic channel. The output from microphone 2552 is split and travels at 2572 to gain 2574 and to delay 2576 and is then input at 2586 into the adder 2536. Appropriate gain at 2574 and delay at 2576 can be selected to achieve equivalently an output 2578 from the adder 2536 which is equivalent to the output 2548 from adder 2536 (FIG. 25B). Similarly gain 2582 and delay 2584 can be adjusted to provide an output signal 2588 which is equivalent to 2568 (FIG. 25B). By way of non-limiting example, beam patterns can include cardioid, dipole, etc.

FIG. 26 illustrates, generally at 2600, multi-channel adaptive filtering according to embodiments of the invention. With reference to FIG. 26, embodiments of an adaptive filter unit are illustrated with a main channel 2604 (containing a microphone signal) input into a delay element 2606. A reference channel 2602 (containing a microphone signal) is input into an adaptive filter 2608. In various embodiments, the adaptive filter 2608 can be an adaptive FIR filter designed to implement normalized least-mean-square-adaptation (NLMS) or another algorithm. Embodiments of the invention are not limited to NLMS adaptation. The adaptive FIR filter filters an estimate of desired audio from the reference signal 2602. In one or more embodiments, an output 2609 of the adaptive filter 2608 is input into an adder 2610. The delayed main channel signal 2607 is input into the adder 2610 and the output 2609 is subtracted from the delayed main channel signal 2607. The output of the adder 2616 provides a signal containing desired audio with a reduced amount of undesired audio.

Many environments that acoustic systems employing embodiments of the invention are used in present reverberant conditions. Reverberation results in a form of noise and contributes to the undesired audio which is the object of the filtering and signal extraction described herein. In various embodiments, the two channel adaptive FIR filtering represented at 2600 models the reverberation between the two channels and the environment they are used in. Thus, undesired audio propagates along the direct path and the reverberant path requiring the adaptive FIR filter to model the impulse response of the environment. Various approximations of the impulse response of the environment can be made depending on the degree of precision needed. In one non-limiting example, the amount of delay is approximately equal to the impulse response time of the environment. In another non-limiting example, the amount of delay is greater than an impulse response of the environment. In one embodiment, an amount of delay is approximately equal to a multiple n of the impulse response time of the environment, where n can equal 2 or 3 or more for example. Alternatively, an amount of delay is not an integer number of impulse response times, such as for example, 0.5, 1.4, 2.75, etc. For example, in one embodiment, the filter length is approximately equal to twice the delay chosen for 2606. Therefore, if an adaptive filter having 200 taps is used, the length of the delay 2606 would be approximately equal to a time delay of 100 taps. A time delay equivalent to the propagation time through 100 taps is provided merely for illustration and does not imply any form of limitation to embodiments of the invention.

Embodiments of the invention can be used in a variety of environments which have a range of impulse response times. Some examples of impulse response times are given as non-limiting examples for the purpose of illustration only and do not limit embodiments of the invention. For example, an office environment typically has an impulse response time of approximately 100 milliseconds to 200 milliseconds. The interior of a vehicle cabin can provide impulse response times ranging from 30 milliseconds to 60 milliseconds. In general, embodiments of the invention are used in environments whose impulse response times can range from several milliseconds to 500 milliseconds or more.

The adaptive filter unit 2600 is in communication at 2614 with inhibit logic such as inhibit logic 2214 and filter control signal 2114 (FIG. 22). Signals 2614 controlled by inhibit logic 2214 are used to control the filtering performed by the filter 2608 and adaptation of the filter coefficients. An output 2616 of the adaptive filter unit 2600 is input to a single channel noise cancellation unit such as those described above in the preceding figures, for example; 2118 (FIG. 21), 2318 (FIG. 23), and 2418 (FIG. 24A). A first level of undesired audio has been extracted from the main acoustic channel resulting in the output 2616. Under various operating conditions the level of the noise, i.e., undesired audio can be very large relative to the signal of interest, i.e., desired audio. Embodiments of the invention are operable in conditions where some difference in signal-to-noise ratio between the main and reference channels exists. In some embodiments, the differences in signal-to-noise ratio are on the order of 1 decibel (dB) or less. In other embodiments, the differences in signal-to-noise ratio are on the order of 1 decibel (dB) or more. The output 2616 is filtered additionally to reduce the amount of undesired audio contained therein in the processes that follow using a single channel noise reduction unit.

Inhibit logic, described in FIG. 22 above including signal 2614 (FIG. 26) provide for the substantial non-operation of filter 2608 and no adaptation of the filter coefficients when either the main or the reference channels are determined to be inactive. In such a condition, the signal present on the main channel 2604 is output at 2616.

If the main channel and the reference channels are active and desired audio is detected or a pause threshold has not been reached then adaptation is disabled, with filter coefficients frozen, and the signal on the reference channel 2602 is filtered by the filter 2608 subtracted from the main channel 2607 with adder 2610 and is output at 2616.

If the main channel and the reference channel are active and desired audio is not detected and the pause threshold (also called pause time) is exceeded then filter coefficients are adapted. A pause threshold is application dependent. For example, in one non-limiting example, in the case of Automatic Speech Recognition (ASR) the pause threshold can be approximately a fraction of a second.

Figure 27:
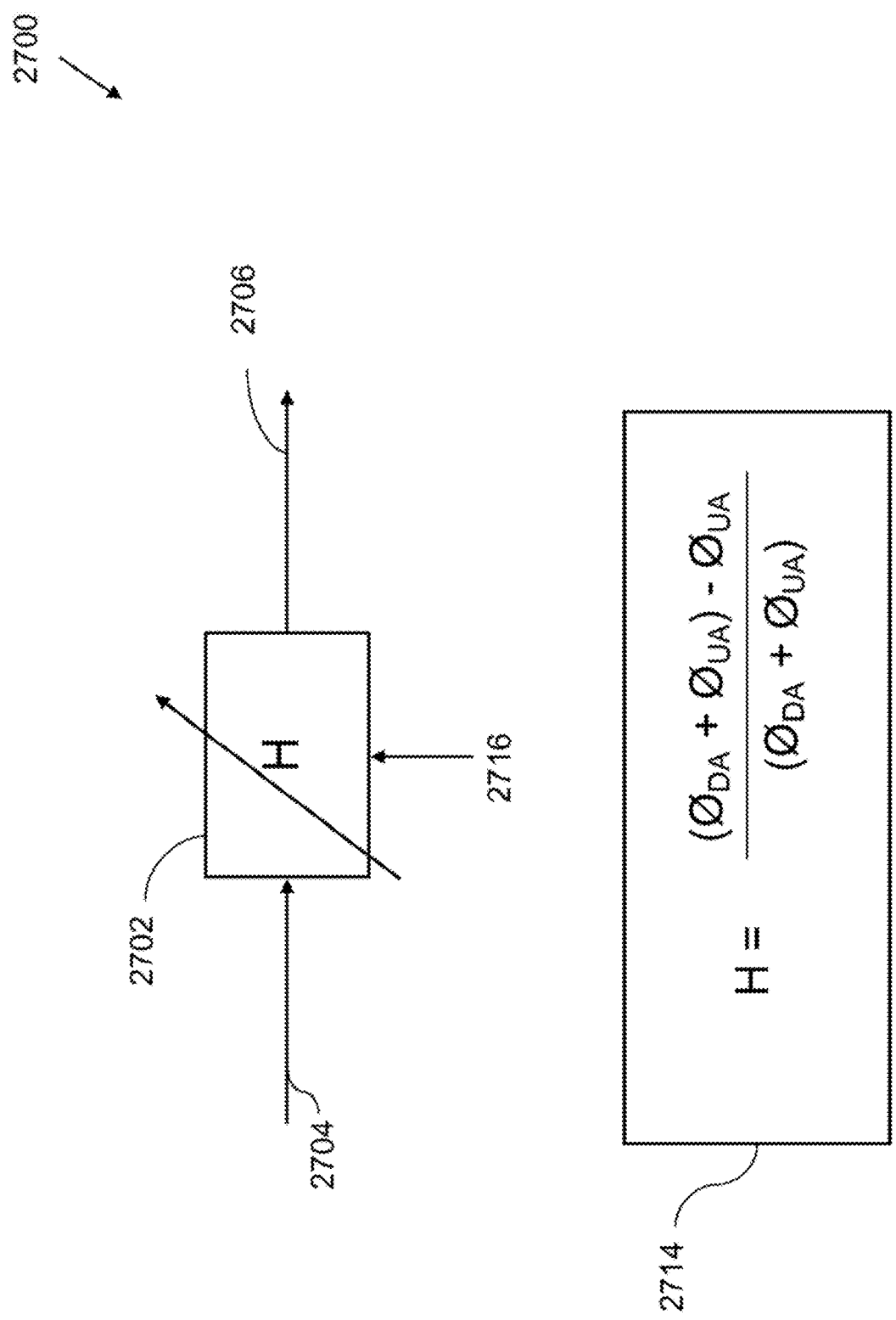
FIG. 27 illustrates single channel filtering according to embodiments of the invention.

FIG. 27 illustrates, generally at 2700, single channel filtering according to embodiments of the invention. With reference to FIG. 27, a single channel noise reduction unit utilizes a linear filter having a single channel input. Examples of filters suitable for use therein are a Wiener filter, a filter employing Minimum Mean Square Error (MMSE), etc. An output from an adaptive noise cancellation unit (such as one described above in the preceding figures) is input at 2704 into a filter 2702. The input signal 2704 contains desired audio and a noise component, i.e., undesired audio, represented in equation 2714 as the total power $(\emptyset_{DA}+\emptyset_{UA})$. The filter 2702 applies the equation shown at 2714 to the input signal 2704. An estimate for the total power $(\emptyset_{DA}+\emptyset_{UA})$ is one term in the numerator of equation 2714 and is obtained from the input to the filter 2704. An estimate for the noise $\emptyset_{UA}$, i.e., undesired audio, is obtained when desired audio is absent from signal 2704. The noise estimate $\emptyset_{UA}$ is the other term in the numerator, which is subtracted from the total power $(\emptyset_{DA}+\emptyset_{UA})$. The total power is the term in the denominator of equation 2714. The estimate of the noise $\emptyset_{UA}$ (obtained when desired audio is absent) is obtained from the input signal 2704 as informed by signal 2716 received from inhibit logic, such as inhibit logic 2214 (FIG. 22) which indicates when desired audio is present as well as when desired audio is not present. The noise estimate is updated when desired audio is not present on signal 2704. When desired audio is present, the noise estimate is frozen and the filtering proceeds with the noise estimate previously established during the last interval when desired audio was not present.

Figure 28A:
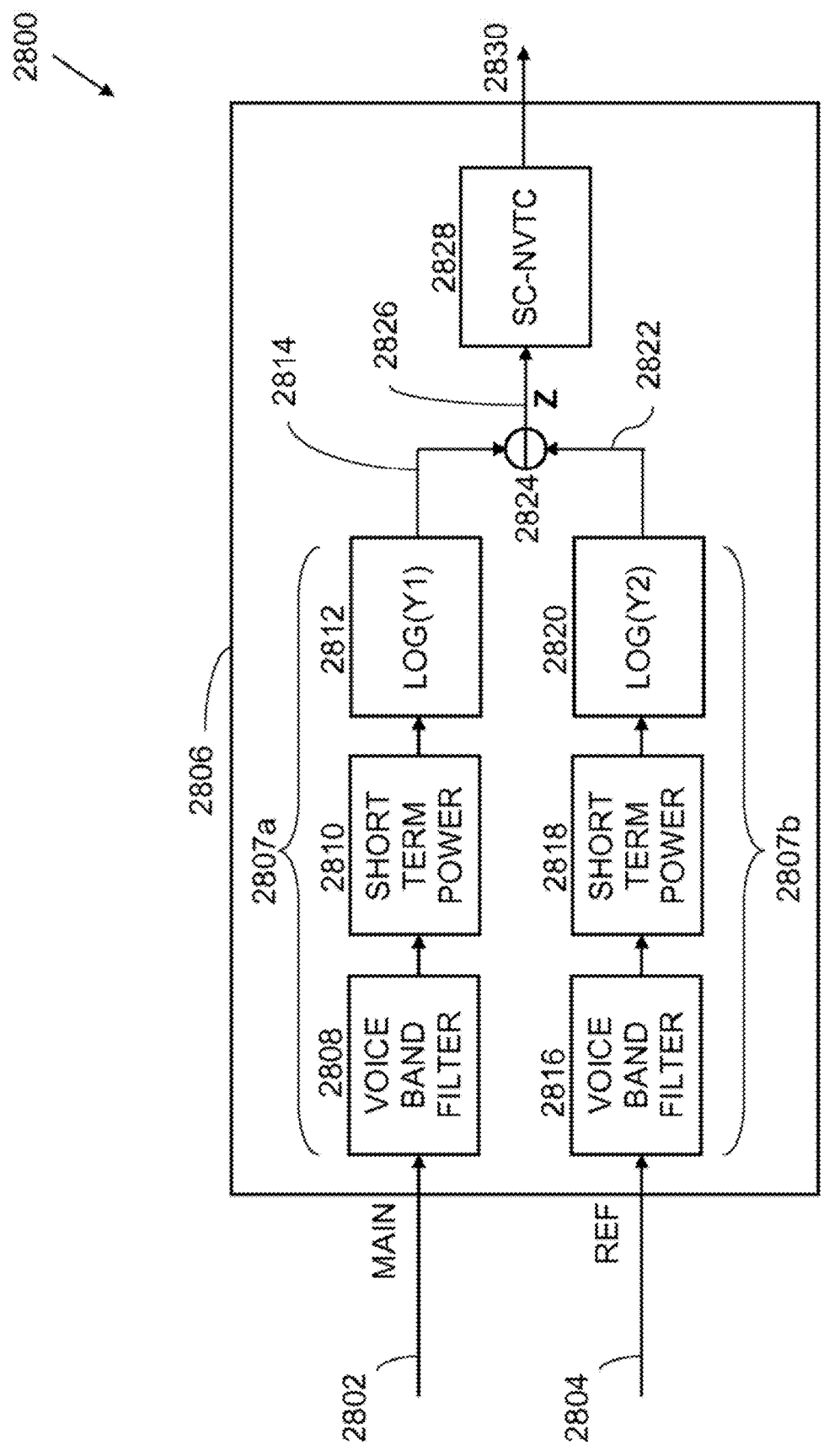
FIG. 28A illustrates desired voice activity detection according to embodiments of the invention.

FIG. 28A illustrates, generally at 2800, desired voice activity detection according to embodiments of the invention. With reference to FIG. 28A, a dual input desired voice detector is shown at 2806. Acoustic signals from a main channel are input at 2802, from for example, a beamformer or from a main acoustic channel as described above in conjunction with the previous figures, to a first signal path 2807a of the dual input desired voice detector 2806. The first signal path 2807a includes a voice band filter 2808. The voice band filter 2808 captures the majority of the desired voice energy in the main acoustic channel 2802. In various embodiments, the voice band filter 2808 is a band-pass filter characterized by a lower corner frequency an upper corner frequency and a roll-off from the upper corner frequency. In various embodiments, the lower corner frequency can range from 50 to 300 Hz depending on the application. For example, in wide band telephony, a lower corner frequency is approximately 50 Hz. In standard telephony the lower corner frequency is approximately 300 Hz. The upper corner frequency is chosen to allow the filter to pass a majority of the speech energy picked up by a relatively flat portion of the microphone's frequency response. Thus, the upper corner frequency can be placed in a variety of locations depending on the application. A non-limiting example of one location is 2,500 Hz. Another non-limiting location for the upper corner frequency is 4,000 Hz.

The first signal path 2807a includes a short-term power calculator 2810. Short-term power calculator 2810 is implemented in various embodiments as a root mean square (RMS) measurement, a power detector, an energy detector, etc. Short-term power calculator 2810 can be referred to synonymously as a short-time power calculator 2810. The short-term power detector 2810 calculates approximately the instantaneous power in the filtered signal. The output of the short-term power detector 2810 (Y1) is input into a signal compressor 2812. In various embodiments compressor 2812 converts the signal to the $\text{Log}_2$ domain, $\text{Log}_{10}$ domain, etc. In other embodiments, the compressor 2812 performs a user defined compression algorithm on the signal Y1.

Similar to the first signal path described above, acoustic signals from a reference acoustic channel are input at 2804, from for example, a beamformer or from a reference acoustic channel as described above in conjunction with the previous figures, to a second signal path 2807b of the dual input desired voice detector 2806. The second signal path 2807b includes a voice band filter 2816. The voice band filter 2816 captures the majority of the desired voice energy in the reference acoustic channel 2804. In various embodiments, the voice band filter 2816 is a band-pass filter characterized by a lower corner frequency an upper corner frequency and a roll-off from the upper corner frequency as described above for the first signal path and the voice-band filter 2808.

The second signal path 2807b includes a short-term power calculator 2818. Short-term power calculator 2818 is implemented in various embodiments as a root mean square (RMS) measurement, a power detector, an energy detector, etc. Short-term power calculator 2818 can be referred to synonymously as a short-time power calculator 2818. The short-term power detector 2818 calculates approximately the instantaneous power in the filtered signal. The output of the short-term power detector 2818 (Y2) is input into a signal compressor 2820. In various embodiments compressor 2820 converts the signal to the $\text{Log}_2$ domain, $\text{Log}_{10}$ domain, etc. In other embodiments, the compressor 2820 performs a user defined compression algorithm on the signal Y2.

The compressed signal from the second signal path 2822 is subtracted from the compressed signal from the first signal path 2814 at a subtractor 2824, which results in a normalized main signal at 2826 (Z). In other embodiments, different compression functions are applied at 2812 and 2820 which result in different normalizations of the signal at 2826. In other embodiments, a division operation can be applied at 2824 to accomplish normalization when logarithmic compression is not implemented. Such as for example when compression based on the square root function is implemented.

The normalized main signal 2826 is input to a single channel normalized voice threshold comparator (SC-NVTC) 2828, which results in a normalized desired voice activity detection signal 2830. Note that the architecture of the dual channel voice activity detector provides a detection of desired voice using the normalized desired voice activity detection signal 2830 that is based on an overall difference in signal-to-noise ratios for the two input channels. Thus, the normalized desired voice activity detection signal 2830 is based on the integral of the energy in the voice band and not on the energy in particular frequency bins, thereby maintaining linearity within the noise cancellation units described above. The compressed signals 2814 and 2822, utilizing logarithmic compression, provide an input at 2826 (Z) which has a noise floor that can take on values that vary from below zero to above zero (see column 2895c, column 2895d, or column 2895e FIG. 28E below), unlike an uncompressed single channel input which has a noise floor which is always above zero (see column 2895b FIG. 28E below).

Figure 28B:
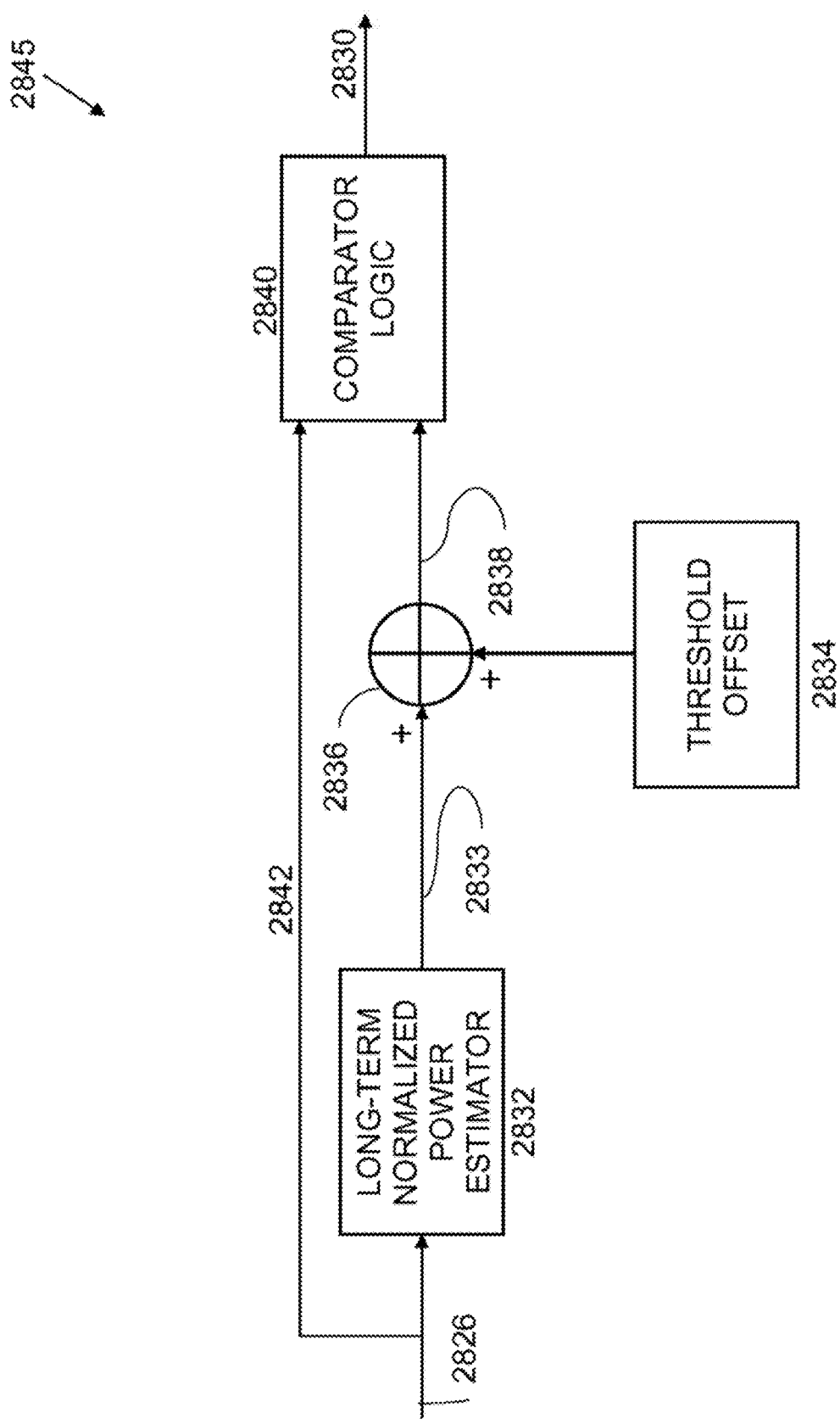
FIG. 28B illustrates a normalized voice threshold comparator according to embodiments of the invention.

FIG. 28B illustrates, generally at 2850, a single channel normalized voice threshold comparator (SC-NVTC) according to embodiments of the invention. With reference to FIG. 28B, a normalized main signal 2826 is input into a long-term normalized power estimator 2832. The long-term normalized power estimator 2832 provides a running estimate of the normalized main signal 2826. The running estimate provides a floor for desired audio. An offset value 2834 is added in an adder 2836 to a running estimate of the output of the long-term normalized power estimator 2832. The output of the adder 2838 is input to comparator 2840. An instantaneous estimate 2842 of the normalized main signal 2826 is input to the comparator 2840. The comparator 2840 contains logic that compares the instantaneous value at 2842 to the running ratio plus offset at 2838. If the value at 2842 is greater than the value at 2838, desired audio is detected and a flag is set accordingly and transmitted as part of the normalized desired voice activity detection signal 2830. If the value at 2842 is less than the value at 2838 desired audio is not detected and a flag is set accordingly and transmitted as part of the normalized desired voice activity detection signal 2830. The long-term normalized power estimator 2832 averages the normalized main signal 2826 for a length of time sufficiently long in order to slow down the change in amplitude fluctuations. Thus, amplitude fluctuations are slowly changing at 2833. The averaging time can vary from a fraction of a second to minutes, by way of non-limiting examples. In various embodiments, an averaging time is selected to provide slowly changing amplitude fluctuations at the output of 2832.

Figure 28C:
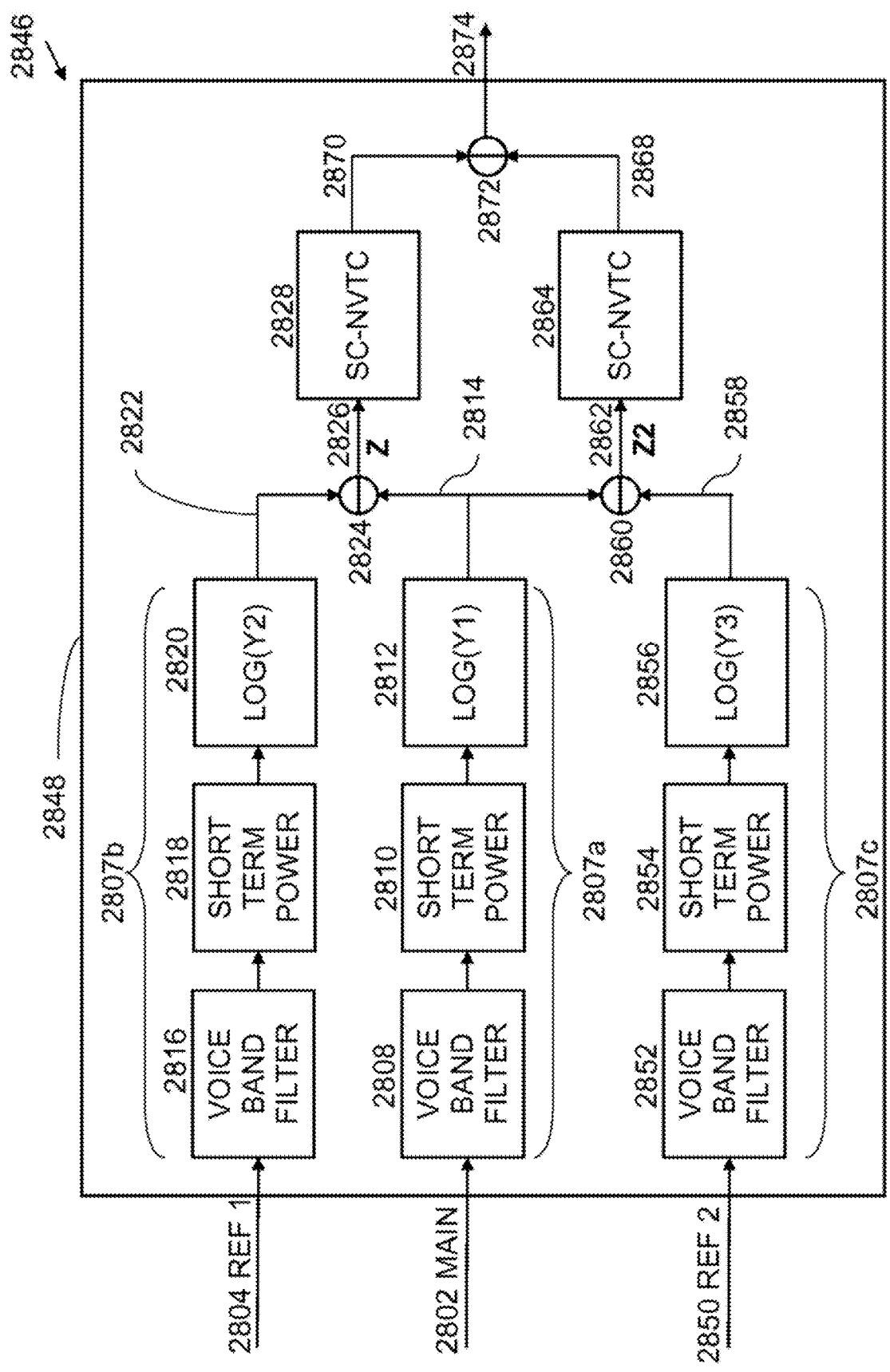
FIG. 28C illustrates desired voice activity detection utilizing multiple reference channels, according to embodiments of the invention.

FIG. 28C illustrates, generally at 2846, desired voice activity detection utilizing multiple reference channels, according to embodiments of the invention. With reference to FIG. 28C, a desired voice detector is shown at 2848. The desired voice detector 2848 includes as an input the main channel 2802 and the first signal path 2807a (described above in conjunction with FIG. 28A) together with the reference channel 2804 and the second signal path 2807b (also described above in conjunction with FIG. 28A). In addition thereto, is a second reference acoustic channel 2850 which is input into the desired voice detector 2848 and is part of a third signal path 2807c. Similar to the second signal path 2807b (described above), acoustic signals from the second reference acoustic channel are input at 2850, from for example, a beamformer or from a second reference acoustic channel as described above in conjunction with the previous figures, to a third signal path 2807c of the multi-input desired voice detector 2848. The third signal path 2807c includes a voice band filter 2852. The voice band filter 2852 captures the majority of the desired voice energy in the second reference acoustic channel 2850. In various embodiments, the voice band filter 2852 is a band-pass filter characterized by a lower corner frequency an upper corner frequency and a roll-off from the upper corner frequency as described above for the second signal path and the voice-band filter 2808.

The third signal path 2807c includes a short-term power calculator 2854. Short-term power calculator 2854 is implemented in various embodiments as a root mean square (RMS) measurement, a power detector, an energy detector, etc. Short-term power calculator 2854 can be referred to synonymously as a short-time power calculator 2854. The short-term power detector 2854 calculates approximately the instantaneous power in the filtered signal. The output of the short-term power detector 2854 is input into a signal compressor 2856. In various embodiments compressor 2856 converts the signal to the $Log_2$ domain, $Log_{10}$ domain, etc. In other embodiments, the compressor 2854 performs a user defined compression algorithm on the signal Y3.

The compressed signal from the third signal path 2858 is subtracted from the compressed signal from the first signal path 2814 at a subtractor 2860, which results in a normalized main signal at 2862 (Z2). In other embodiments, different compression functions are applied at 2856 and 2812 which result in different normalizations of the signal at 2862. In other embodiments, a division operation can be applied at 2860 when logarithmic compression is not implemented. Such as for example when compression based on the square root function is implemented.

The normalized main signal 2862 is input to a single channel normalized voice threshold comparator (SC-NVTC) 2864, which results in a normalized desired voice activity detection signal 2868. Note that the architecture of the multi-channel voice activity detector provides a detection of desired voice using the normalized desired voice activity detection signal 2868 that is based on an overall difference in signal-to-noise ratios for the two input channels. Thus, the normalized desired voice activity detection signal 2868 is based on the integral of the energy in the voice band and not on the energy in particular frequency bins, thereby maintaining linearity within the noise cancellation units described above. The compressed signals 2814 and 2858, utilizing logarithmic compression, provide an input at 2862 (Z2) which has a noise floor that can take on values that vary from below zero to above zero (see column 2895c, column 2895d, or column 2895e FIG. 28E below), unlike an uncompressed single channel input which has a noise floor which is always above zero (see column 2895b FIG. 28E below).

The desired voice detector 2848, having a multi-channel input with at least two reference channel inputs, provides two normalized desired voice activity detection signals 2868 and 2870 which are used to output a desired voice activity signal 2874. In one embodiment, normalized desired voice activity detection signals 2868 and 2870 are input into a logical OR-gate 2872. The logical OR-gate outputs the desired voice activity signal 2874 based on its inputs 2868 and 2870. In yet other embodiments, additional reference channels can be added to the desired voice detector 2848. Each additional reference channel is used to create another normalized main channel which is input into another single channel normalized voice threshold comparator (SC-NVTC) (not shown). An output from the additional single channel normalized voice threshold comparator (SC-NVTC) (not shown) is combined with 2874 via an additional exclusive OR-gate (also not shown) (in one embodiment) to provide the desired voice activity signal which is output as described above in conjunction with the preceding figures. Utilizing additional reference channels in a multi-channel desired voice detector, as described above, results in a more robust detection of desired audio because more information is obtained on the noise field via the plurality of reference channels.

Figure 28D:
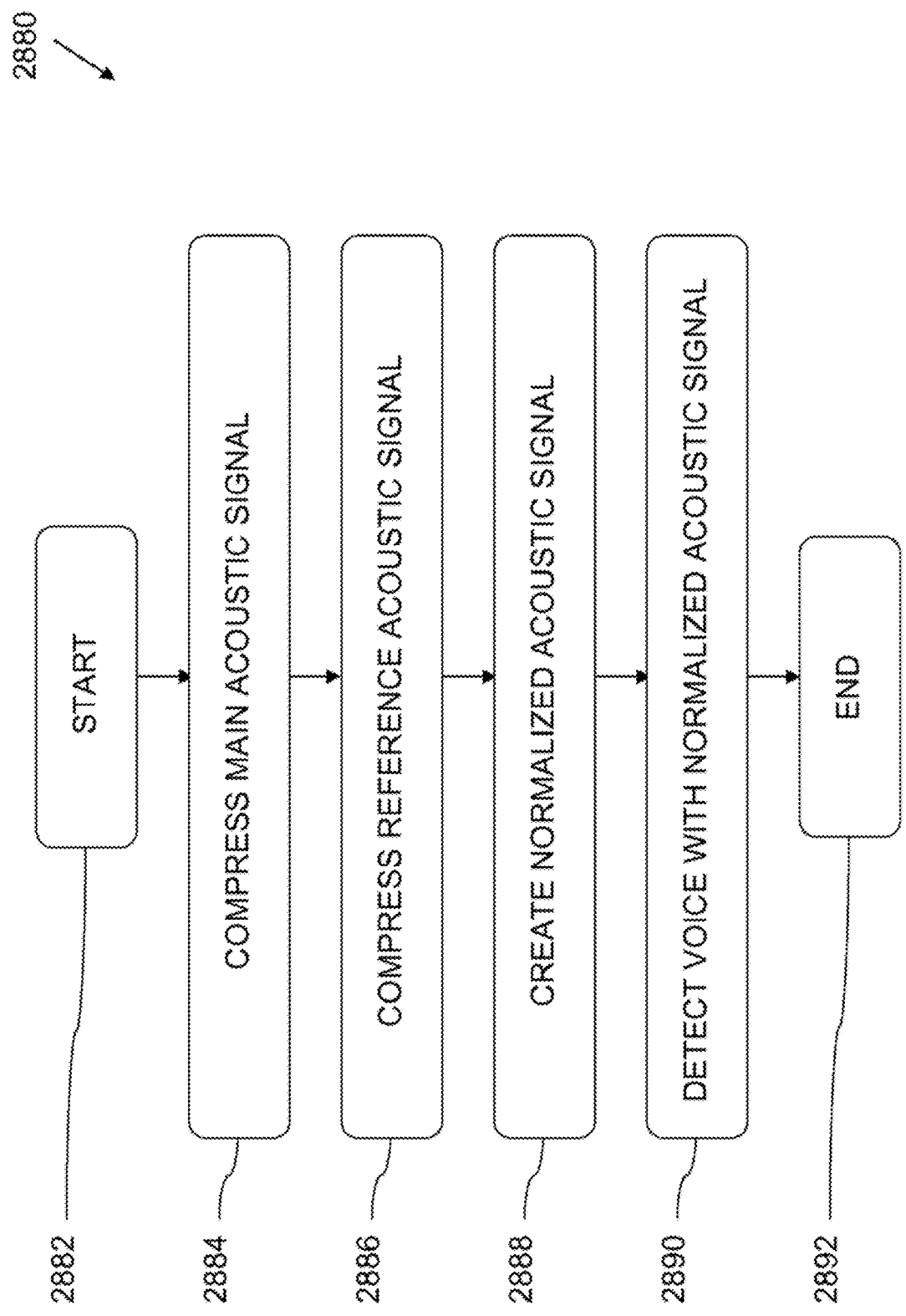
FIG. 28D illustrates a process utilizing compression according to embodiments of the invention.

FIG. 28D illustrates, generally at 2880, a process utilizing compression according to embodiments of the invention. With reference to FIG. 28D, a process starts at a block 2882. At a block 2884 a main acoustic channel is compressed, utilizing for example $Log_{10}$ compression or user defined compression as described in conjunction with FIG. 28A or FIG. 28C. At a block 2886 a reference acoustic signal is compressed, utilizing for example $Log_{10}$ compression or user defined compression as described in conjunction with FIG. 28A or FIG. 28C. At a block 2888 a normalized main acoustic signal is created. At a block 2890 desired voice is detected with the normalized acoustic signal. The process stops at a block 2892.

FIG. 28E illustrates, generally at 2893, different functions to provide compression according to embodiments of the invention. With reference to FIG. 28E, a table 2894 presents several compression functions for the purpose of illustration, no limitation is implied thereby. Column 2895a contains six sample values for a variable X. In this example, variable X takes on values as shown at 2896 ranging from 0.01 to 1000.0. Column 2895b illustrates no compression where Y=X. Column 2895c illustrates Log base 10 compression where the compressed value Y=Log 10(X). Column 2895d illustrates ln(X) compression where the compressed value Y=ln(X). Column 2895e illustrates Log base 2 compression where Y=$Log_2$(X). A user defined compression (not shown) can also be implemented as desired to provide more or less compression than 2895c, 2895d, or 2895e. Utilizing a compression function at 2812 and 2820 (FIG. 28A) to compress the result of the short-term power detectors 2810 and 2818 reduces the dynamic range of the normalized main signal at 2826 (Z) which is input into the single channel normalized voice threshold comparator (SC-NVTC) 2828. Similarly utilizing a compression function at 2812, 2820 and 2856 (FIG. 28C) to compress the results of the short-term power detectors 2810, 2818, and 2854 reduces the dynamic range of the normalized main signals at 2826 (Z) and 2862 (Z2) which are input into the SC-NVTC 828 and SC-NVTC 864 respectively. Reduced dynamic range achieved via compression can result in more accurately detecting the presence of desired audio and therefore a greater degree of noise reduction can be achieved by the embodiments of the invention presented herein.

In various embodiments, the components of the multi-input desired voice detector, such as shown in FIG. 28A, FIG. 28B, FIG. 28C, FIG. 28D, and FIG. 28E are implemented in an integrated circuit device, which may include an integrated circuit package containing the integrated circuit. In some embodiments, the multi-input desired voice detector is implemented in a single integrated circuit die. In other embodiments, the multi-input desired voice detector is implemented in more than one integrated circuit die of an integrated circuit device which may include a multi-chip package containing the integrated circuit.

Figure 29A:
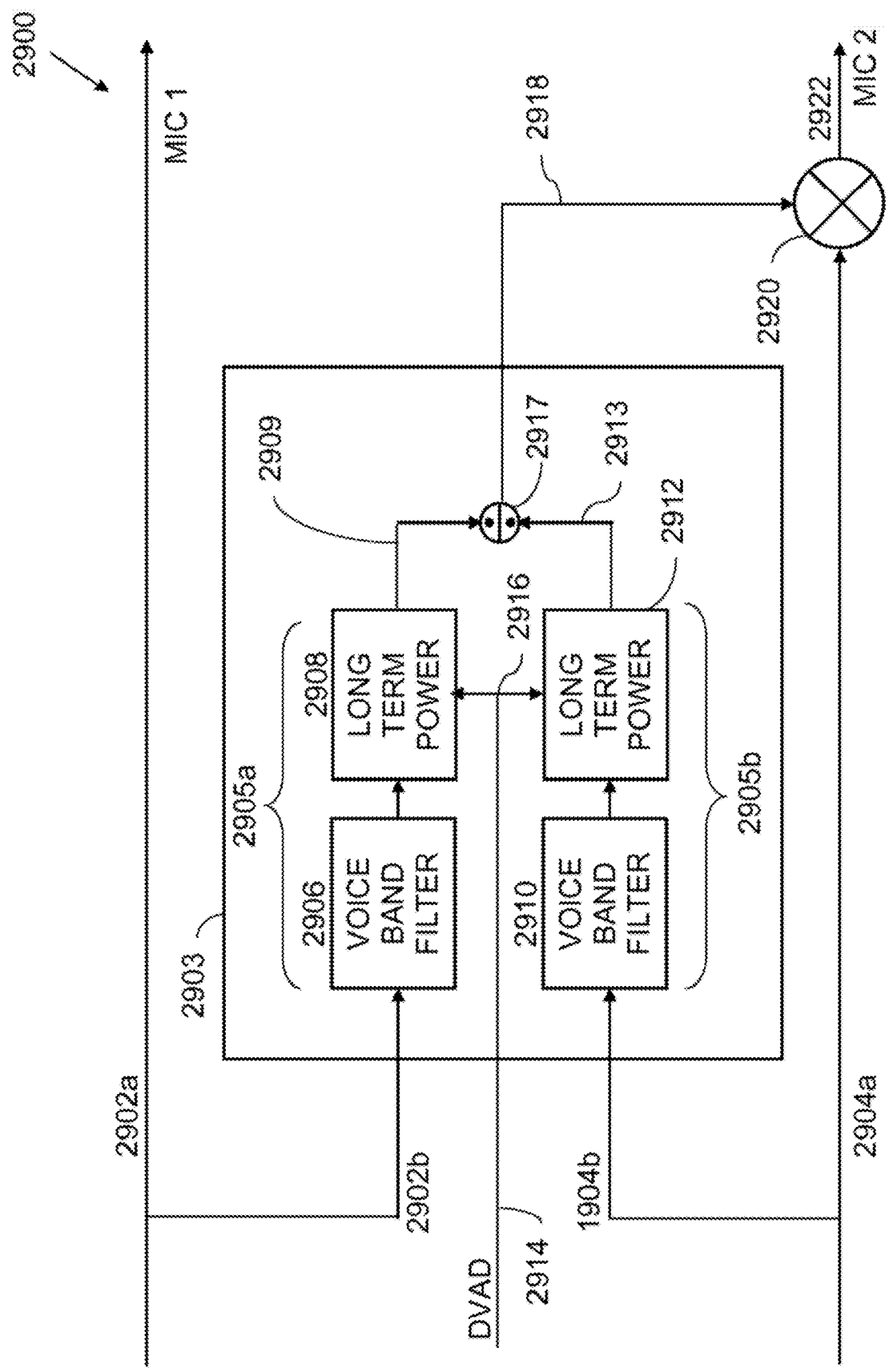
FIG. 29A illustrates an auto-balancing architecture according to embodiments of the invention.

FIG. 29A illustrates, generally at 2900, an auto-balancing architecture according to embodiments of the invention. With reference to FIG. 29A, an auto-balancing component 2903 has a first signal path 2905a and a second signal path 2905b. A first acoustic channel 2902a (MIC 1) is coupled to the first signal path 2905a at 2902b. A second acoustic channel 2904a is coupled to the second signal path 2905b at 2904b. Acoustic signals are input at 2902b into a voice-band filter 2906. The voice band filter 2906 captures the majority of the desired voice energy in the first acoustic channel 2902a. In various embodiments, the voice band filter 1906 is a band-pass filter characterized by a lower corner frequency an upper corner frequency and a roll-off from the upper corner frequency. In various embodiments, the lower corner frequency can range from 50 to 300 Hz depending on the application. For example, in wide band telephony, a lower corner frequency is approximately 50 Hz. In standard telephony the lower corner frequency is approximately 300 Hz. The upper corner frequency is chosen to allow the filter to pass a majority of the speech energy picked up by a relatively flat portion of the microphone's frequency response. Thus, the upper corner frequency can be placed in a variety of locations depending on the application. A non-limiting example of one location is 2,500 Hz. Another non-limiting location for the upper corner frequency is 4,000 Hz.

The first signal path 2905a includes a long-term power calculator 2908. Long-term power calculator 2908 is implemented in various embodiments as a root mean square (RMS) measurement, a power detector, an energy detector, etc. Long-term power calculator 2908 can be referred to synonymously as a long-time power calculator 2908. The long-term power calculator 2908 calculates approximately the running average long-term power in the filtered signal. The output 2909 of the long-term power calculator 2908 is input into a divider 2917. A control signal 2914 is input at 2916 to the long-term power calculator 2908. The control signal 2914 provides signals as described above in conjunction with the desired audio detector, e.g., FIG. 28A, FIG. 28B, FIG. 28C which indicate when desired audio is present and when desired audio is not present. Segments of the acoustic signals on the first channel 2902b which have desired audio present are excluded from the long-term power average produced at 2908.

Acoustic signals are input at 2904b into a voice-band filter 2910 of the second signal path 2905b. The voice band filter 2910 captures the majority of the desired voice energy in the second acoustic channel 2904a. In various embodiments, the voice band filter 2910 is a band-pass filter characterized by a lower corner frequency an upper corner frequency and a roll-off from the upper corner frequency. In various embodiments, the lower corner frequency can range from 50 to 300 Hz depending on the application. For example, in wide band telephony, a lower corner frequency is approximately 50 Hz. In standard telephony the lower corner frequency is approximately 300 Hz. The upper corner frequency is chosen to allow the filter to pass a majority of the speech energy picked up by a relatively flat portion of the microphone's frequency response. Thus, the upper corner frequency can be placed in a variety of locations depending on the application. A non-limiting example of one location is 2,500 Hz. Another non-limiting location for the upper corner frequency is 4,000 Hz.

The second signal path 2905b includes a long-term power calculator 2912. Long-term power calculator 2912 is implemented in various embodiments as a root mean square (RMS) measurement, a power detector, an energy detector, etc. Long-term power calculator 2912 can be referred to synonymously as a long-time power calculator 2912. The long-term power calculator 2912 calculates approximately the running average long-term power in the filtered signal. The output 2913 of the long-term power calculator 2912 is input into a divider 2917. A control signal 2914 is input at 2916 to the long-term power calculator 2912. The control signal 2916 provides signals as described above in conjunction with the desired audio detector, e.g., FIG. 28A, FIG. 28B, FIG. 28C which indicate when desired audio is present and when desired audio is not present. Segments of the acoustic signals on the second channel 2904b which have desired audio present are excluded from the long-term power average produced at 2912.

In one embodiment, the output 2909 is normalized at 2917 by the output 2913 to produce an amplitude correction signal 2918. In one embodiment, a divider is used at 2917. The amplitude correction signal 2918 is multiplied at multiplier 2920 times an instantaneous value of the second microphone signal on 2904a to produce a corrected second microphone signal at 2922.

In another embodiment, alternatively the output 2913 is normalized at 2917 by the output 2909 to produce an amplitude correction signal 2918. In one embodiment, a divider is used at 2917. The amplitude correction signal 2918 is multiplied by an instantaneous value of the first microphone signal on 1902a using a multiplier coupled to 2902a (not shown) to produce a corrected first microphone signal for the first microphone channel 2902a. Thus, in various embodiments, either the second microphone signal is automatically balanced relative to the first microphone signal or in the alternative the first microphone signal is automatically balanced relative to the second microphone signal.

It should be noted that the long-term averaged power calculated at 2908 and 2912 is performed when desired audio is absent. Therefore, the averaged power represents an average of the undesired audio which typically originates in the far field. In various embodiments, by way of non-limiting example, the duration of the long-term power calculator ranges from approximately a fraction of a second such as, for example, one-half second to five seconds to minutes in some embodiments and is application dependent.

Figure 29B:
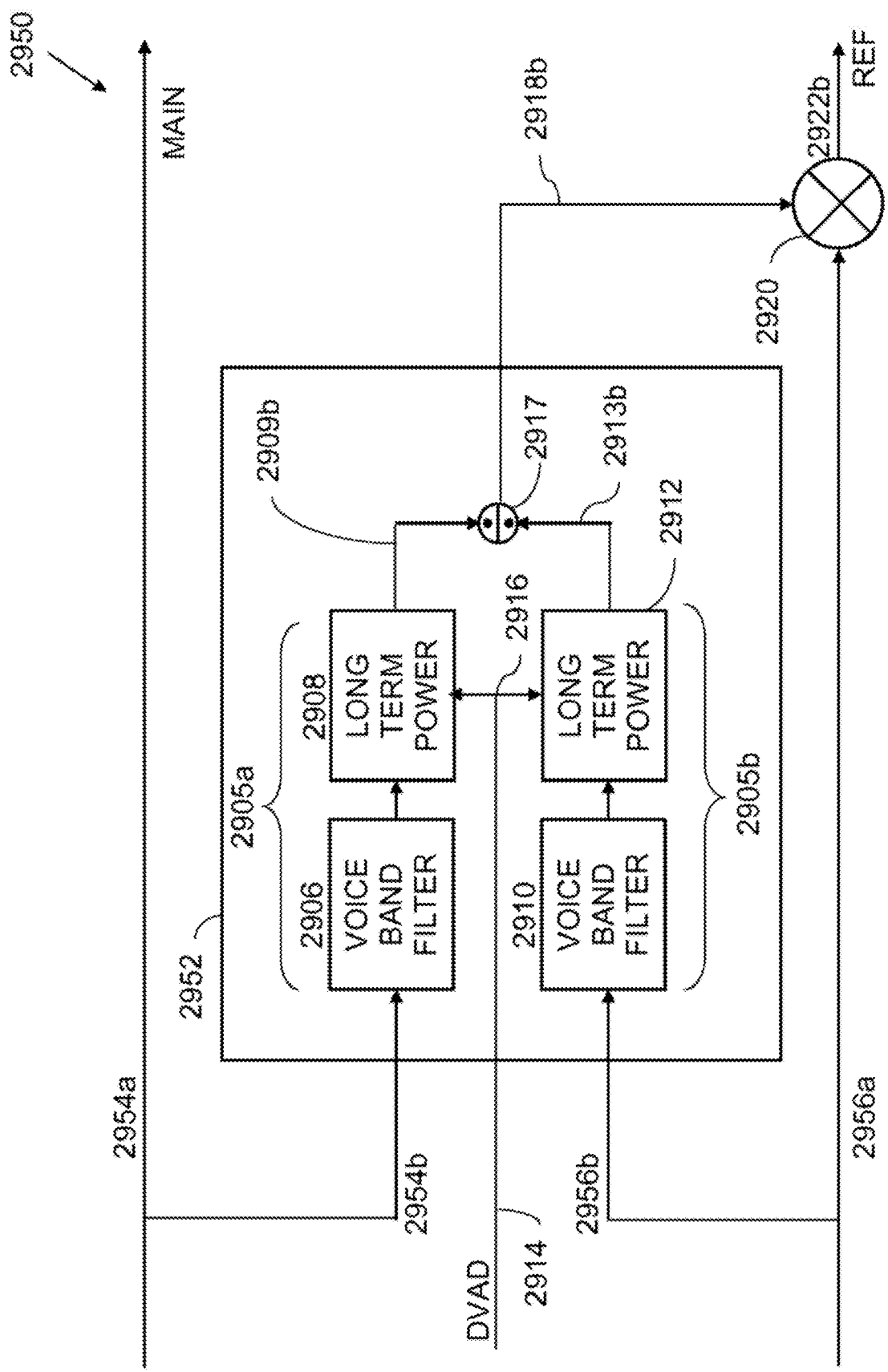
FIG. 29B illustrates auto-balancing according to embodiments of the invention.

FIG. 29B illustrates, generally at 2950, auto-balancing according to embodiments of the invention. With reference to FIG. 29B, an auto-balancing component 2952 is configured to receive as inputs a main acoustic channel 2954a and a reference acoustic channel 2956a. The balancing function proceeds similarly to the description provided above in conjunction with FIG. 29A using the first acoustic channel 2902a (MIC 1) and the second acoustic channel 2904a (MIC 2).

With reference to FIG. 29B, an auto-balancing component 2952 has a first signal path 2905a and a second signal path 2905b. A first acoustic channel 2954a (MAIN) is coupled to the first signal path 2905a at 2954b. A second acoustic channel 2956a is coupled to the second signal path 2905b at 2956b. Acoustic signals are input at 2954b into a voice-band filter 2906. The voice band filter 2906 captures the majority of the desired voice energy in the first acoustic channel 2954a. In various embodiments, the voice band filter 2906 is a band-pass filter characterized by a lower corner frequency an upper corner frequency and a roll-off from the upper corner frequency. In various embodiments, the lower corner frequency can range from 50 to 300 Hz depending on the application. For example, in wide band telephony, a lower corner frequency is approximately 50 Hz. In standard telephony the lower corner frequency is approximately 300 Hz. The upper corner frequency is chosen to allow the filter to pass a majority of the speech energy picked up by a relatively flat portion of the microphone's frequency response. Thus, the upper corner frequency can be placed in a variety of locations depending on the application. A non-limiting example of one location is 2,500 Hz. Another non-limiting location for the upper corner frequency is 4,000 Hz.

The first signal path 2905a includes a long-term power calculator 2908. Long-term power calculator 2908 is implemented in various embodiments as a root mean square (RMS) measurement, a power detector, an energy detector, etc. Long-term power calculator 2908 can be referred to synonymously as a long-time power calculator 2908. The long-term power calculator 2908 calculates approximately the running average long-term power in the filtered signal. The output 2909b of the long-term power calculator 2908 is input into a divider 2917. A control signal 2914 is input at 2916 to the long-term power calculator 2908. The control signal 2914 provides signals as described above in conjunction with the desired audio detector, e.g., FIG. 28A, FIG. 28B, FIG. 28C which indicate when desired audio is present and when desired audio is not present. Segments of the acoustic signals on the first channel 2954b which have desired audio present are excluded from the long-term power average produced at 2908.

Acoustic signals are input at 2956b into a voice-band filter 2910 of the second signal path 2905b. The voice band filter 2910 captures the majority of the desired voice energy in the second acoustic channel 2956a. In various embodiments, the voice band filter 2910 is a band-pass filter characterized by a lower corner frequency an upper corner frequency and a roll-off from the upper corner frequency. In various embodiments, the lower corner frequency can range from 50 to 300 Hz depending on the application. For example, in wide band telephony, a lower corner frequency is approximately 50 Hz. In standard telephony the lower corner frequency is approximately 300 Hz. The upper corner frequency is chosen to allow the filter to pass a majority of the speech energy picked up by a relatively flat portion of the microphone's frequency response. Thus, the upper corner frequency can be placed in a variety of locations depending on the application. A non-limiting example of one location is 2,500 Hz. Another non-limiting location for the upper corner frequency is 4,000 Hz.

The second signal path 2905b includes a long-term power calculator 2912. Long-term power calculator 2912 is implemented in various embodiments as a root mean square (RMS) measurement, a power detector, an energy detector, etc. Long-term power calculator 2912 can be referred to synonymously as a long-time power calculator 2912. The long-term power calculator 2912 calculates approximately the running average long-term power in the filtered signal. The output 2913b of the long-term power calculator 2912 is input into the divider 2917. A control signal 2914 is input at 2916 to the long-term power calculator 2912. The control signal 2916 provides signals as described above in conjunction with the desired audio detector, e.g., FIG. 28A, FIG.

28B, FIG. 28C which indicate when desired audio is present and when desired audio is not present. Segments of the acoustic signals on the second channel 2956b which have desired audio present are excluded from the long-term power average produced at 2912.

In one embodiment, the output 2909b is normalized at 2917 by the output 2913b to produce an amplitude correction signal 2918b. In one embodiment, a divider is used at 2917. The amplitude correction signal 2918b is multiplied at multiplier 2920 times an instantaneous value of the second microphone signal on 2956a to produce a corrected second microphone signal at 2922b.

In another embodiment, alternatively the output 2913b is normalized at 2917 by the output 2909b to produce an amplitude correction signal 2918b. In one embodiment, a divider is used at 2917. The amplitude correction signal 2918b is multiplied by an instantaneous value of the first microphone signal on 2954a using a multiplier coupled to 2954a (not shown) to produce a corrected first microphone signal for the first microphone channel 2954a. Thus, in various embodiments, either the second microphone signal is automatically balanced relative to the first microphone signal or in the alternative the first microphone signal is automatically balanced relative to the second microphone signal.

It should be noted that the long-term averaged power calculated at 2908 and 2912 is performed when desired audio is absent. Therefore, the averaged power represents an average of the undesired audio which typically originates in the far field. In various embodiments, by way of non-limiting example, the duration of the long-term power calculator ranges from approximately a fraction of a second such as, for example, one-half second to five seconds to minutes in some embodiments and is application dependent.

Embodiments of the auto-balancing component 2902 or 2952 are configured for auto-balancing a plurality of microphone channels such as is indicated in FIG. 24A. In such configurations, a plurality of channels (such as a plurality of reference channels) is balanced with respect to a main channel. Or a plurality of reference channels and a main channel are balanced with respect to a particular reference channel as described above in conjunction with FIG. 29A or FIG. 29B.

Figure 29C:
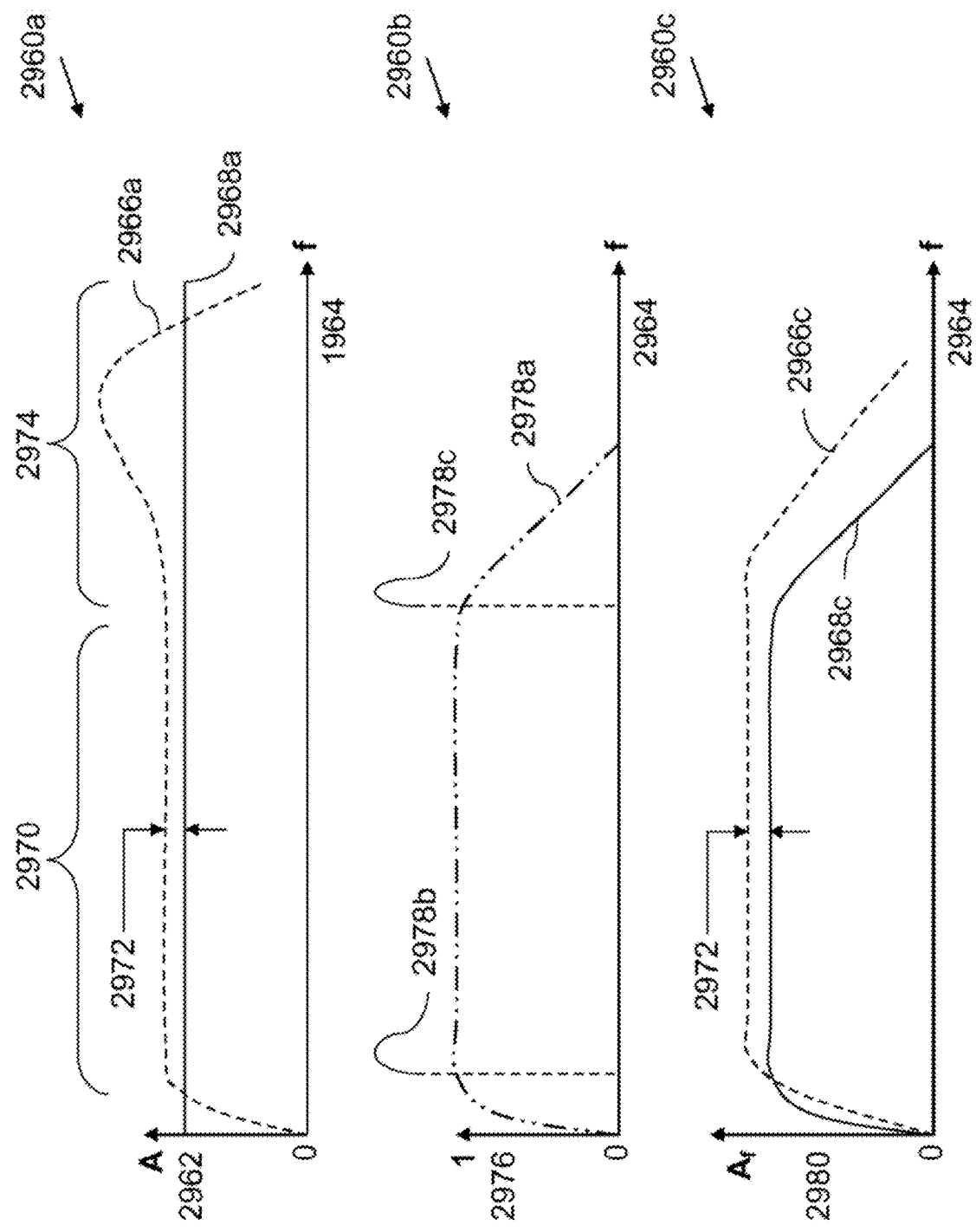
FIG. 29C illustrates filtering according to embodiments of the invention.

FIG. 29C illustrates filtering according to embodiments of the invention. With reference to FIG. 29C, 2960a shows two microphone signals 2966a and 2968a having amplitude 2962 plotted as a function of frequency 2964. In some embodiments, a microphone does not have a constant sensitivity as a function of frequency. For example, microphone response 2966a can illustrate a microphone output (response) with a non-flat frequency response excited by a broadband excitation which is flat in frequency. The microphone response 2966a includes a non-flat region 2974 and a flat region 2970. For this example, a microphone which produced the response 2968a has a uniform sensitivity with respect to frequency; therefore 2968a is substantially flat in response to the broadband excitation which is flat with frequency. In some embodiments, it is of interest to balance the flat region 2970 of the microphones' responses. In such a case, the non-flat region 2974 is filtered out so that the energy in the non-flat region 2974 does not influence the microphone auto-balancing procedure. What is of interest is a difference 2972 between the flat regions of the two microphones' responses.

In 2960b a filter function 2978a is shown plotted with an amplitude 2976 plotted as a function of frequency 2964. In various embodiments, the filter function is chosen to eliminate the non-flat portion 2974 of a microphone's response. Filter function 2978a is characterized by a lower corner frequency 2978b and an upper corner frequency 2978c. The filter function of 2960b is applied to the two microphone signals 2966a and 2968a and the result is shown in 2960c.

In 2960c filtered representations 2966c and 2968c of microphone signals 2966a and 2968a are plotted as a function of amplitude 2980 and frequency 2966. A difference 2972 characterizes the difference in sensitivity between the two filtered microphone signals 2966c and 2968c. It is this difference between the two microphone responses that is balanced by the systems described above in conjunction with FIG. 29A and FIG. 29B. Referring back to FIG. 29A and FIG. 29B, in various embodiments, voice band filters 2906 and 2910 can apply, in one non-limiting example, the filter function shown in 2960b to either microphone channels 2902b and 2904b (FIG. 29A) or to main and reference channels 2954b and 2956b (FIG. 29B). The difference 2972 between the two microphone channels is minimized or eliminated by the auto-balancing procedure described above in FIG. 29A or FIG. 29B.

Figure 30:
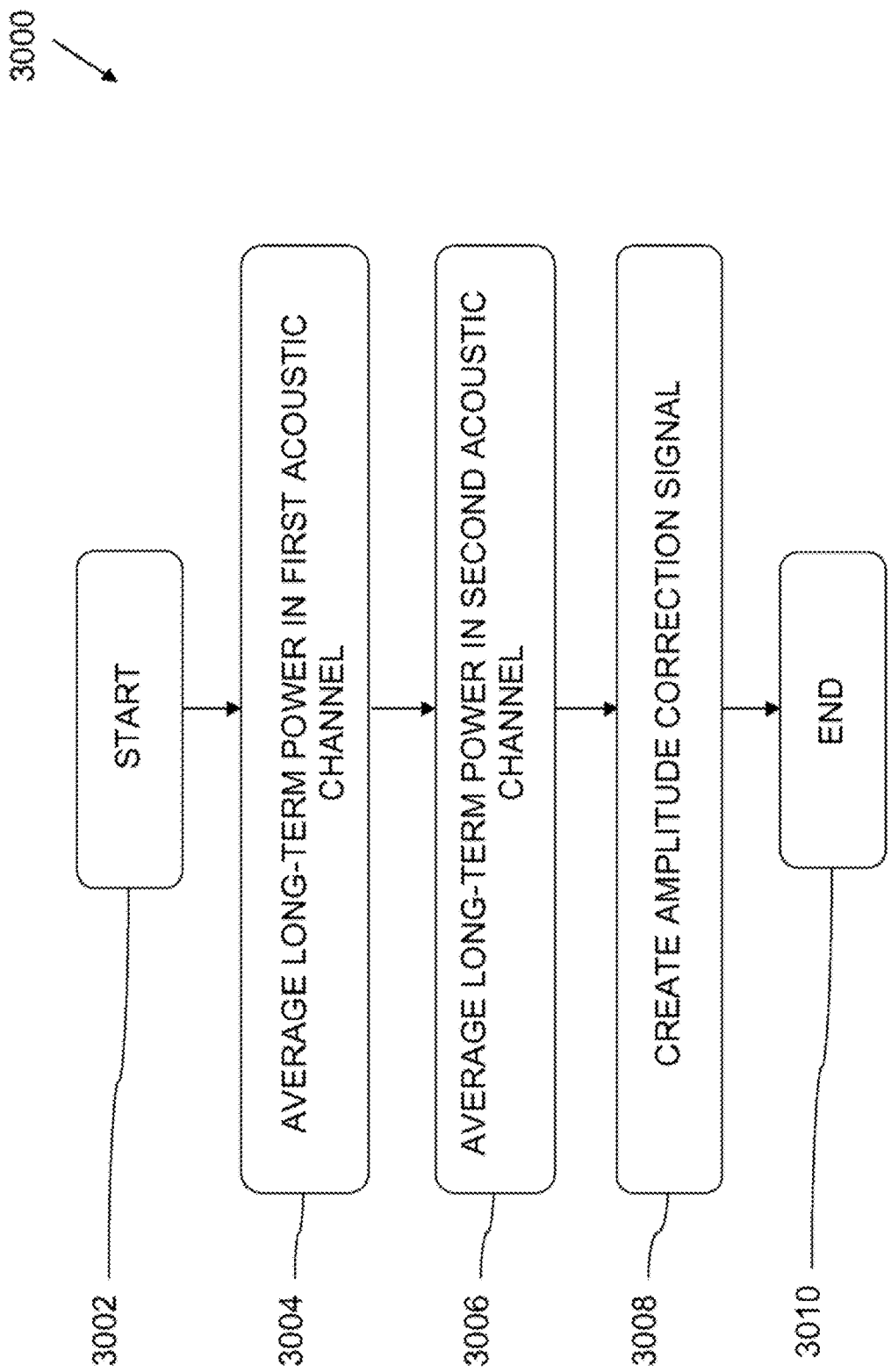
FIG. 30 illustrates a process for auto-balancing according to embodiments of the invention.

FIG. 30 illustrates, generally at 3000, a process for auto-balancing according to embodiments of the invention. With reference to FIG. 30, a process starts at a block 3002. At a block 3004 an average long-term power in a first microphone channel is calculated. The averaged long-term power calculated for the first microphone channel does not include segments of the microphone signal that occurred when desired audio was present. Input from a desired voice activity detector is used to exclude the relevant portions of desired audio. At a block 3006 an average power in a second microphone channel is calculated. The averaged long-term power calculated for the second microphone channel does not include segments of the microphone signal that occurred when desired audio was present. Input from a desired voice activity detector is used to exclude the relevant portions of desired audio. At a block 3008 an amplitude correction signal is computed using the averages computed in the block 3004 and the block 3006.

In various embodiments, the components of auto-balancing component 2903 or 2952 are implemented in an integrated circuit device, which may include an integrated circuit package containing the integrated circuit. In some embodiments, auto-balancing components 2903 or 2952 are implemented in a single integrated circuit die. In other embodiments, auto-balancing components 2903 or 2952 are implemented in more than one integrated circuit die of an integrated circuit device which may include a multi-chip package containing the integrated circuit.

Figure 31:
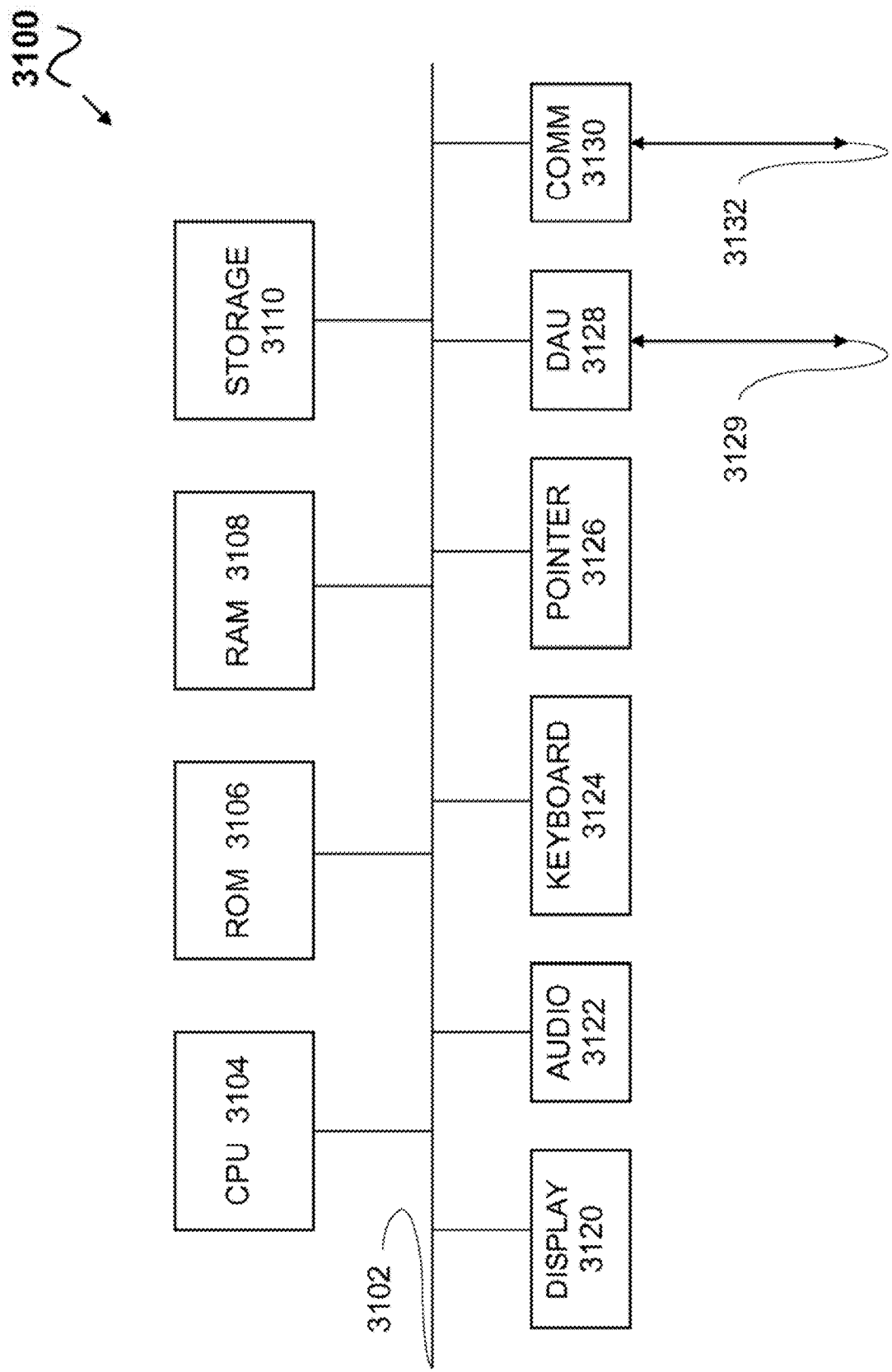
FIG. 31 illustrates an acoustic signal processing system according to embodiments of the invention.

FIG. 31 illustrates, generally at 3100, an acoustic signal processing system in which embodiments of the invention may be used. The block diagram is a high-level conceptual representation and may be implemented in a variety of ways and by various architectures. With reference to FIG. 31, bus system 3102 interconnects a Central Processing Unit (CPU) 3104, Read Only Memory (ROM) 3106, Random Access Memory (RAM) 3108, storage 3110, display 3120, audio 3122, keyboard 3124, pointer 3126, data acquisition unit (DAU) 3128, and communications 3130. The bus system 3102 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), or a dedicated bus designed for a custom application, etc. The CPU 3104 may be a single, multiple, or even a distributed computing resource or a digital signal processing (DSP) chip. Storage 3110 may be Compact Disc (CD), Digital Versatile Disk (DVD), hard disks (HD), optical disks, tape, flash, memory sticks, video recorders, etc. The acoustic signal processing system 3100 can be used to receive acoustic signals that are input from a plurality of microphones (e.g., a first microphone, a second microphone, etc.) or from a main acoustic channel and a plurality of reference acoustic channels as described above in conjunction with the preceding figures. Note that depending upon the actual implementation of the acoustic signal processing system, the acoustic signal processing system may include some, all, more, or a rearrangement of components in the block diagram. In some embodiments, aspects of the system 3100 are performed in software. While in some embodiments, aspects of the system 3100 are performed in dedicated hardware such as a digital signal processing (DSP) chip, etc. as well as combinations of dedicated hardware and software as is known and appreciated by those of ordinary skill in the art.

Thus, in various embodiments, acoustic signal data is received at 3129 for processing by the acoustic signal processing system 3100. Such data can be transmitted at 3132 via communications interface 3130 for further processing in a remote location. Connection with a network, such as an intranet or the Internet is obtained via 3132, as is recognized by those of skill in the art, which enables the acoustic signal processing system 3100 to communicate with other data processing devices or systems in remote locations.

For example, embodiments of the invention can be implemented on a computer system 3100 configured as a desktop computer or work station, on for example a WINDOWS® compatible computer running operating systems such as WINDOWS® XP Home or WINDOWS® XP Professional, Linux, Unix, etc. as well as computers from APPLE COMPUTER, Inc. running operating systems such as OS X, etc. Alternatively, or in conjunction with such an implementation, embodiments of the invention can be configured with devices such as speakers, earphones, video monitors, etc. configured for use with a Bluetooth communication channel. In yet other implementations, embodiments of the invention are configured to be implemented by mobile devices such as a smart phone, a tablet computer, a wearable device, such as eyeglasses, a near-to-eye (NTE) headset, a head wearable device of general configuration such as but not limited to glasses, goggles, a visor, a head band, a helmet, etc. or the like.

In one or more embodiments, a user is provided with hearing assistance to facilitate hearing sounds from a local environment.

Figure 32A:
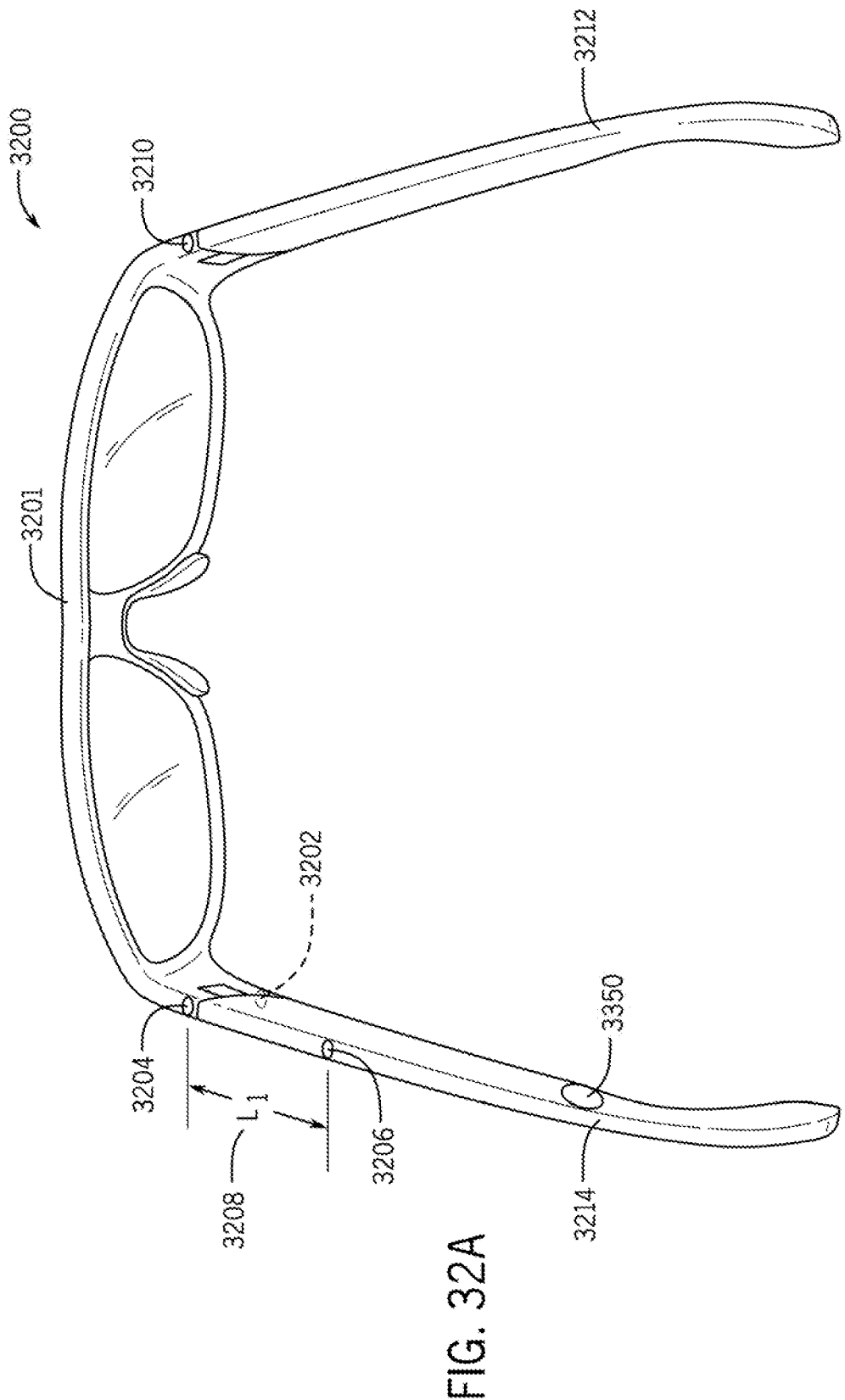
FIG. 32A illustrates microphone configurations on a head wearable device in perspective view according to embodiments of the invention.
Figure 32B:
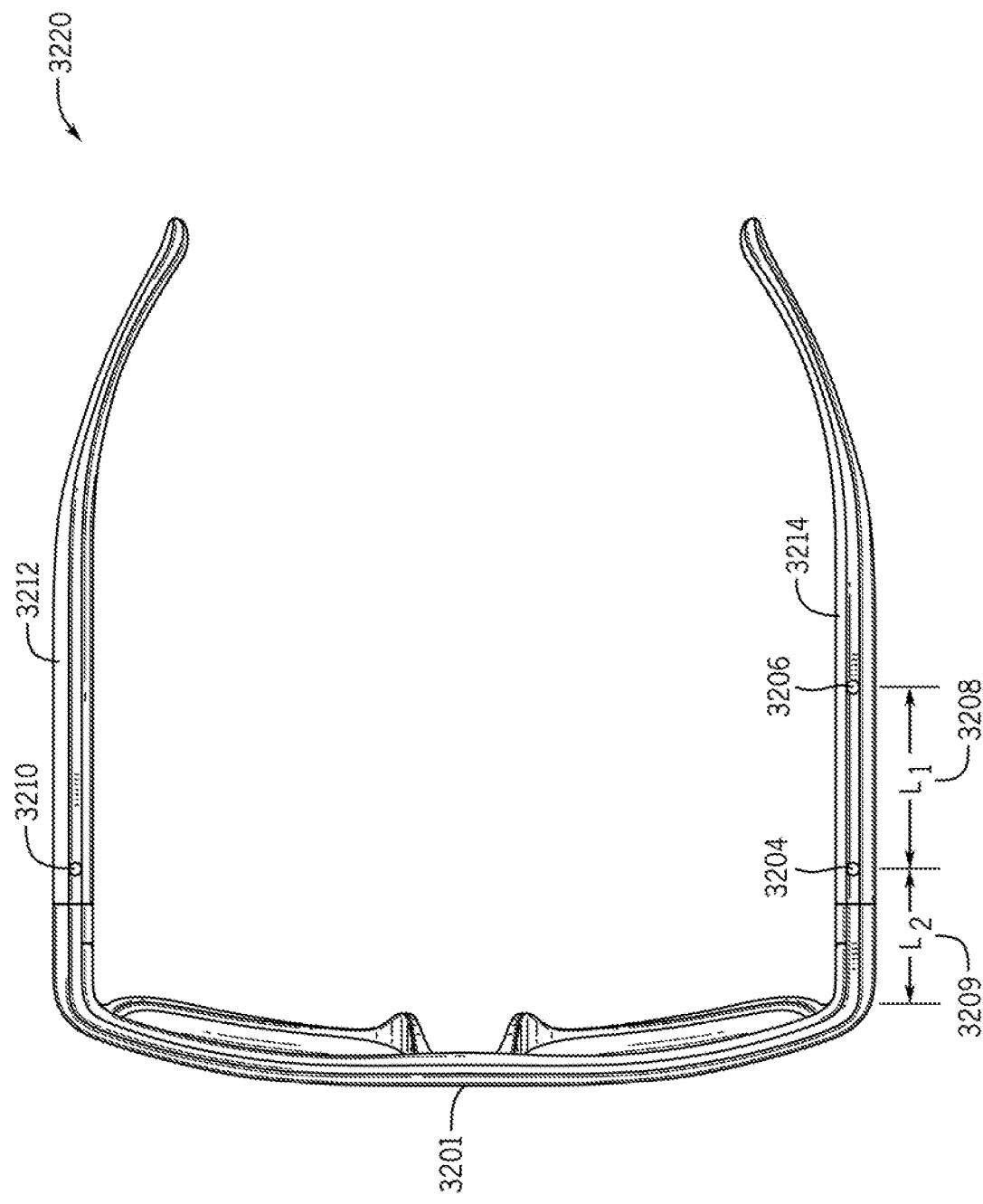
FIG. 32B illustrates microphone configurations on a head wearable device in top view corresponding to FIG. 32A according to embodiments of the invention.
Figure 32C:
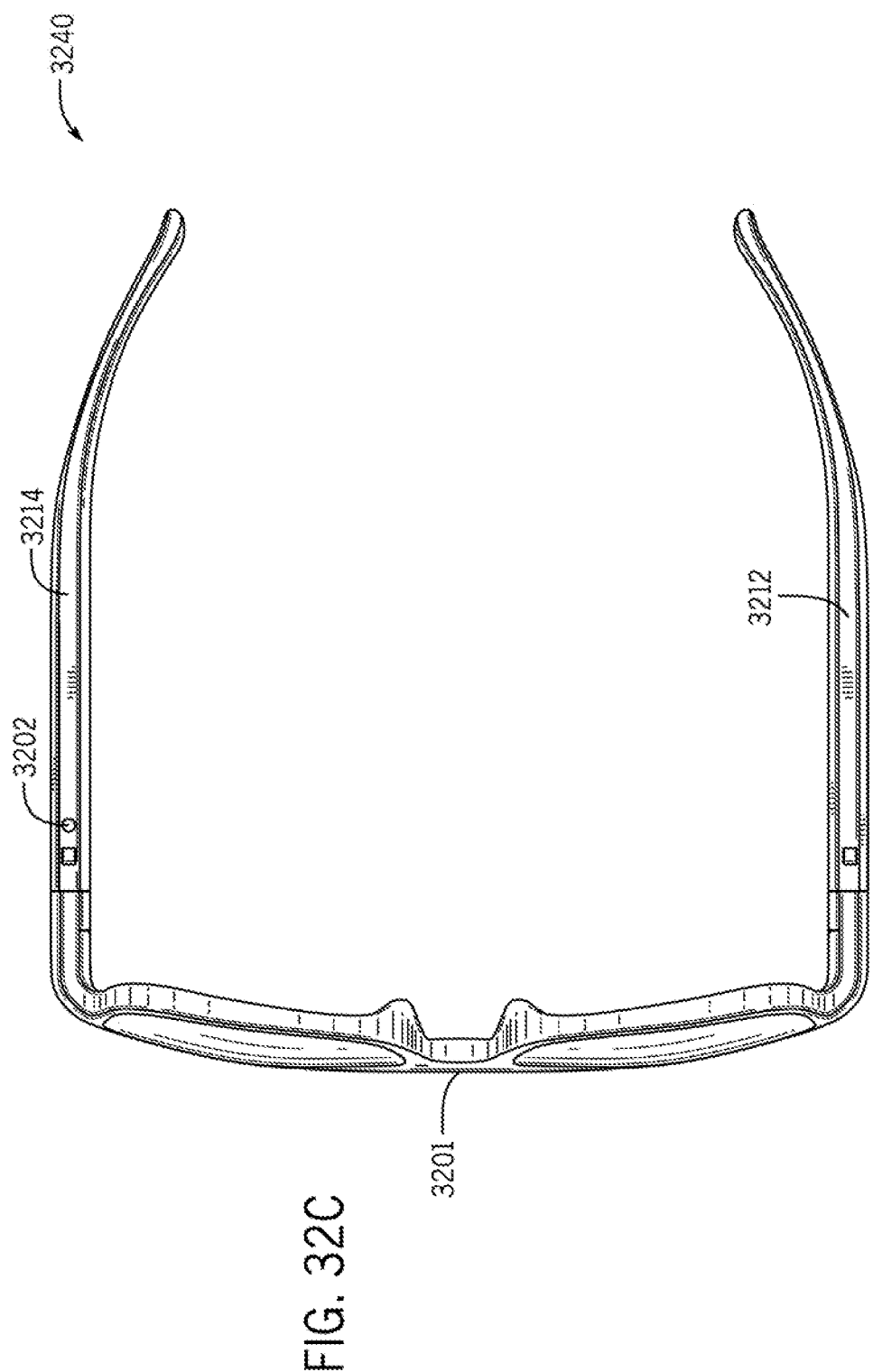
FIG. 32C illustrates microphone configurations on a head wearable device in bottom view corresponding to FIG. 32A according to embodiments of the invention.

FIG. 32A illustrates, generally at 3200, microphone configurations on a head wearable device according to embodiments of the invention. FIG. 32B illustrates, generally at 3220, microphone configurations on a head wearable device in top view corresponding to FIG. 32A according to embodiments of the invention. FIG. 32C illustrates, generally at 3240, microphone configurations on a head wearable device in bottom view corresponding to FIG. 32A according to embodiments of the invention. FIG. 33 illustrates, generally at 3300, the head wearable device from FIG. 32A relative to different sound sources according to embodiments of the invention. With reference to FIG. 32A through FIG. 33 collectively, a head wearable device 3201 is presented in the shape of eyeglasses for use in a three-dimensional space. The three-dimensional space is illustrated by X, Y, Z axes at 3301 (FIG. 33). The three-dimensional space is illustrated with what is known in the art as a cartesian coordinate system. However, no limitation is implied thereby. The three-dimensional space could have been illustrated with another coordinate system. In other embodiments, the head wearable device is in the shape of goggles, etc. Without limitation implied thereby, the term "eyeglasses" or "eyewear device" will be used synonymously with head wearable device, herein. The head wearable device 3201 has a front frame, the front frame contains one or more lenses typically made from glass or plastic, a left frame 3214, and a right frame 3212. The left and right frames are also referred to in the art as temples. The head wearable device is illustrated with four microphones, Microphone 0 (3202), Microphone 1 (3204), Microphone 2 (3206), and Microphone 3 (3210). In one or more embodiments, Microphone 0 (3202) is located under the bottom of the left-side frame 3214 and Microphone 1 (3204) and Microphone 2 (3206) are located on a top of the left-side frame 3214. Microphone 3 (3210) is located on a top of the right-side frame 3212. Alternatively, Microphone 0 (3202), Microphone 1 (3204), and Microphone 2 (3206) are located on the right-side frame 3212 and Microphone 3 (3210) is located on the left side frame 3214.

In various embodiments, the eyewear device includes an array of microphones coupled to at least one side frame member. The array of microphones includes at least a first, and a second microphone. In one or more embodiments, the first and second microphones, for example 3202 and 3204, are located at the side frame member 3214 close to the front frame member. The distance of the first and second microphones from the front frame member is approximately between 5 mm and 30 mm and can be around 15 mm as indicated by $L_2$ at 3209 (FIG. 32B). The first microphone (Microphone 0 (3202)) is located at the bottom side of the side frame member 3214 and the second microphone (Microphone 1 (3204)) is located on the top side of the side member 3214 and directly or nearly on top of the side frame member 3214. In another embodiment, a third microphone (Microphone 2 (3206)) is located on the side frame member 3214 and further away from the front frame member. The location of the third microphone (Microphone 2 (3206)) from the first and/or second microphone (3202/3204) is approximately between 10 mm and 20 mm and can be around 15 mm as indicated by $L_1$ at 3208. If the distance $L_1$ is too long, the third microphone (Microphone 2 (3206)) may be close to a speaker embedded in the side frame member and located near the ear of the wearer. In this case, there could be an echo from the speaker to Microphone 2 (3206). Such an echo is remedied by decreasing the distance $L_1$ for a particular implementation. Decreasing the distance $L_1$ increases a separation distance between Microphone 2 (3206) and a speaker 3350 and reduces any echo thereby.

In another embodiment, a fourth microphone (Microphone 3 (3210)) is located at the other side frame member 3212. The Microphone 3 (3210) is illustrated close to the front frame member but other locations along the frame member 3212 are possible. The distance between Microphone 1 (3204) and Microphone 3 (3210) is determined by a width of the glasses frame and the distance is big enough for the system to detect the signal level difference from the two microphones. The distance between Microphone 1 (3204) and Microphone 3 (3210) is not a fixed number but is instead generally provided by a geometry and dimensions of the head wearable device. Similarly, the distance between Microphone 0 (3202) and Microphone 3 (3210) is not a fixed number but is instead generally provided by a geometry and dimensions of the head wearable device.

Figure 32D:
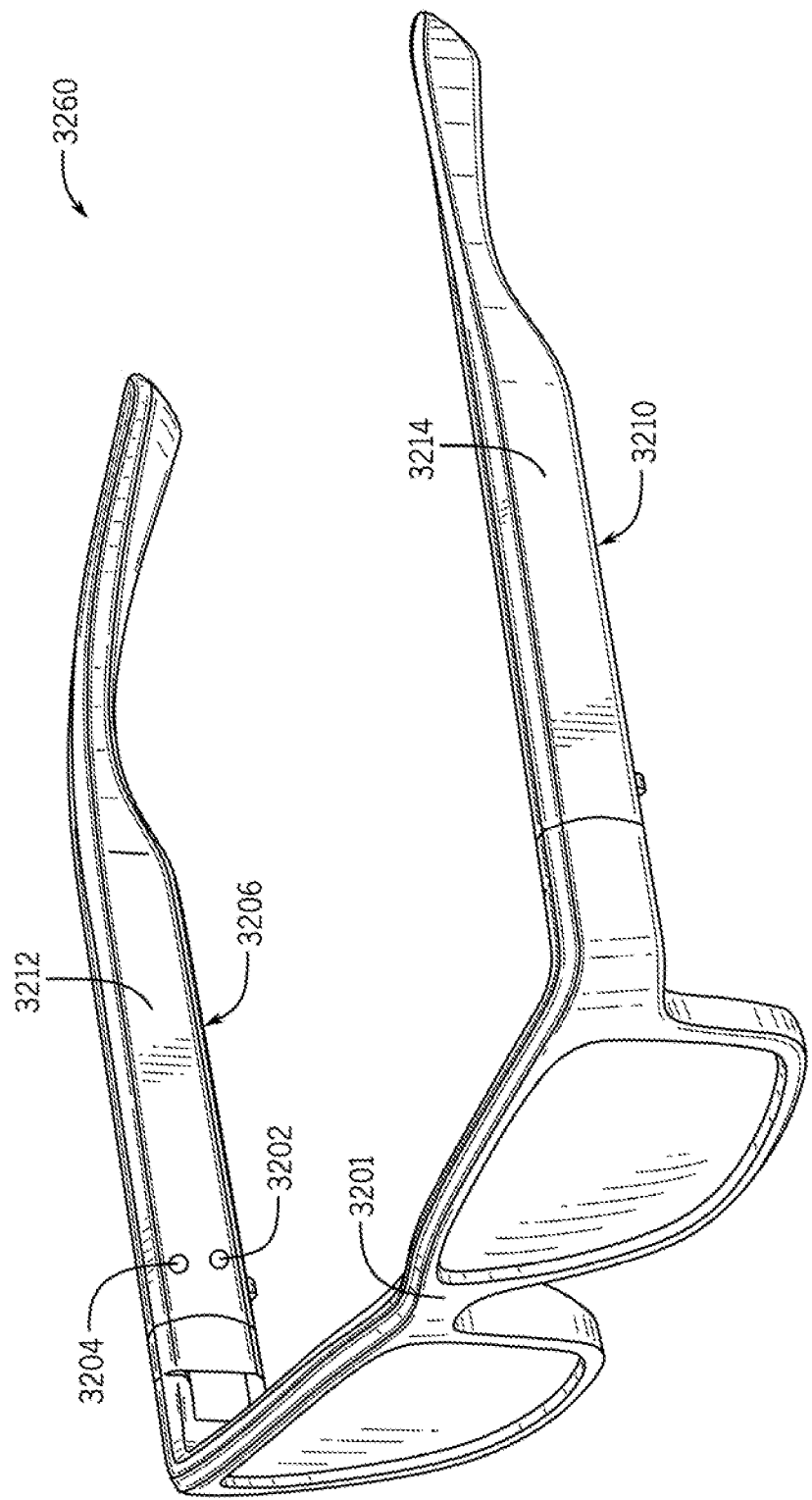
FIG. 32D illustrates another set of microphone placements in perspective view on a head wearable device according to embodiments of the invention.
Figure 32E:
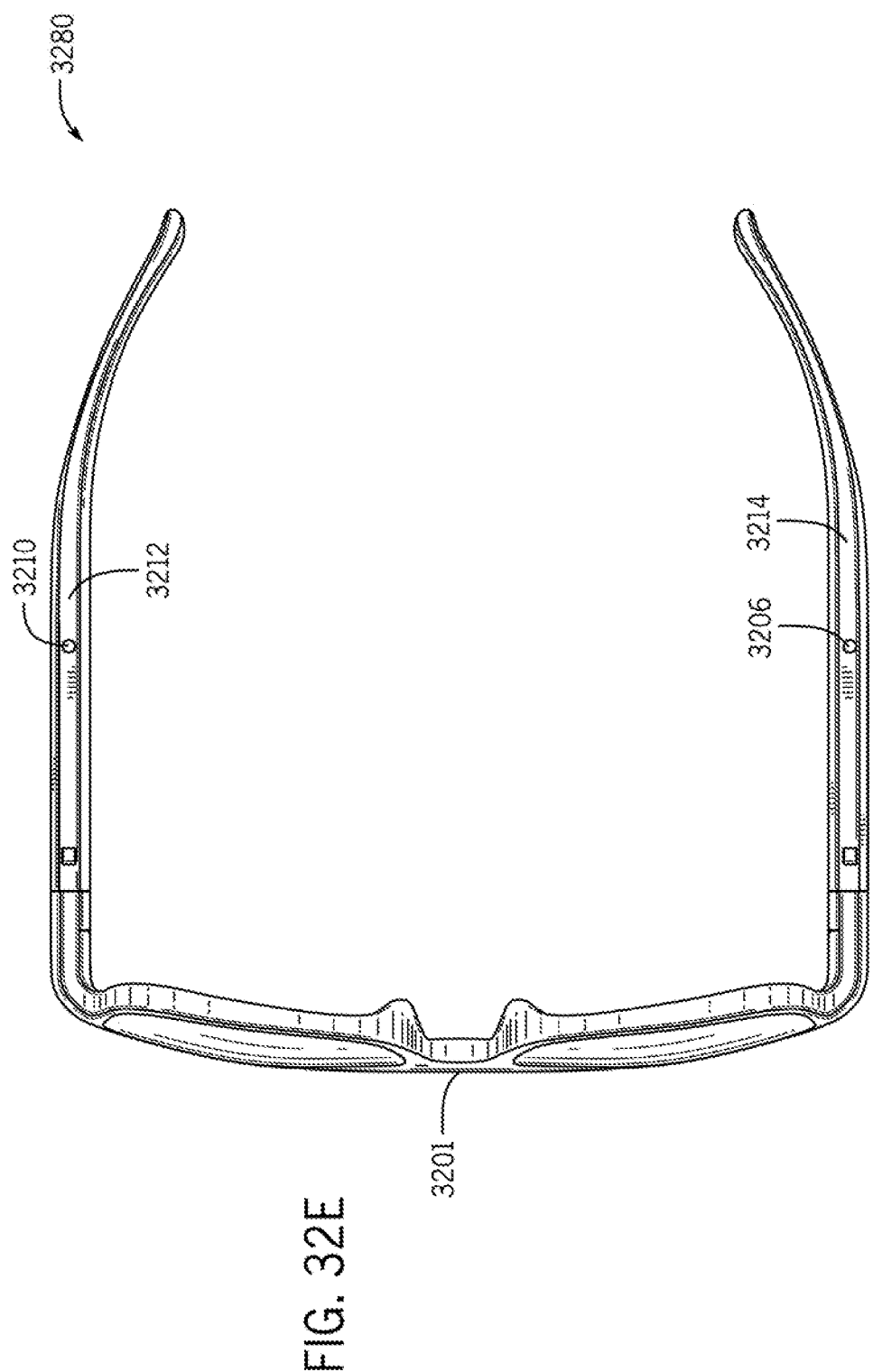
FIG. 32E illustrates microphone placement on a head wearable device in bottom view corresponding to FIG. 32D according to embodiments of the invention.
Figure 33:
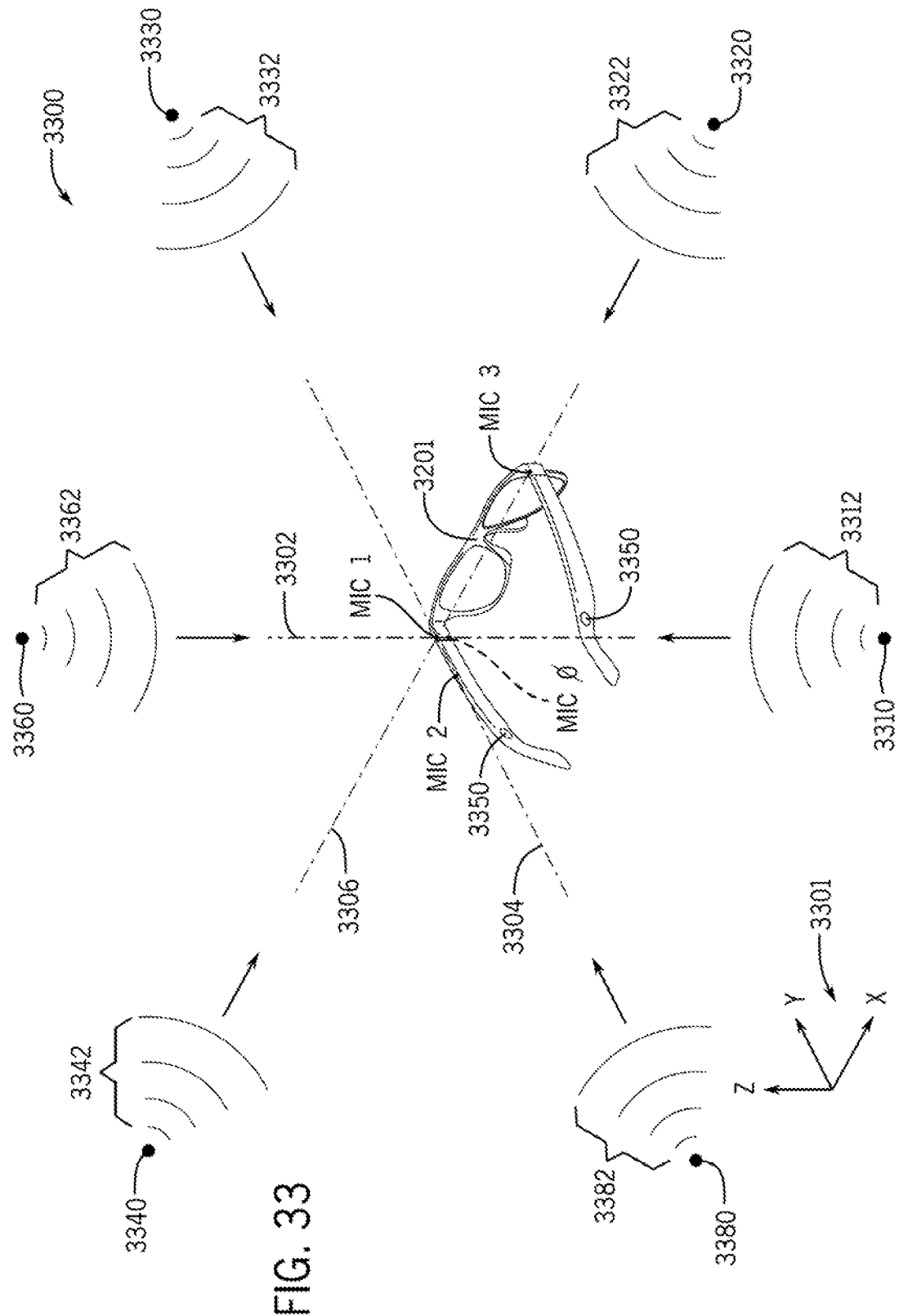
FIG. 33 illustrates the head wearable devices from FIG. 32A-D relative to different sound sources according to embodiments of the invention.

FIG. 32D illustrates, generally at 3260, another set of microphone placements in perspective view on a head wearable device according to embodiments of the invention. FIG. 32E illustrates, generally at 3280, microphone placements on a head wearable device in bottom view corresponding to FIG. 32D according to embodiments of the invention. Referring to FIG. 32D, microphone 0 (3202) and Microphone 1 (3204) are located on an inside surface of the temple 3212. Microphone 2 (3206) is located on a bottom surface of the right temple 3212 and is setback from Microphone 0 (3202)/Microphone 1 (3204) by an amount equal to $L_1$ as described above. A distance between Microphone 0 (3202)/Microphone 1 (3204) and the front frame is as described above with $L_2$ (FIG. 32B). Referring back to FIG. 32D, microphone 3 (3210) is located on a bottom side of the left temple 3210. Alternatively, one or both of Microphones 2 (3206) and Microphone 3 (3210) can be located on a top surface of their respective temples.

In an alternative embodiment, the microphone placements shown in FIGS. 32D/32E can be reversed with respect to the temples. For example, Microphone 0 (3202), Microphone 1 (3204), and Microphone 2 (3206) can be located on an inside surface of the left temple 3214 and Microphone 3 (3210) can be located on the right temple 3212.

The four microphones described support three or more microphone combinations for the different use scenarios described herein as Configuration 1 using Microphone 0 and Microphone 1; Configuration 2 using Microphone 1 and Microphone 2; and Configuration 3 using Microphone 1 and Microphone 3. In some embodiments, software interfaces are used to control the switching between these combinations of microphones and sequencing between configurations.

In various embodiments, the eyeglasses will have more than four microphones or less than four microphones. Four microphones are used for illustration of one or more embodiments as described herein and do not limit embodiments of the invention. Three configurations of microphones are described below to receive and to process acoustic signals for use by the user of the head wearable device to assist the user's hearing and in some instances for use remotely by e.g., speech recognition, command and control, reception and hearing by another user, as well as for local use by embedded speech recognition, etc. The Configurations described below can be used to provide primary and reference acoustic signals for use in the noise cancellation systems as described above.

Configuration 1

In one or more embodiments, Microphone 0 and Microphone 1 are used to process acoustic signals when a user is speaking while wearing the head wearable device 101. In Configuration 1, the signals output from Microphone 0 and Microphone 1 are beamformed to place a main acoustic response downward along an axis 3302. The axis 3302 is in a nominal direction of the user's mouth 3310 but need not be precisely aligned thereto. Microphone 0 and Microphone 1 have different acoustic distances to the user's mouth 3320, with an acoustic distance for Microphone 0 being less than an acoustic distance for Microphone 1. Acoustic signals 3312, emanating from a user's mouth 3310, are received with maximum acoustic sensitivity to the direction of the user 3310 relative to the microphone pair Microphone 0 and Microphone 1. An acoustic signal so obtained, is used as a primary signal for input into a multichannel noise cancellation system. A reference signal, containing mostly noise (mostly undesired audio), is obtained by beamforming the microphone pair Microphone 0 and Microphone 1 with a main response steered 180 degrees away from the acoustic source 3310. Thus, the reference signal is obtained in a direction looking up along the axis 3302 away from the user's mouth 3310, towards potential noise sources, such as a noise source represented by 3360, emitting noise 3362 (undesired audio). A signal so obtained, looking away from the user's mouth 3310, is used as a reference signal for input into a multichannel noise cancellation system as described above. The beamforming applied to the reference signal minimizes acoustic sensitivity to signals arriving from the user's mouth 3310 and maximizes sensitivity to noise generated away from the direction of the user's mouth. Thus, a signal-to-noise ratio difference between Microphone 0 and Microphone 1 is maximized thereby to provide a reduction of noise from the primary signal through subsequent application of noise cancellation.

Processing to reduce noise (undesired audio) from the signal of interest (desired audio) permits the combination of Microphone 0 and Microphone 1 to help enhance the user's voice for phone calls in noisy environments. It also helps the command and control performance of the system when used in noisy environments. In noisy environments, the user's voice is buried within the background noises and is hard to be understood by the far-side listener during a phone call or to be recognized by a speech engine. The Microphone 0 and Microphone 1 combination uses beamforming technology to improve both the signal-to-noise ratio (SNR) of the user's voice over the background noise (as well as increasing a signal-to-noise ratio difference between Microphone 0 and Microphone 1) and the voice activity detection accuracy for the noise cancellation is improved thereby. This combination provides useful performance gains even in a very noisy environment having a 90-dB or greater background noise amplitude. As described above, Microphone 0 and Microphone 1 can be implemented with omni-directional microphones.

Configuration 2

In one or more embodiments, Microphone 1 and Microphone 2 are used to process acoustic signals when a user is listening to a remote sound source such as 3330, while wearing the head wearable device 3201. In Configuration 2, the signals output from Microphone 1 and Microphone 2 are beamformed to place a main acoustic response forward along an axis 3304, thereby receiving acoustic signals 3332 emanating from the sound source indicated at 3330 with maximum acoustic sensitivity steered to a direction of the sound source 3330 relative to the microphone pair Microphone 1 and Microphone 2. A signal so obtained, is used as a primary signal for input into a multichannel noise cancellation system. A reference signal, containing mostly noise, can be obtained from Microphone 2 with or without beamforming. When omnidirectional microphones are used for Microphone 1 and Microphone 2, beamforming Microphone 1 and Microphone 2 to obtain a primary signal while using Microphone 2 alone for the reference signal, without beamforming with Microphone 1, increases a sensitivity of the beamformed pair in the direction of a source 3330 by approximately 6 dB relative to a sensitivity of Microphone 2 alone to the source 3330. Such processing provides a significant signal-to-noise ratio difference between Microphone 1 and Microphone 2, which is advantageous to noise cancellation performance. The axis 3304 is pointing in a nominal direction forward of the user but need not be precisely aligned thereto. Microphone 1 and Microphone 2 have different acoustic distances to a sound source located forward of the user such as 3330. An acoustic distance between the sound source 3330 and Microphone 1 less than an acoustic distance between Microphone 2 and the sound source 3330. Thus, Microphone 1 and Microphone 2 can be flexibly located on a head wearable device in order to provide different acoustic distances relative to a sound source located in front of the head wearable device while not necessarily pointing directly at the sound source 3330.

In alternative embodiments, beamforming the microphone pair Microphone 1 and Microphone 2 with a main response steered 180 degrees away from the acoustic source 3330 can be used to provide a reference signal (mostly undesired audio). Note that it is desirable to obtain a reference signal with a minimum amount of desired audio combined therewith. The reference signal can be obtained according to both methods, compared, and then a selection can be made based on the best system performance. Thus, a reference signal, so obtained by either method, has a signal-to-noise ratio that is less than the signal-to-noise ratio of the primary signal. Therefore, a signal-to-noise ratio difference is obtained for the Microphone 1/Microphone 2 pair with respect to signals of interest originating from a direction that is nominally in front of the head wearable device 3201, such as for example 3330/3332. Signals so obtained via either method described above, looking away from the source 3330, are used as a reference signal for input into a multi-channel noise cancellation system. The beamforming used for the reference signal is chosen to provide minimum acoustic sensitivity to signals arriving from in front of the user such as the source 3330 (desired audio) and maximizes sensitivity to noise generated from directions other than the source 3330. Thus, a signal-to-noise ratio difference between Microphone 1 and Microphone 2 is maximized thereby to provide reduction of noise from the primary signal through subsequent application of noise cancellation.

The output of the noise cancellation system is then provided on a speaker(s) 3350 to assist the user's hearing of the sound source 3330. The speaker 3350 is incorporated into one or both side frames of the eyeglasses 3201. Thus, in various embodiments, the Microphone 1, Microphone 2 combination is used to enhance a user's hearing, such as for example during some activities like watching television or having a conversation with a person in front of the user wearing the eyeglasses 3201. Some people with hearing difficulties are not able to understand audio signal clearly especially in a noisy environment. Combination 2 applies beamforming technology to help the user focus on the audio signals of interest by spatially removing the background noise.

Configuration 3

In one or more embodiments, Microphone 1 and Microphone 3 are used to process acoustic signals when a user is listening to or interacting with a remote sound source such as 3320 or 3340, arriving from one side or the other while wearing the head wearable device 3201. Alternatively, Microphone 3 and Microphone 2 are used to process the signals for Configuration 3 or Microphone 3 and Microphone 0 are used. The description that follows for Configuration 3 is provided in terms of Microphone 3 and Microphone 1 with no limitation implied thereby. In Configuration 3, the sound energy output from Microphone 1 and Microphone 3 are compared to determine which side of the user the loudest sound is coming from. Such information is useful because, in a meeting for example, with people sitting around a table, various people will speak from time-to-time thereby producing different arrival directions relative to a user wearing the eyeglasses 3201. In Configuration 3, the signals output from a selected pair of microphones are processed to place a main acoustic response along an axis 3306. The axis 3306 is in a nominal direction of the sound source but need not be precisely aligned thereto. The selected pair of microphones, e.g., one of Microphone 3 and Microphone 0, Microphone 3 and Microphone 1, or Microphone 3 and Microphone 2 have different acoustic distances to the sound source.

Following one method of operation, a primary microphone is the microphone from the Microphone 1, Microphone 3 pair with the largest sound energy output. The other microphone of the Microphone 1, Microphone 3 pair is then assigned to be the reference microphone. Alternative processing of the primary and the reference signals can follow the determination of which microphone is outputting the largest sound energy. For example, in one or more embodiments, beamforming is applied to the signals output from Microphone 1 and Microphone 3. In one example, the primary signal is obtained when the main response axis of the beamforming process is steered to the side (direction) where the largest sound energy is being measured. In this example, the reference signal is obtained by steering the main response axis of the beamforming process to the opposite side as that of the primary.

A variation on this process is to use beamforming to obtain the primary signal, i.e., beamforming the outputs of Microphone 1 and Microphone 3 (steered toward a side where the maximum acoustic energy is measured on one of Microphone 1 and Microphone 3, while using a non-beamformed output of the microphone with the lower sound energy for the reference signal.

Yet another variation on this process is to use beamforming to obtain the reference signal, i.e., beamforming the outputs of Microphone 1 and Microphone 3 (steered toward a side where the minimum acoustic energy is measured on one of Microphone 1 and Microphone 3, while using a non-beamformed output of the microphone with the maximum sound energy output for the primary signal.

In one non-limiting example referring to FIG. 33, a hypothetical use scenario exists when sound source 3320 is louder than sound source 3340. In one or more embodiments, the system is designed to select Microphone 3 as the side to receive the primary signal. Receiving the primary signal can be accomplished by any one of the methods described directly above, such as beamforming Microphone 1 and Microphone 3 while placing a main response axis 3306 in a direction of sound source 3320. Alternatively, an output from Microphone 3 can be used as the primary signal without beamforming. A reference signal can be obtained by beamforming Microphone 1 and Microphone 3 while placing a main response axis 3306 in a direction opposite to that of the sound source 3320. Alternatively, an output from Microphone 1 can be used as the reference signal without beamforming.

In some embodiments, a system is implemented to sequence through the methods described above, e.g., beamforming to select a primary or reference signal verses using a non-beamformed output of a microphone for either the primary or the reference signal. A performance metric such as a signal-to-noise ratio difference between a primary and a reference signal for each method is computed and the method with the largest signal-to-noise ratio difference is the method that is used to process the signals from Microphone 1 and Microphone 3. Sequencing through the methods can be performed at the onset of signal processing or the sequencing can be continuously performed to monitor a performance metric and then based on the evolution of the performance metric the method can be updated on the fly. Thus, many different methods are possible for use during the implementation of Configuration 3. The output of the noise cancellation system is then provided on one or more of speaker(s) 3350 to assist the user's hearing of the sound source 3320. The speaker 3350 is incorporated into one or both side frames (temples) of the eyeglasses 3201.

A similar process is implemented when a sound source 3340 is producing a larger sound energy 3342 on Microphone 1 relative to a sound energy level received on Microphone 3. In such a case, the system can use a beamforming process to steer a main response axis of a microphone pair in a direction of the sound source 3340.

The Microphone 1 and Microphone 3 pair helps the user to pick the stronger voice from around the user during a conversation, especially from the left and right side, by comparing the sound energies picked up from the Microphone 1 and Microphone 3. During a group meeting or chatting, the speech signal may come from different directions (right or left sides) to the user. Configuration 3 compares the audio signal energy on each of the two microphones in order to determine which side the audio signal is coming from in order to help the user to focus on the active person speaking during the conversation. The output of the noise cancellation system is then provided on a speaker 3350 to assist the user's hearing of the sound source 3320 or 3340. The speaker 3350 is incorporated into one or both side frames of the eyeglasses 3201.

Configuration Switching and Scanning

In various embodiments, a system can be configured to switch between two, three, or more configurations. Scanning the configurations or scanning the different beams (or selected microphone pairs) formed from the array of microphones incorporated into a head wearable device can also be done automatically by the signal processing (hardware or combination of hardware and software) built into a head wearable device. Thus, in some embodiments, a system is implemented that scans through a number of directions relative to a user thereby forming beams (or processing selected microphone pairs) and providing assistance to a user with audio signals that have been received and improved by one or more of beamforming, noise cancellation, and or adjustment of volume before presentation to a user either locally or at a far side.

For example, while watching television and talking on the phone, a system can be configured to switch between Configuration 1 (phone call) and Configuration 2 (television viewing). A metric for switching to Configuration 1 (telephone function) can be related to detection of a change in sound energy on Microphone 0.

Another example of configuration switching can be switching from Configuration 3 to Configuration 2 during a conversation. For example, in a meeting a person sitting to the right of a user wearing the eyeglasses 3201 begins speaking. Such a geometry is represented by the source 3320 outputting acoustic energy 3322 and an output of Microphone 3 being larger than an output from Microphone 1. The system operates in Configuration 3 at this point. As the user listens and realizes that the speaker is to the right, the user might turn his or her head to the right to face the speaker. Now facing the speaker 3320, the difference between the sound energy received on Microphone 1 and Microphone 3 has decreased, while the sound energy on Microphone 1 has increased. In such a situation the system switches to Configuration 2 as described above.

In one mode of operation, a user does not have to rotate his or her head from side-to-side to face a speaker in a meeting. As the active person speaking changes from position to position, for example, a position 3320 (on a right side relative to eyeglasses 3201) to a position 3340 (on a left side relative to eyeglasses 3201) to a position 3330 (in front of eyeglasses 3201) to a position 3380 (in back of eyeglasses 3201). The system will switch between microphone pairs and directions to select a primary microphone (either alone or a beamformed output) in the direction of the speaker and a reference microphone (either alone or a beamformed output) in the direction of the noise (mostly undesired audio).

Thus, embodiments of the invention are implemented by a system that switches between Configurations 1, 2, and 3 (or any subset thereof) operable by mechanical switching, audio switching, or by intelligent design operable through analysis of one or more performance metrics such as but not limited to maximum signal-to-noise ratio difference, maximum sound energy output from a microphone or a beamformed output, etc.

Three configurations, utilizing three or four microphones, have been described in conjunction with the figures above. Note that more than four microphones can be used with a head wearable device to provide a general number of n directions (axes) and potential configurations to process acoustic signals. Likewise, beamforming can be performed with more than two microphones.

FIG. 34 illustrates, generally at 3400, processing acoustic signals from an array of microphones configured with a head wearable device, according to embodiments of the invention. With reference to FIG. 34, a process starts at a block 3402. At a block 3404, microphones that are part of an array of microphones that are attached to a head wearable device are scanned. The scanning includes analyzing the acoustic signals from the microphones for signal amplitude level and in some cases other parameters. At a block 3406, a configuration is selected based on the scanning from the block 3404. In some embodiments, selection logic is used to select between the configurations that are available utilizing a given array of microphones. At a block 3408, the acoustic signals from the configuration selected at the block 3406 are processed to improve the acoustic signal. Improving the acoustic signal can include inputting the acoustic signals into a noise cancellation block to remove underside audio from a primary acoustic channel. Improving the acoustic signal can include amplifying the acoustic signal and presenting the amplified acoustic signal to a user of a head wearable device on a speaker incorporated with the head wearable device. The process stops at a block 3412.

For purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory.

These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, waveforms, data, time series or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk read-only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. In other examples, embodiments of the invention as described above in FIG. 1 through FIG. 31 can be implemented using a system on a chip (SOC), a Bluetooth chip, a digital signal processing (DSP) chip, a codec with integrated circuits (ICs) or in other implementations of hardware and software.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, mathematical expression, flow diagram or flow chart. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Non-transitory machine-readable media is understood to include any mechanism for storing information in a form readable by a machine (e.g., a computer). For example, a machine-readable medium, synonymously referred to as a computer-readable medium, includes read only memory (ROM); random access memory (RAM); magnetic disk storage media; optical storage media; flash memory devices; except electrical, optical, acoustical or other forms of transmitting information via propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus, embodiments of the invention can be used to reduce or eliminate undesired audio from acoustic systems that process and deliver desired audio. Some non-limiting examples of systems are, but are not limited to, use in short boom headsets, such as an audio headset for telephony suitable for enterprise call centers, industrial and general mobile usage, an in-line "ear buds" headset with an input line (wire, cable, or other connector), mounted on or within the frame of eyeglasses, a near-to-eye (NTE) headset display or headset computing device, a long boom headset for very noisy environments such as industrial, military, and aviation applications as well as a gooseneck desktop-style microphone which can be used to provide theater or symphony-hall type quality acoustics without the structural costs. Other embodiments of the invention are readily implemented in a head wearable device of general configuration such as but not limited to glasses, goggles, a visor, a head band, a helmet, etc. or the like.

While the invention has been described in terms of several embodiments, those of skill in the art will recognize that the invention is not limited to the embodiments described but can be practiced with modification and alteration within the spirit and scope of the appended claims. The description is thus to be regarded as illustrative instead of limiting.

What is claimed is:

1. An apparatus to be worn on a user's head, comprising:
a head wearable device;
an array of at least three microphones, the at least three microphones are arranged along a plurality of at least two non-parallel axes, wherein a first microphone and a second microphone of the array define a first axis of the plurality of at least two non-parallel axes, wherein the second microphone and a third microphone define a second axis of the plurality of at least two non-parallel axes, and wherein the first microphone and the second microphone are located on an inside surface of a first temple of the head wearable device and the third microphone is located on a bottom surface of the first temple;
selection logic, the selection logic is configured to identify a selected axis from the plurality and two microphones from the array that form the selected axis; and
a beamformer, the beamformer is configured to accept as inputs, signals from the two microphones and to output a main microphone channel and a reference microphone channel.

2. The apparatus of claim 1, wherein the selection logic uses a metric to identify the selected axis.

3. The apparatus of claim 2, wherein the metric includes a microphone that receives a maximum sound pressure level.

4. The apparatus of claim 3, wherein the metric includes a microphone that receives a minimum sound pressure level.

5. The apparatus of claim 2, wherein the selection logic is configured to monitor the metric and to select a new selected axis from the plurality based on a new value for the metric.

6. The apparatus of claim 2, wherein the metric is a maximum signal-to-noise ratio difference for the two microphones.

7. The apparatus of claim 1, further comprising:
a switch, the selected axis is selected based on a state of the switch.

8. The apparatus of claim 1, wherein the main microphone channel and the reference microphone channel are input to a two-stage noise cancellation block.

9. The apparatus of claim 1, further comprising:
a speaker, the speaker is coupled to the head wearable device and is configured to provide a signal that the user can hear.

10. The apparatus of claim 9, wherein when the selected axis does not point towards the user's mouth, the main microphone channel and the reference microphone channel are used to create a signal that is input into the speaker.

11. The apparatus of claim 1, the array further comprising:
a fourth microphone, the fourth microphone is located on a second temple of the head wearable device and the first microphone and the fourth microphone form a third axis, the second microphone and the fourth microphone form a fourth axis and the third axis is different from the fourth axis, the selection logic to select an active direction from one of at least the first axis, the second axis, and the third axis.

12. An apparatus to be worn on a user's head, comprising:
a head wearable device, the head wearable device further comprising:
an array of three microphones, the array is coupled to the head wearable device, wherein a first microphone and a second microphone of the array define a first axis, wherein the second microphone and a third microphone define a second axis, and wherein the first microphone and the second microphone are located on an inside surface of a first temple of the head wearable device and the third microphone is located on a bottom surface of the first temple;
a speaker, the speaker is coupled to the head wearable device and is configured to provide a signal that the user can hear; and
selection logic, the selection logic to select an active direction from the first axis and the second axis, wherein:
when the active direction is the first axis, outputs from the first microphone and the second microphone are to be processed for transmission from the head wearable device; and
when the active direction is the second axis, outputs from the second microphone and the third microphone are to be processed for use as an input to the speaker.

13. The apparatus of claim 12, the array further comprising:
a fourth microphone, the fourth microphone is located on a second temple of the head wearable device and the first microphone and the fourth microphone form a third axis, the second microphone and the fourth microphone form a fourth axis and the third axis is different from the fourth axis, the selection logic to select an active direction from one of at least the first axis, the second axis, and the third axis.

14. An apparatus to be worn on a user's head, comprising:
a head wearable device, the head wearable device is configured to be worn on the user's head;
a first microphone, the first microphone is coupled to an inside surface of a first temple of the head wearable device to receive a first acoustic signal from a sound source;
a second microphone, the second microphone is coupled to the inside surface of the first temple of the head wearable device to receive a second acoustic signal from the sound source;
a third microphone, the third microphone is coupled to a bottom surface of the first temple of the head wearable device; and
a beamformer, the beamformer further comprising:
a first input, the first input is configured to receive the first acoustic signal;
a second input, the second input is configured to receive the second acoustic signal;
a main signal output, the beamformer is configured to form a main signal from the first acoustic signal and the second acoustic signal wherein the main signal is formed by steering a main response axis in a first direction, the main signal to be output from the main signal output; and a reference signal output, the beamformer is configured to form a reference signal from the first acoustic signal and the second acoustic signal wherein the reference signal is formed by steering a reference response axis in a second direction, wherein the first direction is different from the second direction the reference signal to be output from the reference signal output.

15. The apparatus of claim 14, wherein a first axis formed between the first microphone and the second microphone points towards the user's mouth when the head wearable device is on the user's head.

16. The apparatus of claim 15, wherein a second axis formed between the first microphone and the second microphone points forward of the user when the head wearable device is on the user's head.

17. The apparatus of claim 16, wherein a third axis formed between the first microphone and the second microphone points to a side of the user when the head wearable device is on the user's head.

18. The apparatus of claim 17, further comprising:
selection logic, the selection logic is configured to select the first direction from one of the first axis, the second axis, and the third axis based on a predefined criterion.

19. The apparatus of claim 14, wherein the main signal is to be input as a main channel to a two-stage noise cancellation unit and the reference signal is to be input as a reference channel to the two-stage noise cancellation unit.

20. An apparatus to be worn on a user's head, comprising:
a head wearable device, the head wearable device is configured to be worn on the user's head;

a first microphone, the first microphone is coupled to an inside surface of a first temple of the head wearable device to receive a first acoustic signal from a sound source, the first microphone is first distance from the sound source;

a second microphone, the second microphone is coupled to an inside surface of the first temple of the head wearable device to receive a second acoustic signal from the sound source, the second microphone is second distance from the sound source;

a third microphone, the third microphone is coupled to a bottom surface of the first temple of the head wearable device; and a beamformer, the beamformer further comprising:
a first input, the first input is configured to receive the first acoustic signal;

a second input, the second input is configured to receive the second acoustic signal;

a main signal output, the beamformer is configured to form a main signal from the first acoustic signal and the second acoustic signal wherein the main signal is formed by steering a main response axis in a first direction, the main signal to be output from the main signal output; and a reference signal, the second acoustic signal is used for the refence signal and the second distance is greater than the first distance.

* * * * *